US012801110B2

(12) United States Patent
Maruyama

(10) Patent No.: US 12,801,110 B2
(45) Date of Patent: Nov. 17, 2026

(54) SETTING SUPPORT APPARATUS, CONTROL METHOD, AND PROGRAM

(71) Applicant: Keyence Corporation, Osaka (JP)

(72) Inventor: Daisuke Maruyama, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 242 days.

(21) Appl. No.: 18/635,066

(22) Filed: Apr. 15, 2024

(65) Prior Publication Data

US 2024/0393759 A1 Nov. 28, 2024

(30) Foreign Application Priority Data

May 22, 2023 (JP) ................................ 2023-084145
Jan. 17, 2024 (JP) ................................ 2024-005190

(51) Int. Cl.
*G05B 19/05* (2006.01)
*H04L 67/12* (2022.01)

(52) U.S. Cl.
CPC .... *G05B 19/05* (2013.01); *G05B 2219/15006* (2013.01); *H04L 67/12* (2013.01)

(58) Field of Classification Search
CPC .......... G05B 19/05; G05B 2219/15006; H04L 67/12
See application file for complete search history.

(56) References Cited

U.S. PATENT DOCUMENTS 6,832,120 B1 * 12/2004 Frank ..................... G05B 15/02 709/224
11,409,257 B2 8/2022 Fujimura
11,656,596 B2 5/2023 Fujimura
11,971,696 B2 4/2024 Maruyama
2012/0256566 A1 * 10/2012 Chaffee ................. G06F 13/124 700/275
2014/0207254 A1 * 7/2014 Nishiyama ............. G05B 19/04 700/11
2016/0048120 A1 * 2/2016 Nakajima ............ G05B 19/058 700/87
2021/0063989 A1 * 3/2021 Taniguchi .............. G05B 19/05
2021/0255598 A1 * 8/2021 Kira ...................... H04L 12/417
2021/0255604 A1 * 8/2021 Matsumura ............... G06F 9/54

FOREIGN PATENT DOCUMENTS

JP 2015012025 A 1/2015

* cited by examiner

*Primary Examiner* — Zoheb S Imtiaz
(74) *Attorney, Agent, or Firm* — Kilyk & Bowersox, P.L.L.C.

(57) ABSTRACT

A PLC and a motor driver can be set more easily as compared with the related art. A setting support apparatus sets mapping of a data object transferred by a master through cyclic communication based on mapping information included in assignment information corresponding to a combination of vendor specifying information and product specifying information of a motor driving apparatus set for a programmable logic controller. Furthermore, the setting support apparatus causes the master to write a recommended value of a setting parameter, included in the assignment information for the motor driving apparatus, to the motor driving apparatus through message communication.

10 Claims, 39 Drawing Sheets

FIG. 7

SLAVE EQUIPMENT A PARAMETER LIST

| DISPLAY ORDER | CATEGORY | PARAMETER NUMBER NAME | PARAMETER NAME (ENGLISH) | PARAMETER NAME (JAPANESE) | ··· | INDEX | SUB-INDEX | DATA TYPE | MINIMUM SETTING VALUE | MAXIMUM SETTING VALUE | DEFAULT VALUE | WHETHER IT IS NECESSARY TO TURN ON POWER AGAIN FOR REFLECTION | VALUE DISPLAY FORMAT | OPTION ID |
|---|---|---|---|---|---|---|---|---|---|---|---|---|---|---|
| 1 | Initial Setting | P01.00 | Input1 Selection | INPUT 1 SELECTION | ··· | 0x3000 | 0x00 | 4-BYTE UNSIGNED INTEGER | 0x00 | 0xFFFFFF | 0x0 | TRUE | OPTION | 0 |
| 2 | Initial Setting | P01.01 | Input2 Selection | INPUT 2 SELECTION | ··· | 0x3001 | 0x00 | 4-BYTE UNSIGNED INTEGER | 0x00 | 0xFFFFFF | 0x0 | TRUE | OPTION | 0 |
| 3 | Initial Setting | P01.02 | Input3 Selection | INPUT 3 SELECTION | ··· | 0x3002 | 0x00 | 4-BYTE UNSIGNED INTEGER | 0x00 | 0xFFFFFF | 0x0 | TRUE | OPTION | 0 |
| 4 | Initial Setting | P01.03 | Input4 Selection | INPUT 4 SELECTION | ··· | 0x3003 | 0x00 | 4-BYTE UNSIGNED INTEGER | 0x00 | 0xFFFFFF | 0x0 | TRUE | OPTION | 0 |
| 5 | Initial Setting | P01.04 | Input5 Selection | INPUT 5 SELECTION | ··· | 0x3004 | 0x00 | 4-BYTE UNSIGNED INTEGER | 0x00 | 0xFFFFFF | 0x0 | TRUE | OPTION | 0 |
| 6 | Initial Setting | P01.05 | Input6 Selection | INPUT 6 SELECTION | ··· | 0x3005 | 0x00 | 4-BYTE UNSIGNED INTEGER | 0x00 | 0xFFFFFF | 0x0 | TRUE | OPTION | 0 |
| 7 | Initial Setting | P01.06 | Input7 Selection | INPUT 7 SELECTION | ··· | 0x3006 | 0x00 | 4-BYTE UNSIGNED INTEGER | 0x00 | 0xFFFFFF | 0x0 | TRUE | OPTION | 0 |
| 8 | Initial Setting | P01.07 | Input8 Selection | INPUT 8 SELECTION | ··· | 0x3007 | 0x00 | 4-BYTE UNSIGNED INTEGER | 0x00 | 0xFFFFFF | 0x0 | TRUE | OPTION | 0 |
| 9 | Initial Setting | P02.00 | Polarity | POLARITY | ··· | 0x3200 | 0x00 | 1-BYTE UNSIGNED INTEGER | 0x00 | 0xFF | 0 | TRUE | OPTION | 1 |
| 10 | Initial Setting | P10.00 | ABS encoder setup | ABS SETTING | ··· | 0x4000 | 0x00 | 2-BYTE SIGNED INTEGER | 0 | 4 | 1 | TRUE | OPTION | 2 |
| 11 | Tuning | P00.03 | machine stiffness | MACHINE STIFFNESS | ··· | 0x3501 | 0x00 | 2-BYTE SIGNED INTEGER | 0 | 31 | 13 | FALSE | DECIMAL NUMBER | – |
| 12 | Tuning | P00.04 | Inertia ratio (%) | INERTIA RATIO (%) | ··· | 0x3502 | 0x00 | 2-BYTE SIGNED INTEGER | 0 | 10000 | 250 | FALSE | DECIMAL NUMBER | – |

FIG. 8

| OPTION ID | 0 | | | |
|---|---|---|---|---|
| DISPLAY ORDER | VALUE | DISPLAY WORDING (ENGLISH) | DISPLAY WORDING (JAPANESE) | ... |
| 1 | 0x00000000 | Invalid | INVALID | ... |
| 2 | 0x00010101 | EXT1_A | EXTERNAL LATCH INPUT 1_CONTACT POINT A | ... |
| 3 | 0x00020202 | EXT2_A | EXTERNAL LATCH INPUT 2_CONTACT POINT A | ... |
| 4 | 0x00030303 | SI-MON1_A | GENERAL-PURPOSE MONITOR INPUT 1_CONTACT POINT A | ... |
| 5 | 0x00040404 | SI-MON2_A | GENERAL-PURPOSE MONITOR INPUT 2_CONTACT POINT A | ... |
| 6 | 0x00050505 | SI-MON3_A | GENERAL-PURPOSE MONITOR INPUT 3_CONTACT POINT A | ... |
| 7 | 0x00060606 | SI-MON4_A | GENERAL-PURPOSE MONITOR INPUT 4_CONTACT POINT A | ... |
| 8 | 0x00070707 | SI-MON5_A | GENERAL-PURPOSE MONITOR INPUT 5_CONTACT POINT A | ... |
| 9 | 0x00A1A1A1 | EXT1_B | EXTERNAL LATCH INPUT 1_CONTACT POINT B | ... |
| 10 | 0x00A2A2A2 | EXT2_B | EXTERNAL LATCH INPUT 2_CONTACT POINT B | ... |
| 11 | 0x00A3A3A3 | SI-MON1_B | GENERAL-PURPOSE MONITOR INPUT 1_CONTACT POINT B | ... |
| 12 | 0x00A4A4A4 | SI-MON2_B | GENERAL-PURPOSE MONITOR INPUT 2_CONTACT POINT B | ... |
| 13 | 0x00A5A5A5 | SI-MON3_B | GENERAL-PURPOSE MONITOR INPUT 3_CONTACT POINT B | ... |
| 14 | 0x00A6A6A6 | SI-MON4_B | GENERAL-PURPOSE MONITOR INPUT 4_CONTACT POINT B | ... |
| 15 | 0x00A7A7A7 | SI-MON5_B | GENERAL-PURPOSE MONITOR INPUT 5_CONTACT POINT B | ... |

| OPTION ID | 1 | | | |
|---|---|---|---|---|
| DISPLAY ORDER | VALUE | DISPLAY WORDING (ENGLISH) | DISPLAY WORDING (JAPANESE) | ... |
| 1 | 0 | No Reverse of Sign | NO REVERSE OF SIGN | ... |
| 2 | 255 | Reverse of Sign | REVERSE OF SIGN | ... |

| OPTION ID | 2 | | | |
|---|---|---|---|---|
| DISPLAY ORDER | VALUE | DISPLAY WORDING (ENGLISH) | DISPLAY WORDING (JAPANESE) | ... |
| 1 | 0 | ABS mode | ABS MODE | ... |
| 2 | 1 | INC mode | INC MODE | ... |

FIG. 9

| | |
|---|---|
| OPERATION TYPE ID | #EEPROM_WRITE |
| WHETHER SLAVE EQUIPMENT IS COMPATIBLE | TRUE |
| EXECUTION CONDITION | ALWAYS |

| | PROCESSING TYPE | INDEX | SUB-INDEX | DATA SIZE | VALUE | CONDITION |
|---|---|---|---|---|---|---|
| SEQUENCE 1 | WRITE | 0x1010 | 0x00 | 4 | 0x12345678 | – |
| SEQUENCE 2 | STANDBY | 0x1010 | 0x00 | 4 | 0x00000001 | WAIT UNTIL REACHING DESIGNATED VALUE |

| | |
|---|---|
| OPERATION TYPE ID | #SW_RESET |
| WHETHER SLAVE EQUIPMENT IS COMPATIBLE | FALSE |
| EXECUTION CONDITION | – |

| | |
|---|---|
| OPERATION TYPE ID | #ABS_RESET |
| WHETHER SLAVE EQUIPMENT IS COMPATIBLE | TRUE |
| EXECUTION CONDITION | ALWAYS |

| | PROCESSING TYPE | INDEX | SUB-INDEX | DATA SIZE | VALUE | CONDITION |
|---|---|---|---|---|---|---|
| SEQUENCE 1 | WRITE | 0x4000 | 0x00 | 2 | 0x0030 | – |
| SEQUENCE 2 | WRITE | 0x4010 | 0x00 | 4 | 0x00000000 | – |
| SEQUENCE 3 | WRITE | 0x4020 | 0x00 | 4 | 0x00000200 | – |

FIG. 17

SLAVE EQUIPMENT A PARAMETER LIST

| DISPLAY ORDER | CATEGORY | PARAMETER NUMBER NAME | PARAMETER NAME (ENGLISH) | PARAMETER NAME (JAPANESE) | ... | INDEX | SUB-INDEX | DATA TYPE |
|---|---|---|---|---|---|---|---|---|
| 1 | Initial Setting | P01.00 | Param A | PARAMETER A | ... | 0x3000 | 0x00 | 4-BYTE UNSIGNED INTEGER |
| 2 | Initial Setting | P01.01 | Param B | PARAMETER B | ... | 0x3000 | 0x00 | 4-BYTE UNSIGNED INTEGER |
| 3 | Initial Setting | P01.02 | Param C | PARAMETER C | ... | 0x3000 | 0x00 | 4-BYTE UNSIGNED INTEGER |
| 4 | Initial Setting | P01.03 | Param D | PARAMETER D | ... | 0x3000 | 0x00 | 4-BYTE UNSIGNED INTEGER |

| START BIT POSITION | BIT WIDTH | MINIMUM SETTING VALUE | MAXIMUM SETTING VALUE | DEFAULT VALUE | WHETHER IT IS NECESSARY TO TURN ON POWER AGAIN FOR REFLECTION | VALUE DISPLAY FORMAT | OPTION ID |
|---|---|---|---|---|---|---|---|
| 0 | 4 | 0 | 15 | 0 | TRUE | OPTION | 0 |
| 4 | 4 | 0 | 15 | 0 | TRUE | OPTION | 1 |
| 8 | 4 | 0 | 15 | 0 | TRUE | OPTION | 2 |
| 12 | 4 | 0 | 15 | 0 | TRUE | OPTION | 3 |

ADD

FIG. 21

| PARAMETER NAME (ENGLISH) | PARAMETER NAME (JAPANESE) | ··· | INDEX | SUB-INDEX | DATA TYPE | MINIMUM SETTING VALUE | MAXIMUM SETTING VALUE |
|---|---|---|---|---|---|---|---|
| Auto-Tuning Mode | AUTO-TUNING SETTING | ··· | 0x3500 | 0x00 | 2-BYTE SIGNED INTEGER | 0 | 6 |
| Machine stiffness | MACHINE STIFFNESS SETTING | ··· | 0x3501 | 0x00 | 2-BYTE SIGNED INTEGER | 0 | 31 |
| Inertia ratio (%) | INERTIA RATIO (%) | ··· | 0x3502 | 0x00 | 2-BYTE SIGNED INTEGER | 0 | 10000 |

| VALUE DISPLAY FORMAT | OPTION ID | PARAMETER TYPE | CONTROL TYPE | NON-TUNABLE VALUE |
|---|---|---|---|---|
| OPTION | 3 | Mode | ComboBox | 0.5 |
| DECIMAL NUMBER | - | Tuning | TrackBar | - |
| DECIMAL NUMBER | - | Tuning | NumericUpDown | - |

FIG. 23

SLAVE EQUIPMENT A ALARM LIST

| MAIN NUMBER | SUB-NUMBER | ALARM MESSAGE (ENGLISH) | ALARM MESSAGE (JAPANESE) | ... | ALARM NUMBER DISPLAY CHARACTER STRING |
|---|---|---|---|---|---|
| 0x0010 | 0x0000 | main power supply undervoltage protection 1 | MAIN POWER SUPPLY UNDERVOLTAGE PROTECTION 1 | ... | [16-0] |
| 0x0010 | 0x0001 | main power supply undervoltage protection 2 | MAIN POWER SUPPLY UNDERVOLTAGE PROTECTION 2 | ... | [16-1] |
| 0x0011 | 0x0000 | over-voltage protection | OVERCURRENT PROTECTION | ... | [17-0] |
| 0x0012 | 0x0000 | over-heat protection | OVERHEAT PROTECTION | ... | [18-0] |
| 0x0013 | 0x0000 | position deviation excess protection | POSITION DEVIATION EXCESS PROTECTION | ... | [19-0] |
| 0x0014 | 0x0000 | speed deviation excess protection | SPEED DEVIATION EXCESS PROTECTION | ... | [20-0] |

FIG. 33

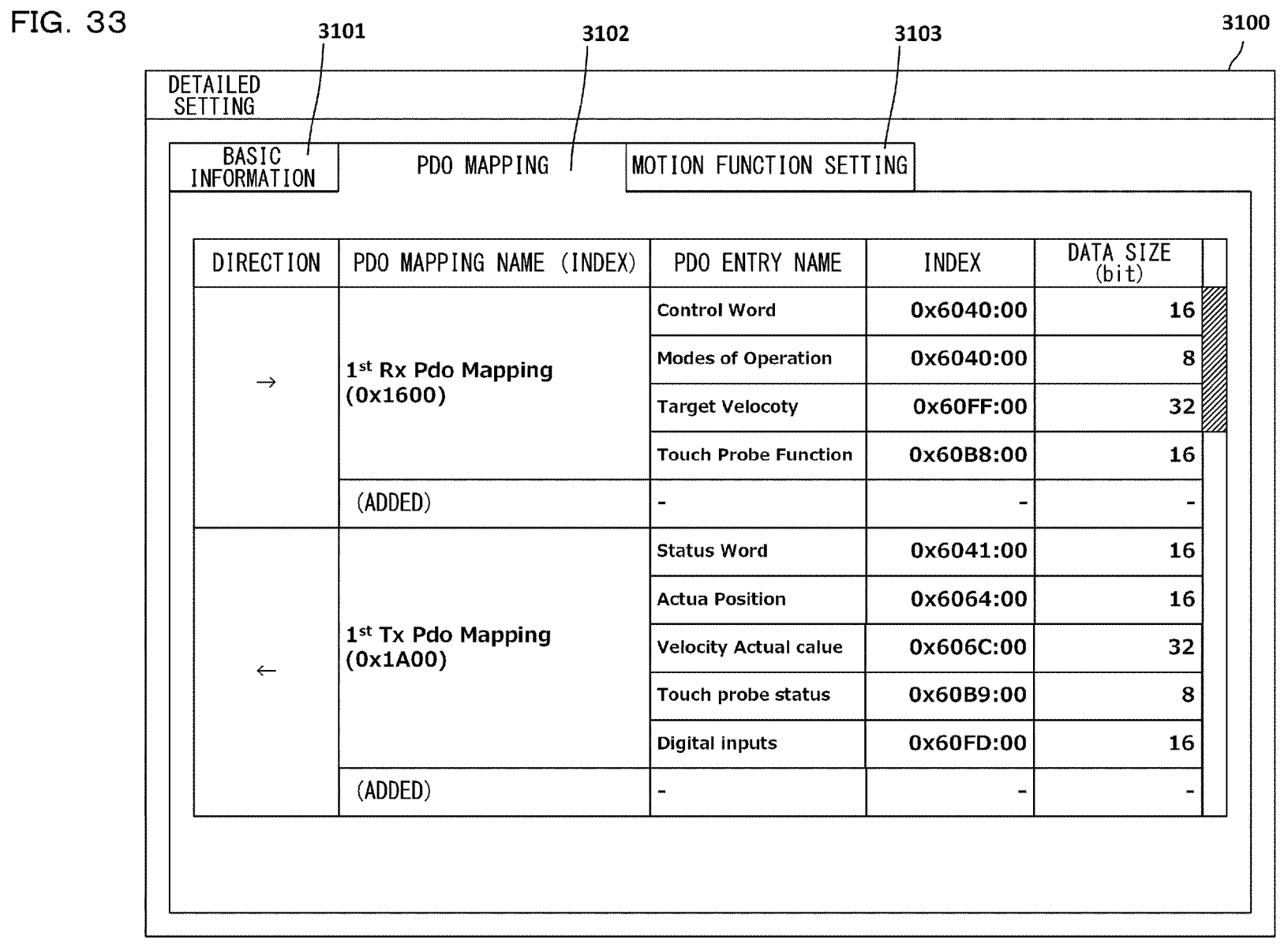

3100

DETAILED SETTING

BASIC INFORMATION (3101) | PDO MAPPING (3102) | MOTION FUNCTION SETTING (3103)

| DIRECTION | PDO MAPPING NAME (INDEX) | PDO ENTRY NAME | INDEX | DATA SIZE (bit) |
|---|---|---|---|---|
| → | 1st Rx Pdo Mapping (0x1600) | Control Word | 0x6040:00 | 16 |
| | | Modes of Operation | 0x6040:00 | 8 |
| | | Target Velocoty | 0x60FF:00 | 32 |
| | | Touch Probe Function | 0x60B8:00 | 16 |
| | (ADDED) | - | - | - |
| ← | 1st Tx Pdo Mapping (0x1A00) | Status Word | 0x6041:00 | 16 |
| | | Actua Position | 0x6064:00 | 16 |
| | | Velocity Actual calue | 0x606C:00 | 32 |
| | | Touch probe status | 0x60B9:00 | 8 |
| | | Digital inputs | 0x60FD:00 | 16 |
| | (ADDED) | - | - | - |

FIG. 34

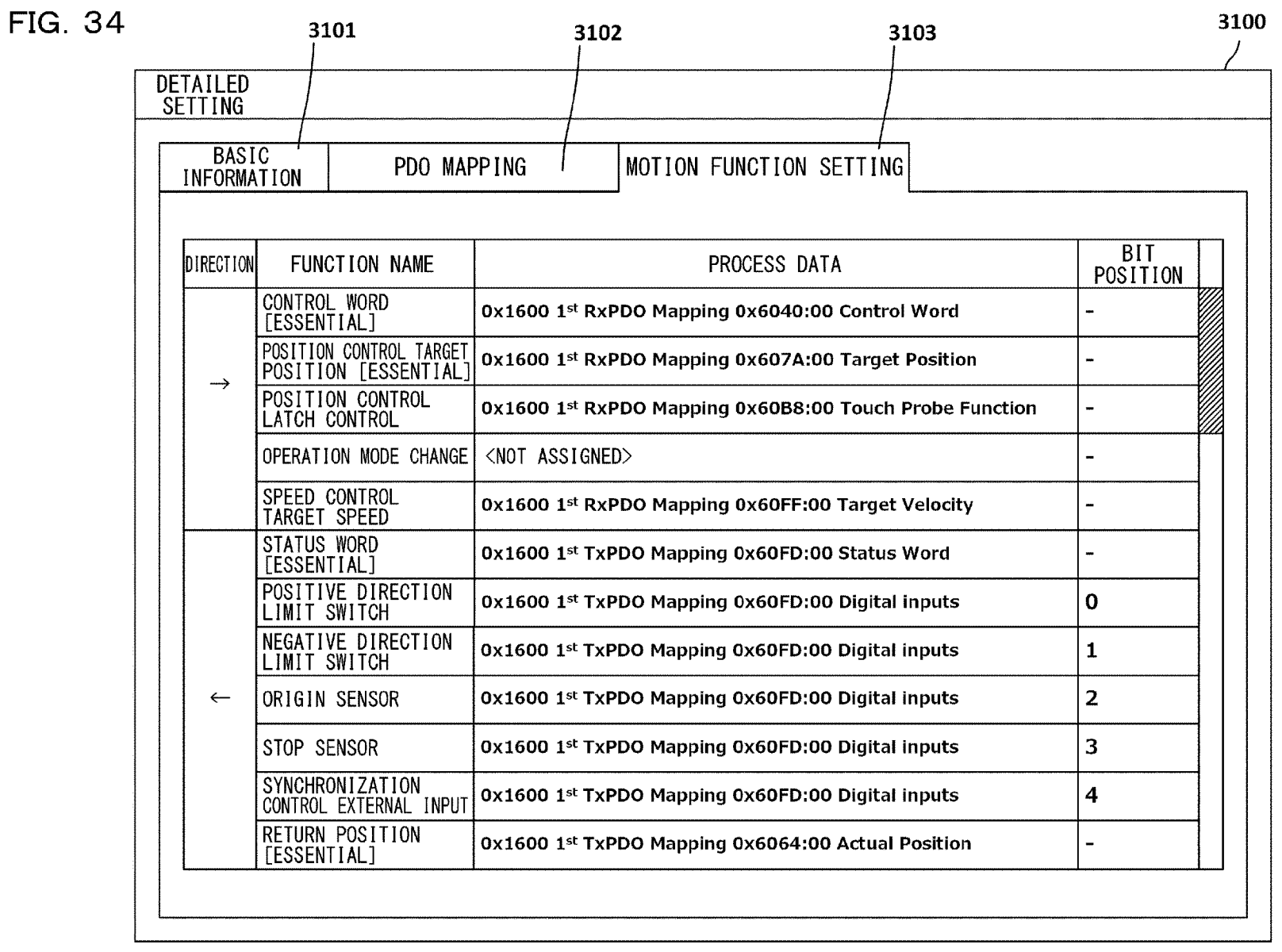

3100 3101 3102 3103

DETAILED SETTING

BASIC INFORMATION | PDO MAPPING | MOTION FUNCTION SETTING

| DIRECTION | FUNCTION NAME | PROCESS DATA | BIT POSITION |
|---|---|---|---|
| → | CONTROL WORD [ESSENTIAL] | **0x1600 1st RxPDO Mapping 0x6040:00 Control Word** | - |
| | POSITION CONTROL TARGET POSITION [ESSENTIAL] | **0x1600 1st RxPDO Mapping 0x607A:00 Target Position** | - |
| | POSITION CONTROL LATCH CONTROL | **0x1600 1st RxPDO Mapping 0x60B8:00 Touch Probe Function** | - |
| | OPERATION MODE CHANGE | <NOT ASSIGNED> | - |
| | SPEED CONTROL TARGET SPEED | **0x1600 1st RxPDO Mapping 0x60FF:00 Target Velocity** | - |
| ← | STATUS WORD [ESSENTIAL] | **0x1600 1st TxPDO Mapping 0x60FD:00 Status Word** | - |
| | POSITIVE DIRECTION LIMIT SWITCH | **0x1600 1st TxPDO Mapping 0x60FD:00 Digital inputs** | 0 |
| | NEGATIVE DIRECTION LIMIT SWITCH | **0x1600 1st TxPDO Mapping 0x60FD:00 Digital inputs** | 1 |
| | ORIGIN SENSOR | **0x1600 1st TxPDO Mapping 0x60FD:00 Digital inputs** | 2 |
| | STOP SENSOR | **0x1600 1st TxPDO Mapping 0x60FD:00 Digital inputs** | 3 |
| | SYNCHRONIZATION CONTROL EXTERNAL INPUT | **0x1600 1st TxPDO Mapping 0x60FD:00 Digital inputs** | 4 |
| | RETURN POSITION [ESSENTIAL] | **0x1600 1st TxPDO Mapping 0x6064:00 Actual Position** | - |

FIG. 35

3500

| VENDOR ID | PRODUCT CODE | REVISION NUMBER | PDO SETTING | MOTION FUNCTION SETTING | RECOMMENDED VALUE |
|---|---|---|---|---|---|
| 0541 (COMPANY AAA) | 0001 | 1.0 | 6040:00 (INPUT)<br>607A:00 (INPUT)<br>6041:00 (OUTPUT)<br>6064:00 (OUTPUT) | CONTROL WORD = 6040:00<br>TARGET POSITION = 607A:00<br>STATE WORD = 6040:00<br>CURRENT POSITION = 607A:00 | LIMIT SWITCH (3040:00) = ENABLED<br>MOTOR ROTATION DIRECTION (3041:00) = FORWARD ROTATION |
| 1234 (COMPANY BBB) | 0001 | 1.0 | 6040:00 (INPUT)<br>607A:00 (INPUT)<br>60FF:00 (INPUT)<br>6041:00 (OUTPUT)<br>6064:00 (OUTPUT) | CONTROL WORD = 6040:00<br>TARGET POSITION = 607A:00<br>TARGET SPEED = 60FF:00<br>STATE WORD = 6040:00<br>CURRENT POSITION = 607A:00 | LIMIT SWITCH (3040:00) = DISABLED<br>MOTOR ROTATION DIRECTION (3041:00) = REVERSE ROTATION<br>INPUT TERMINAL 1 (3042:00) = CONTACT POINT A |

⋮

SETTING SUPPORT APPARATUS, CONTROL METHOD, AND PROGRAM

CROSS-REFERENCE TO RELATED APPLICATIONS

The present application claims foreign priority based on Japanese Patent Application No. 2023-084145, filed May 22, 2023, and No. 2024-005190, filed Jan. 17, 2024, the contents of which are incorporated herein by references.

BACKGROUND OF THE INVENTION

1. Technical Field

The present invention relates to a setting support apparatus, a control method, and a program.

2. Description of the Related Art

In factory automation, a programmable logic controller (PLC) is a core controller that controls industrial machines. Most of the industrial machines drive various loads using a motor as a drive source.

The PLC communicates with a motor driving apparatus (hereinafter, referred to as a motor driver) to drive a motor connected to the motor driver as described in JP 2015-012025 A.

In general, it is recommended that a manufacturer of the PLC and a manufacturer of the motor driver coincide, but there is a case where a user owns a motor driver manufactured by another manufacturer, and desires to connect the motor driver to the PLC. In this case, the PLC and the plurality of motor drivers manufactured by mutually different manufacturers are used together. The PLC controls the motor by communicating with the motor driver, and needs to know a communication protocol and a format of a communication signal at that time. For example, the PLC needs to know what kind of information is mounted on which bit of the communication signal. However, this is difficult when the manufacturer of the motor driver and the manufacturer of the PLC are different. For example, the user needs to refer to a manual of the PLC and a manual of the motor driver to make appropriate settings of the motor driver such that the motor driver meets specifications of the PLC. In particular, in order for a trial operation of the motor through the motor drivers, a minimum control parameter that needs to be set and a recommended value thereof are different for each of the motor drivers or for each of the manufacturers, and thus, it is difficult for the user to use the PLC and the motor drivers of different manufacturers together.

SUMMARY OF THE INVENTION

Therefore, an object of the present invention is to make it easier to set up a PLC and a motor driver as compared with the related art.

A setting support apparatus that supports setting of a PLC system including a programmable logic controller that functions as a master in cyclic communication and a motor driving apparatus that functions as a slave in the cyclic communication and drives a motor based on motor control data transferred from the master by the cyclic communication, the setting support apparatus including:

- a configuration editing unit that selects any motor driving apparatus from among a plurality of the motor driving apparatuses each of which is specified based on vendor specifying information and product specifying information, and sets the selected motor driving apparatus as the slave to the programmable logic controller functioning as the master;
- a storage unit that stores assignment information associated with the vendor specifying information and a plurality of pieces of the product specifying information, the assignment information including mapping information for mapping a data object, handled by the motor driving apparatus as a communication target of the cyclic communication, and a recommended value (limit disabling ON, Contact point a, Contact point b, or the like) of a setting parameter for the motor driving apparatus; and
- a configuration setting unit that sets mapping of a data object transferred from the master by the cyclic communication based on the mapping information, included in the assignment information corresponding to a combination of the vendor specifying information and the product specifying information of the motor driving apparatus set for the programmable logic controller by the configuration editing unit, and sets the recommended value of the setting parameter included in the assignment information for the motor driving apparatus to be written to the motor driving apparatus by the master through message communication.

According to the present invention, the PLC and the motor driver can be set up more easily as compared with the related art.

BRIEF DESCRIPTION OF THE DRAWINGS

FIG. 7 is a view illustrating a parameter list for forming slave equipment information;

FIG. 8 is a view illustrating an option list for forming slave equipment information;

FIG. 9 is a view illustrating an operation sequence list for forming slave equipment information;

FIG. 17 is a view illustrating a parameter list for forming slave equipment information;

FIG. 21 is a view illustrating a parameter list for tuning;

FIG. 23 is a view illustrating an alarm list;

FIG. 33 is a view illustrating the detailed setting screen;

FIG. 34 is a view illustrating the detailed setting screen;

FIG. 35 is a view illustrating assignment information;

DETAILED DESCRIPTION

Figure 1:
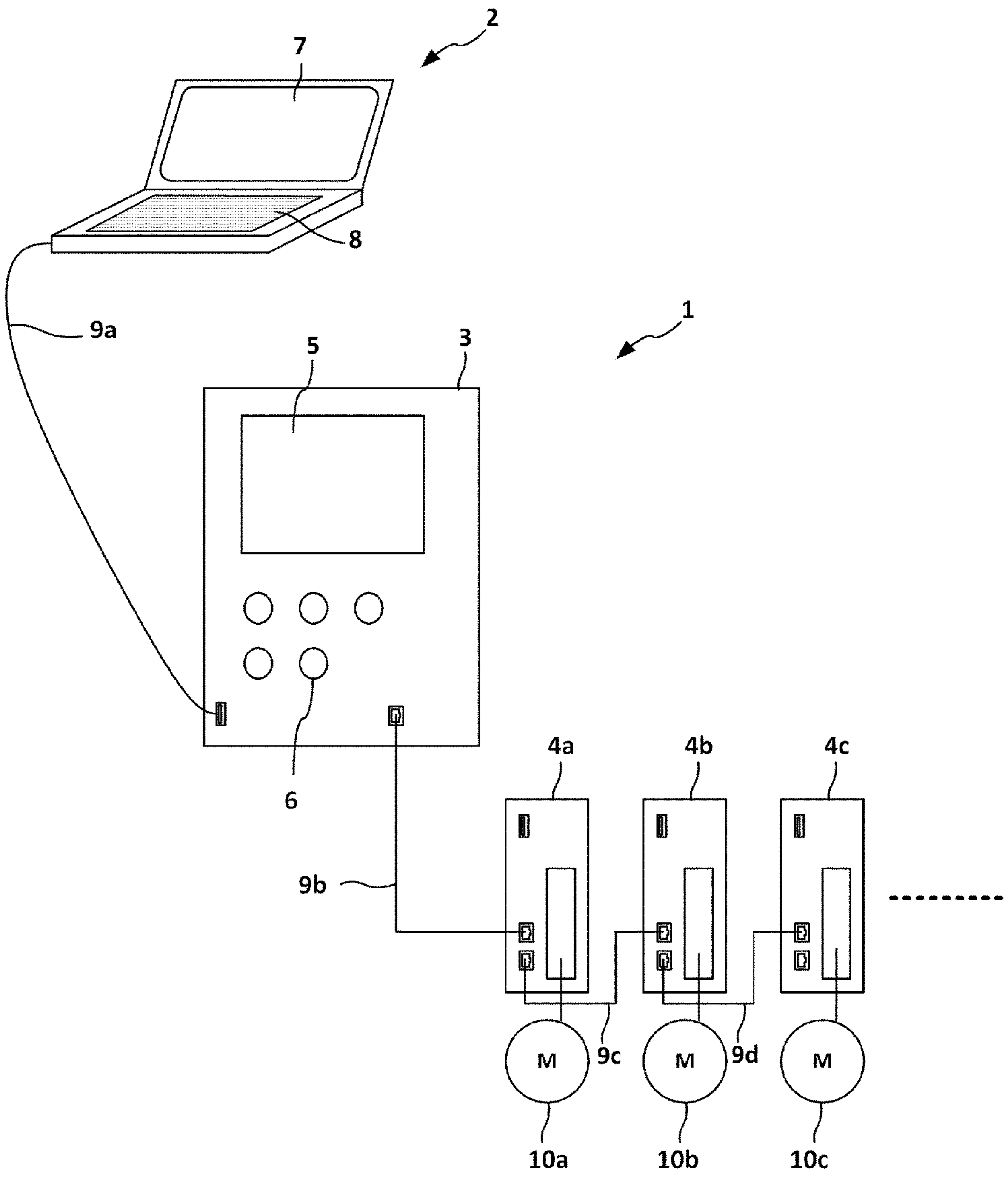
FIG. 1 is a diagram illustrating a PLC system.

Hereinafter, an embodiment will be described in detail with reference to the accompanying drawings. Note that the following embodiment does not limit the invention according to the claims, and all combinations of characteristics described in the embodiment are not necessarily essential for the invention. Two or more characteristics of the plurality of characteristics described in the embodiment may be arbitrarily combined. Further, the same or similar configurations are denoted by the same reference numerals, and redundant description will be omitted.

<PLC System>

FIG. 1 illustrates a configuration example of a programmable logic controller system (hereinafter, referred to as a PLC system 1) according to the embodiment of the present invention. As illustrated in FIG. 1, the PLC system 1 includes: a PC that is a setting support apparatus configured to edit a user program such as a ladder program; a basic unit 3 that is a programmable logic controller (PLC) configured for integrated control of various control apparatuses installed in a factory or the like; and a plurality of motor drivers 4*a* to 4*c*. The plurality of motor drivers 4*a* to 4*c* drive motors 10*a*, 10*b*, and 10*c*, respectively.

The user program created by the PC 2, which is the setting support apparatus, may be created using a graphical programming language such as a ladder language or a flowchart-format motion program, or may be created using a high-level programming language such as C language.

In the PLC system 1, one or a plurality of extension units (for example, an I/O unit, an analog input unit, an analog output unit, a communication unit, and the like) are connected to the basic unit 3. The basic unit 3 is sometimes also referred to as a CPU unit.

The basic unit 3 includes a display part 5 and an operation part 6. The display part 5 can display operation statuses of the motor drivers 4*a* to 4*c*. The display part 5 may switch a display content according to an operation content of the operation part 6. The display part 5 normally displays a current value (device value) of a device in the PLC system 1, information on an error (presence or absence of an alarm or warning) occurring in the PLC system 1, and the like. The device is a name indicating an area on a memory provided to store a device value (device data), and may be referred to as a device memory. The device value is information indicating an input state from input equipment, an output state to output equipment, or a state of an internal relay (auxiliary relay), a timer, a counter, a data memory, or the like set on the user program. Types of the device value include a bit type and a word type. The bit device stores a 1-bit device value. A word device stores a device value of one word.

The motor drivers 4*a* to 4*c* are prepared to extend functions of the PLC system 1. The motors 10*a* to 10*c* are controlled by the motor drivers 4*a* to 4*c*, respectively. The motor drivers 4*a* to 4*c* supply electric power to the motors 10*a* to 10*c*, and control a rotation amount and the like according to a command from the basic unit 3. Examples of the motors 10*a* to 10*c* include a servo motor, a stepping motor, and the like.

The PC 2 is a computer that provides a development environment of the PLC system 1. The PC 2 is, for example, a portable notebook type or tablet type personal computer, and includes a display part 7 and an operation part 8. The ladder program, which is an example of the user program configured to control the PLC system 1, is created using the PC 2. The created ladder program is converted into a mnemonic code in the PC 2. The PC 2 is connected to the basic unit 3 of the PLC system 1 via a communication cable 9*a* such as a universal serial bus (USB), and sends the ladder program converted into the mnemonic code to the basic unit 3. The basic unit 3 converts the ladder program into a machine code and stores the machine code in a memory provided in the basic unit 3. Note that the mnemonic code is transmitted to the basic unit 3 here, the present invention is not limited thereto. For example, the PC 2 may convert the mnemonic code into an intermediate code, and send the intermediate code to the basic unit 3.

Note that the operation part 8 of the PC 2 may include a pointing device such as a mouse connected to the PC 2 although not illustrated in FIG. 1. Further, the PC 2 may be configured to be detachably connected to the basic unit 3 via another communication cable 9*a* other than the USB. Further, the PC 2 may be wirelessly connected to the basic unit 3 without using the communication cable 9*a*. In this case, the communication cable 9*a* may be understood to represent a wireless link.

The basic unit 3 and the motor driver 4*a* are connected by a communication cable 9*b*, and can perform communication (for example, cyclic communication and message communication) with each other via the communication cable 9*b*. The motor driver 4*a* and the motor driver 4*b* are connected by a communication cable 9*c*, and can communicate with each other via the communication cable 9*c*. The motor driver 4*b* can communicate with the basic unit 3 via the communication cables 9*b* and 9*c*. The motor driver 4*b* and the motor driver 4*c* are connected by a communication cable 9*d*, and can communicate with each other via the communication cable 9*d*. Further, the motor driver 4*c* can communicate with the basic unit 3 via the communication cables 9*b*, 9*c*, and 9*d*.

Although the motor drivers 4*a* to 4*b* are connected in this example, the number of motor drivers 4 may be one or more. Manufacturers of the motor drivers 4*a* to 4*c* may be different from each other or the same. Here, it is assumed that the motor drivers 4*a* to 4*c* are manufactured by different manufacturers, respectively, for convenience of description.

Hereinafter, the motor drivers 4*a* to 4*c* are expressed as motor drivers 4 when common matters are described. Similarly, the motors 10*a* to 10*c* are expressed as motors 10 when common matters are described.

<Setting Support Apparatus>

Figure 2:
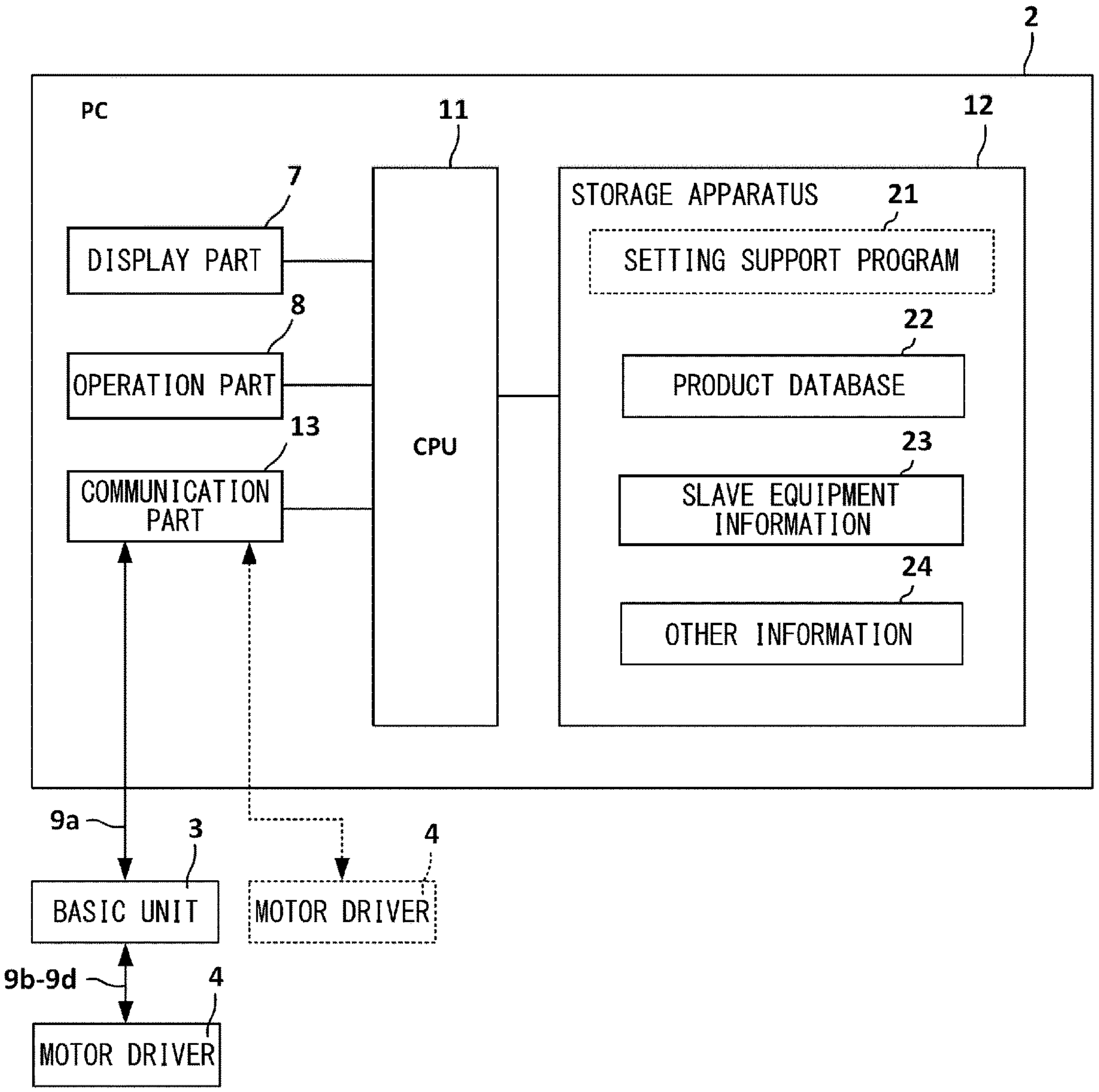
FIG. 2 is a diagram illustrating a setting support apparatus.

FIG. 2 is a block diagram illustrating an electrical configuration of the PC 2. As illustrated in FIG. 2, the PC 2 includes a CPU 11, the display part 7, the operation part 8, a storage apparatus 12, and a communication part 13. The display part 7, the operation part 8, the storage apparatus 12, and the communication part 13 are electrically connected to the CPU 11. The storage apparatus 12 includes a RAM, a ROM, an HDD, and an SSD, and may further include a detachable memory card. The CPU is an abbreviation for central processing unit. The ROM is an abbreviation for read-only memory. The RAM is an abbreviation for random access memory. The HDD is an abbreviation for hard disk drive. The SSD is an abbreviation of solid state drive.

A user of the PC 2 causes the CPU 11 to execute a setting support program 21 stored in the storage apparatus 12 to edit project data through the operation part 8, to execute setting of each of the motor drivers 4, and to acquire alarm information from each of the motor drivers 4 and display the alarm information on the display part 7. The PC 2 may also be referred to as an engineering tool. The project data includes one or more user programs (for example, ladder programs) and configuration information of the basic unit 3, the motor drivers 4, and the motors 10. The configuration information is information indicating connection positions of the plurality of motor drivers 4 with the basic unit 3 and functions (for example, a communication function and a positioning function) provided in the basic unit 3, information indicating functions of the motor drivers 4, and device allocation information. Here, the editing of project data includes creating and changing (re-editing) of project data. The user reads the project data stored in the storage apparatus 12 as necessary, and changes the project data using the setting support program 21. The communication part 13 communicates with the basic unit 3 via a communication cable 9*a*. The CPU 11 transfers the project data to the basic unit 3 via the communication part 13. The communication part 13 includes a communication circuit capable of executing communication conforming to a USB standard, a communication circuit that performs wired LAN communication, a communication circuit that performs wireless LAN communication, and the like. The communication part 13 may communicate with the motor drivers 4 via a communication cable. The communication part 13 transmits, for example, a parameter read request or a read or write request, an alarm detail acquisition request, and the like to the basic unit 3. Note that a communication protocol between the PC 2 and the basic unit 3 may be a general-purpose protocol or a unique protocol. Meanwhile, a frame format includes information for the basic unit 3 to make various requests to the motor drivers 4 via Industrial Ethernet. Further, the communication part 13 can execute cyclic communication and message communication.

The basic unit 3 is referred to as master equipment. The motor driver 4 is an example of slave equipment. A product database 22 includes identification information (a vendor ID, a product code, a revision number) for identifying the slave equipment connected to the basic unit 3. The vendor ID is unique identification information (vendor specifying information) of a manufacturer (vendor) that manufactures the slave equipment. The product code is identification information (product specifying information or product identification information) that is unique to the vendor and is allocated to distinguish different pieces of slave equipment provided by the same vendor. The revision number is identification information allocated to distinguish the same revision of the slave equipment. The product database 22 may be input by the user through the operation part 8, or may be acquired from the slave equipment by communicating with the slave equipment via the basic unit 3 and stored in the storage apparatus 12.

Further, the CPU 11 may store the product database 22 of the slave equipment in the storage apparatus 12 in association with a connection position of the slave equipment designated through the operation part 8. This may be managed as configuration information (other information 24) that is a part of the project data.

Slave equipment information 23 includes various pieces of information related to the slave equipment (for example, the motor driver 4). The slave equipment information 23 may include slave equipment-specific information, parameter information, and alarm information. The slave equipment-specific information may include product specifying information (a vendor ID, a product code, and a revision number) registered in the product database 22, information indicating whether equipment that explicitly requires a write operation with respect to a nonvolatile memory after parameter reflection, information indicating how to acquire an alarm detail code, and the like. The parameter information may include a parameter list, an option list, and an operation sequence list, and details of these will be described later. The alarm information may include an alarm list, and details thereof will be described later.

The slave equipment information 23 may be provided as a part of the development environment (the setting support program 21). The slave equipment information 23 may be downloaded from a website of a vendor. The slave equipment information 23 may be provided through a recording medium that can be carried.

In this manner, the storage apparatus 12 functions as an assignment information storage unit that stores the slave equipment information 23 as assignment information in association with the slave equipment. The slave equipment (the motor driver 4) is specified based on the vendor ID, the product code, and the revision number (the product specifying information/product identification information). For the slave equipment, there are a plurality of setting parameters. Among the plurality of setting parameters, there are a plurality of adjustment-recommended parameters for which adjustment is recommended so as to operate the slave equipment to adapt to the master equipment (the basic unit 3). Thus, the slave equipment information 23 is information for assigning the product specifying information (product identification information) of the slave equipment and the plurality of adjustment-recommended parameters.

<Basic Unit (Master Equipment)>

Figure 3:
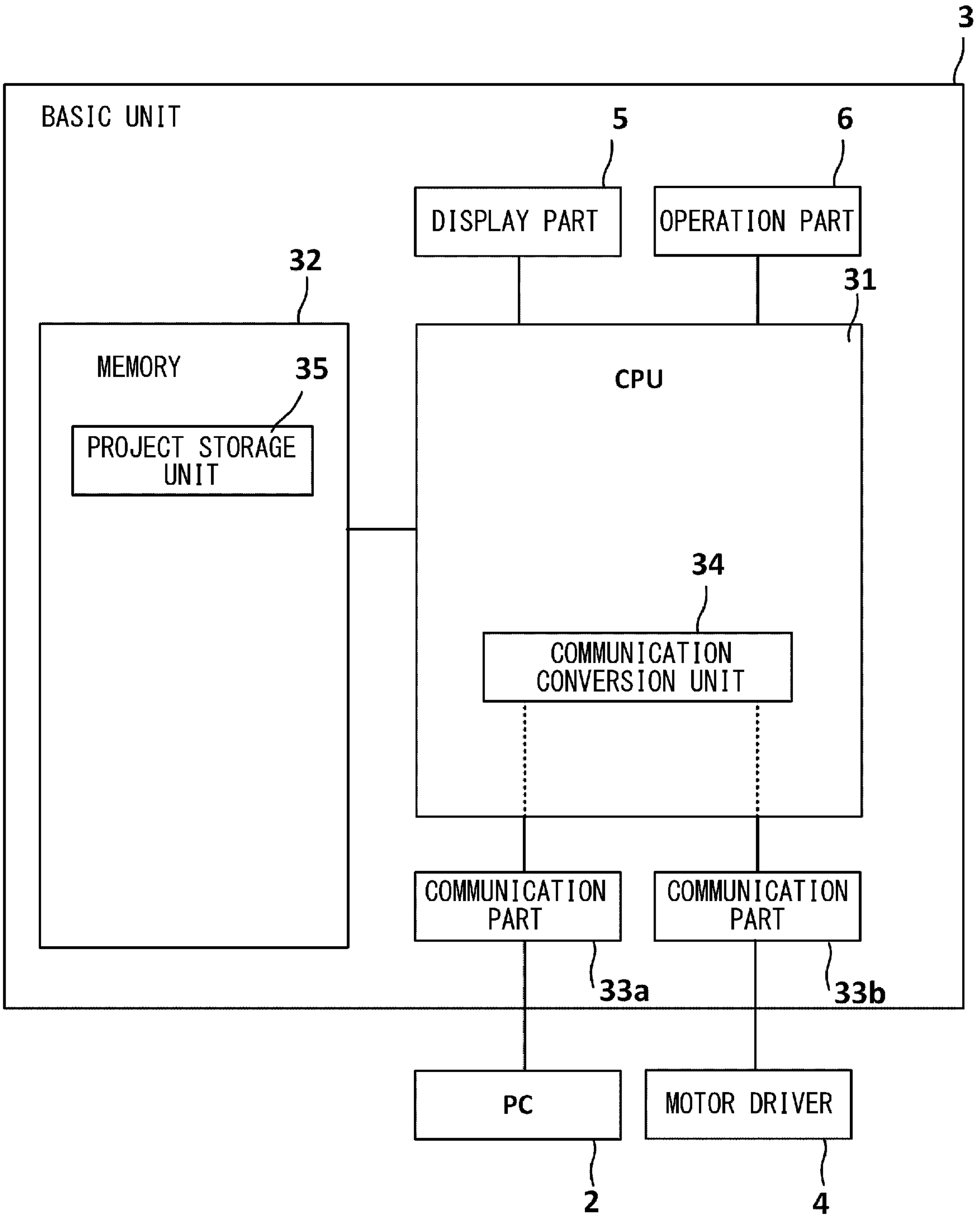
FIG. 3 is a diagram illustrating a basic unit.

FIG. 3 illustrates a hardware configuration of the basic unit 3. The CPU 31 writes information in a memory 32 and reads information from the memory 32. The memory 32 includes a RAM, a ROM, an HDD, and an SSD, and may further include a detachable memory card. The project storage unit 35 is a ROM area that stores the project data created and transferred by the PC 2. The project data includes the user program, the configuration information, and the like. Furthermore, the CPU 31 receives an input of information from the operation part 6. The CPU 31 displays various information on the display part 5.

The CPU 31 is connected to the PC 2 via a communication part 33*a*, and is connected to the motor driver 4 via a communication part 33*b* to perform communication. The communication part 33*a* is, for example, a communication circuit compatible with a USB. The communication part 33*b* is a communication circuit capable of executing communication compatible with a protocol of Industrial Ethernet (for example, EtherCAT, EtherNet/IP, PROFINET, and MECHATROLINK-III). Further, the communication parts 33*a* and 33*b* can execute cyclic communication and message communication. A communication conversion unit 34 is a function implemented by the CPU 31, and converts and relays a communication signal between the PC 2 and the motor driver 4. For example, the communication conversion unit 34 converts a request from the PC 2 to the motor driver 4 so as to conform to the protocol of Industrial Ethernet, and transmits the request to the motor driver 4 as a proxy of the PC 2. The communication conversion unit 34 converts a response from the motor driver 4 so as to conform to the communication protocol between the PC 2 and the basic unit 3, and transfers the response to the PC 2.

<Motor Driver (Slave Equipment)>

Figure 4:
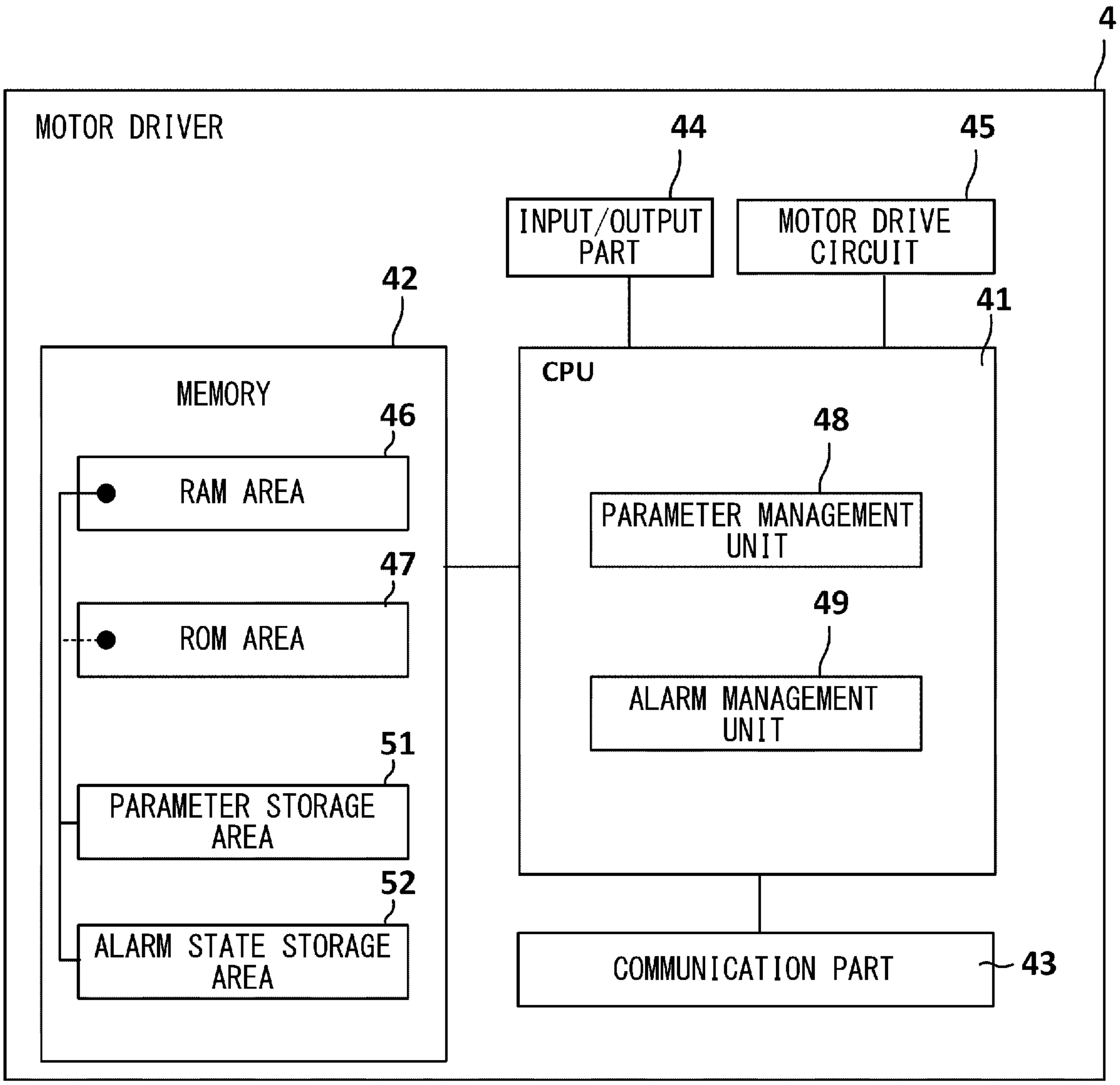
FIG. 4 is a diagram illustrating a motor driver.

FIG. 4 illustrates a hardware configuration of the motor driver 4. The CPU 41 writes information in a memory 42 and reads information from the memory 42. The memory 42 includes a RAM, a ROM, an HDD, and an SSD, and may further include a detachable memory card. The memory 42 includes a RAM area 46 and a ROM area 47.

The CPU 41 communicates with the basic unit 3 and the other motor drivers 4 via a communication part 43. The communication part 43 is a communication circuit capable of executing communication compatible with a protocol of Industrial Ethernet (for example, EtherCAT, EtherNet/IP, PROFINET, and MECHATROLINK-III). The communication part 43 can execute cyclic communication and message communication. Motor control data is transmitted from the basic unit 3 by the cyclic communication.

An input/output part 44 includes an input terminal and an input circuit to which a limit switch or the like is connected, and an output circuit and an output terminal that output information to the outside. A motor drive circuit 45 supplies electric power for driving the motor 10 and a control signal to the motor 10. Note that the electric power to the motor 10 may be supplied from an external power supply.

The CPU 41 includes a parameter management unit 48 and an alarm management unit 49. The parameter management unit 48 stores and manages various parameters necessary for control of the motor 10 in a parameter storage area 51. The parameter management unit 48 may be ensured in any one or both of the RAM area 46 and the ROM area 47. The alarm management unit 49 stores and manages an alarm state of the motor driver 4 in an alarm state storage area 52. The alarm state storage area 52 is ensured in the RAM area 46.

<Functions of CPU 11 in PC 2>

Figure 5:
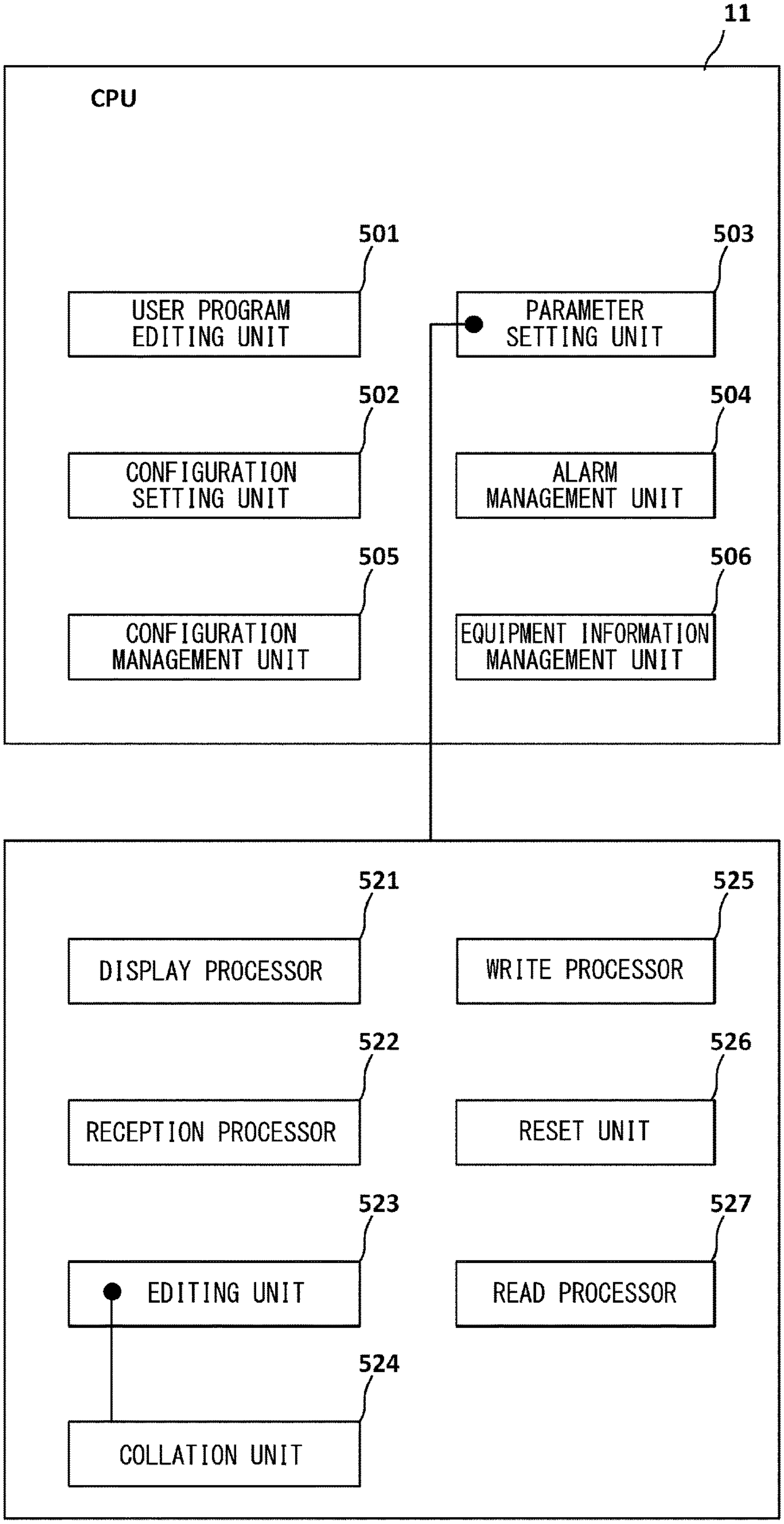
FIG. 5 is a diagram illustrating functions of a CPU.

FIG. 5 illustrates functions implemented by the CPU 11 executing the setting support program 21.

A user program editing unit 501 displays a UI for editing the user program executed by the basic unit 3 on the display part 7, receives editing of the user program through the UI, and creates the user program. A configuration setting unit 502 creates configuration information indicating product information, connection positions, and the like of the basic unit 3, the motor driver 4, and the motor 10 constituting the PLC system 1. For example, the configuration setting unit 502 displays a product list on the display part 7, and drops a product selected from the product list on the UI to arrange the product at the dropped position. For example, an icon imitating the basic unit 3 is displayed on the UI, and configuration information indicating that the motor driver 4*a* is connected next to the basic unit 3 is created by dropping an icon of the motor driver 4*a* next to the icon of the basic unit 3. Further, configuration information indicating that the motor driver 4*b* is connected next to the motor driver 4*a* is created by dropping an icon of the motor driver 4*b* next to the icon of the motor driver 4*a*. In this manner, types of the master equipment and the plurality of pieces of slave equipment and connection positions are specified by the configuration setting unit 502 and managed by the configuration information.

A parameter setting unit 503 sets a plurality of parameters used to control the basic unit 3 and the motor driver 4. An alarm management unit 504 acquires the alarm information generated in the basic unit 3 or the motor driver 4 and displays the alarm information on the display part 7.

A configuration management unit 505 manages the product database 22. An equipment information management unit 506 manages the slave equipment information 23.

The parameter setting unit 503 includes a display processor 521 in charge of display processing of a user interface (UI), a reception processor 522 that receives a user input through the UI, an editing unit 523 in charge of editing a parameter value, and a write processor 525 that transfers and writes the edited parameter to the slave equipment. The editing unit 523 can read a current value of the parameter written in the slave equipment at that time through a read processor 527. A collation unit 524 may collate a parameter value displayed on a parameter setting screen with the current value and display a collation result on the display part 7. A reset unit 526 remotely turns on the power of (activates) the slave equipment again, or remotely initializes a setting of the slave equipment to a factory setting. The write processor 525 may instruct the slave equipment to write a parameter held in a volatile memory into the non-volatile memory.

<Parameter Setting Screen>

Figure 6:
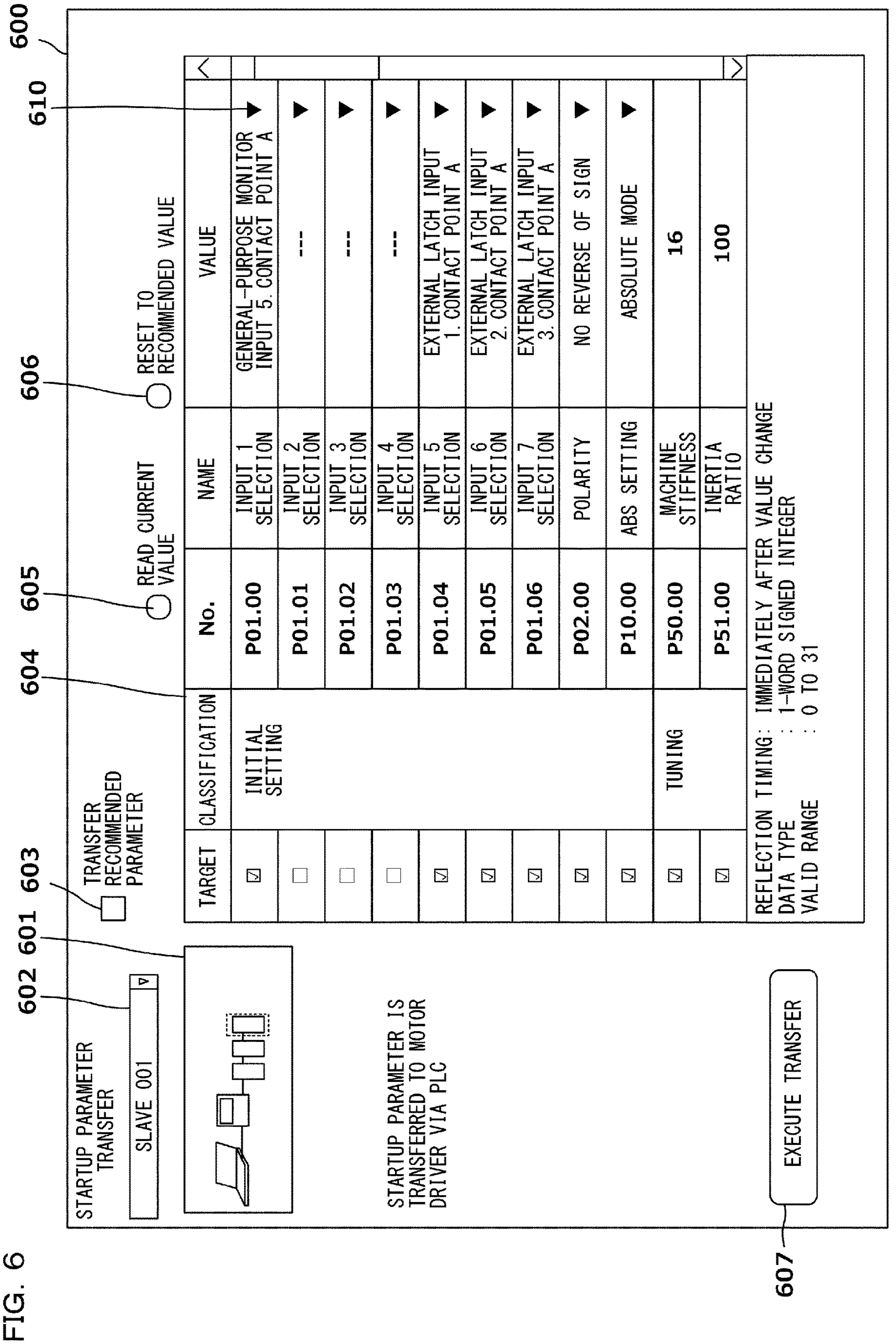
FIG. 6 is a view illustrating a parameter setting screen.

FIG. 6 illustrates a UI 600 displayed on the display part 7 by the parameter setting unit 503. The UI 600 is a user interface configured to set and transfer a parameter necessary for startup of the PLC system 1. A configuration display part 601 shows a configuration of the PLC system 1 set through the configuration setting unit 502. An equipment selection part 602 displays a list (pull-down menu) for selecting setting target equipment, and receives selection of the equipment. When the equipment is selected through the equipment selection part 602, the configuration display part 601 highlights an icon of the selected equipment. In this example, the icon of the selected equipment is surrounded by a frame line on a broken line. A check box 603 is a button that is checked when a recommended parameter prepared in advance is transferred. A value setting part 604 is a UI configured to select a parameter to be transferred to the selected equipment and set a value of the parameter. Note that the pull-down menu may be referred to as a drop-down list or a combo box.

A current value read button 605 is a button for reading a value of a parameter set at that time for the selected equipment from the selected equipment through the PLC system 1 and reflecting the value in the value setting part 604. A recommended value reset button 606 is a button for overwriting the value set in the parameter with a recommended value. The recommended value of each parameter is stored in advance in the storage apparatus 12. For example, the recommended value may be a part of the slave equipment information 23.

A transfer execution button 607 is a button for instructing the equipment selected by the equipment selection part 602 to transfer a parameter selected by the value setting part 604. As a result, the parameter is written into the slave equipment.

Meanwhile, the parameter information includes the parameter list, the option list, and the operation sequence list. The parameter list is a list of parameters that can be set to transfer target slave equipment through the parameter setting screen (the UI 600). The number of the parameters that can be set to the slave equipment is several hundred in a case where the number is large. However, the number of parameters generally used by many users is about ten to several tens. Therefore, the parameter list is narrowed down to a parameter that needs to be set or a parameter that is generally used by many users. This reduces complexity of the parameter setting screen. The parameters included in the parameter list are, for example, as follows.

(a) Parameters that need to be set in advance in accordance with recommended settings on master equipment side (for example, input assignment and polarity)

(b) Parameters that are controlled by PLC system 1 and need to be set in accordance with mechanical configuration of user (load driven by motor 10) (for example, rotation direction of motor 10)

(c) Parameters that are controlled by PLC system 1 and need to be adjusted (tuned) in accordance with to mechanical configuration of user (load driven by motor 10) (for example, machine stiffness and inertia ratio)

Meanwhile, as a method for setting a value in the value setting part 604, for example, there are a method of directly inputting a value and a method of selecting a value from a pull-down menu 610. A display format of the value may be any of a binary number, a decimal number, and a hexadecimal number.

(1) Parameter List

FIG. 7 illustrates an example of the parameter list. A display order indicates a display order of the parameters in the list displayed on the value setting part 604. A category indicates a parameter category (for example, initial setting and tuning). The category is a category unified among various types of slave equipment. Thus, even when a user uses a plurality of pieces of slave equipment of different vendors, the user can easily understand which parameter should be set and adjusted at which timing. A parameter number name is a name in accordance with a display format of a parameter number of each slave equipment. As the parameter number name, a different notation ("xx.xx", "(xx-xx)", "Pxx.xx", or the like) is used for each slave equipment, and generally, this is a name prepared by a vendor. Therefore, when the parameter number name is directly used on the parameter setting screen, it is possible to reduce the user's confusion by using. A parameter name is a name of a parameter of each slave equipment. The parameter name may support multiple languages. In this case, the parameter name is displayed in a language conforming to a display language of a PLC development environment on the parameter setting screen. An index and a sub-index are indexes designated on the slave equipment side when each parameter is written or read. The index normally exists in any communication protocol, but whether the sub-index exists depends on a protocol of Industrial Ethernet.

A data type indicates a data type of the parameter. The data type is necessary as information (data size) designated in communication of a write or read request. A minimum setting value and a maximum setting value indicate a range of a value that can be set for the parameter. The minimum setting value and the maximum setting value do not necessarily coincide with a range of the data type. The minimum setting value and the maximum setting value are provided such that the user does not input a value outside the set range. Further, the minimum setting value and the maximum setting value may be used in error processing when a value outside the set range is input. A default value is a value (initial value) defined by a vendor of slave equipment and set at the time of factory shipment. "Whether it is necessary to turn on power again for reflection" is used for attention-calling display on the parameter setting screen. If it is "TRUE", a change value is not reflected in the slave equipment unless the power is turned on again. "FALSE" means that the change is reflected immediately. A value display format/option ID indicates a display format of a value on the parameter setting screen. The display format may be a format designated by a vendor of the slave equipment, or may be a format that is easy for the user to understand (for example, binary number display, decimal number display, hexadecimal number display, option display, and the like). In the case of the option display, there is an ID (option ID) indicating which option list of the "option list" to be described later is used.

(2) Option List

FIG. 8 illustrates an example of the option list. The option list is a list of options for values of parameters for which the "value display format" is set to the option display among the plurality of parameters included in the parameter list. A parameter in the option list and a parameter in the parameter list are associated with each other via using option ID.

A display order indicates a display order of options in a pull-down menu operated when a value of a parameter is edited on the parameter setting screen. The value is a value corresponding to each option. The slave equipment is requested to write this value. A display wording is a wording of each option. The display wording may also support multiple languages. On the parameter setting screen, the display wording is displayed in a language corresponding to the display language of the PLC development environment.

(3) Operation Sequence List

FIG. 9 illustrates an example of the operation sequence list. The operation sequence list indicates any sequence in which writing and reading of parameters needs to be performed when a predetermined operation is performed on the slave equipment. Examples of the predetermined operation include the following.

(a) Execution of writing into volatile memory (b) Software reset (turning on power again)

(c) Absolute encoder reset (d) Initialization of all parameters (parameter reset to factory shipment state)

In FIG. 9, an operation type ID is a number or a wording for specifying an operation type. "Is slave equipment compatible?" indicates whether the slave equipment is compatible with the operation type. An execution condition indicates a timing at which the slave equipment can execute the operation. For example, "always", "other than motor control", "servo OFF", or the like is adopted as the execution condition. The execution condition is sometimes used as data used for an error notification when the operation is executed at an inexecutable timing. A sequence is a parameter existing in the case of the slave equipment compatible with the operation, and either "write" or "standby" is set. "Write" refers to writing a value corresponding to a data size with respect to an index or a sub-index. "Standby" refers to reading a value corresponding to a data size with respect to the index or the sub-index. For example, reading is repeated until a read value coincides with a designated value. As a condition, “wait until reaching designated value” or “wait until reaching value other than designated value” is set.

According to FIG. 9, write (#EEPROM_WRITE) into the nonvolatile memory is executed in a sequence of writing a value of 0x12345678 to a parameter of 0x1010:00 with a data size of 4 bytes, then repeating read (with a data size of 4 bytes) of a value of the parameter of 0x1010:00, and completing the write when it can be confirmed that the value becomes 0x00000001.

(4) Flowchart

Figure 10:
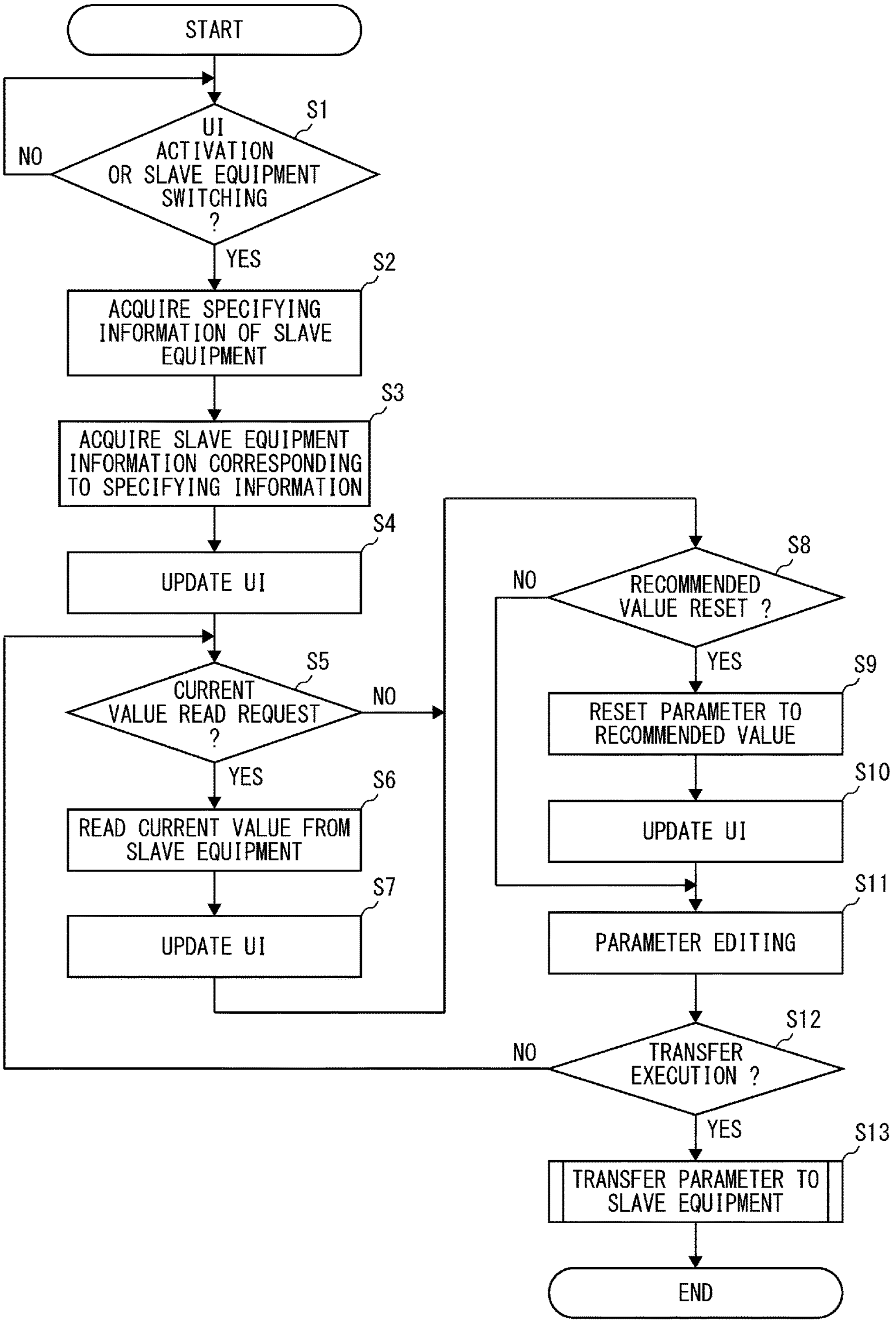
FIG. 10 is a flowchart illustrating a parameter editing process.

FIG. 10 is a flowchart illustrating a parameter setting method executed by the CPU 11. The CPU 11 executes the following processing according to the setting support program 21. (The parameter setting unit 503) refers to, for example, the slave equipment information 23 of slave equipment connected next to the basic unit 3, creates the UI 600, and displays the UI 600 on the display part 7. For example, an initial value included in the slave equipment information 23 may be set to each of parameters in the UI 600.

In S1, the CPU 11 (the parameter setting unit 503) determines whether an instruction to activate the UI 600 or an instruction to switch the slave equipment has been given through the operation part 8. If the instruction to activate the UI 600 is input or another slave equipment is selected by the equipment selection part 602, the CPU 11 proceeds from S1 to S2.

In S2, the CPU 11 (the parameter setting unit 503) acquires specifying information of the slave equipment selected by the equipment selection part 602. For example, the parameter setting unit 503 transmits an acquisition request for product specifying information (a vendor ID, a product code, and a revision code) of n-th slave equipment to the configuration management unit 505. The configuration management unit 505 reads the product specifying information of the n-th slave equipment specified by the acquisition request from the storage apparatus 12, and transmits the product specifying information to the parameter setting unit 503.

In S3, the CPU 11 (the parameter setting unit 503) acquires slave equipment information corresponding to the product specifying information. For example, the parameter setting unit 503 transmits an acquisition request for the slave equipment information 23 corresponding to the product specifying information to the equipment information management unit 506. The equipment information management unit 506 reads the slave equipment information 23 corresponding to the product specifying information indicated by the acquisition request from the storage apparatus 12, and transmits the slave equipment information 23 to the parameter setting unit 503.

In S4, the CPU 11 (the parameter setting unit 503) updates the UI 600 based on the slave equipment information 23. Contents of the slave equipment information 23 are reflected in the value setting part 604 of the UI 600.

In S5, the CPU 11 (the parameter setting unit 503) determines whether a read request for a current value has been input. For example, the parameter setting unit 503 determines whether the current value read button 605 provided in the UI 600 has been operated. If the current value read button 605 has not been pressed, the CPU 11 proceeds from S5 to S8. On the other hand, if the current value read button 605 is pressed, the CPU 11 proceeds from S5 to S6.

In S6, the CPU 11 (the parameter setting unit 503) reads the current value from the slave equipment selected by the equipment selection part 602. For example, the parameter setting unit 503 creates the read request for the current value indicating the slave equipment selected by the equipment selection part 602, and transmits the read request to the basic unit 3 via the communication part 13. When the read request is received, the CPU 31 of the basic unit 3 transfers the read request to the slave equipment selected by the equipment selection part 602. The CPU 41 of the slave equipment (for example, the motor driver 4) selected by the equipment selection part 602 reads the current value held in the parameter storage area 51 and transmits the read current value to the basic unit 3. The CPU 31 of the basic unit 3 transmits a response including the current value to the PC 2. As a result, the CPU 11 can acquire the current value of each of the parameters of the desired slave equipment.

In S7, the CPU 11 (the parameter setting unit 503) updates the UI 600 based on the current value. In the value setting part 604 of the UI 600, the acquired current value is reflected in each of the parameters.

In S8, the CPU 11 (the parameter setting unit 503) determines whether an instruction to reset a recommended value has been given through the operation part 8. For example, the parameter setting unit 503 determines whether the recommended value reset button 606 provided in the UI 600 has been pressed. If the recommended value reset button 606 has not been pressed, the CPU 11 proceeds from S8 to S11. If the recommended value reset button 606 has been pressed, the CPU 11 proceeds from S8 to S9.

In S9, the CPU 11 (the parameter setting unit 503) resets each of the parameters to the recommended value. The recommended value of each of the parameters may be included in the slave equipment information 23.

In S10, the CPU 11 (the parameter setting unit 503) updates the UI 600 based on the recommended value. In the value setting part 604 of the UI 600, the acquired recommended value is reflected in each of the parameters.

In S11, the CPU 11 (the parameter setting unit 503) edits each of the parameters of the value setting part 604 based on an instruction input through the operation part 8.

In S12, the CPU 11 (the parameter setting unit 503) determines whether the transfer execution button 607 has been pressed. if the transfer execution button 607 has not been pressed, the CPU 11 returns from S12 to S5. if the transfer execution button 607 is pressed, the CPU 11 proceeds from S12 to S13.

In S13, the CPU 11 (the parameter setting unit 503) transfers each of the parameters set through the UI 600 to the slave equipment. The parameter setting unit 503 creates a write request for the parameter and transmits the write request to the basic unit 3 via the communication part 13. The write request includes, for example, an index of the parameter to be written, a write size, and a value to be written. The basic unit 3 transmits the write request to slave equipment (the motor driver 4) designated as a write target. The CPU 41 (the parameter management unit 48) of the motor driver 4 writes a value in the parameter stored in the parameter storage area 51 according to the write request.

(5) Writing into Volatile Memory

Figure 11:
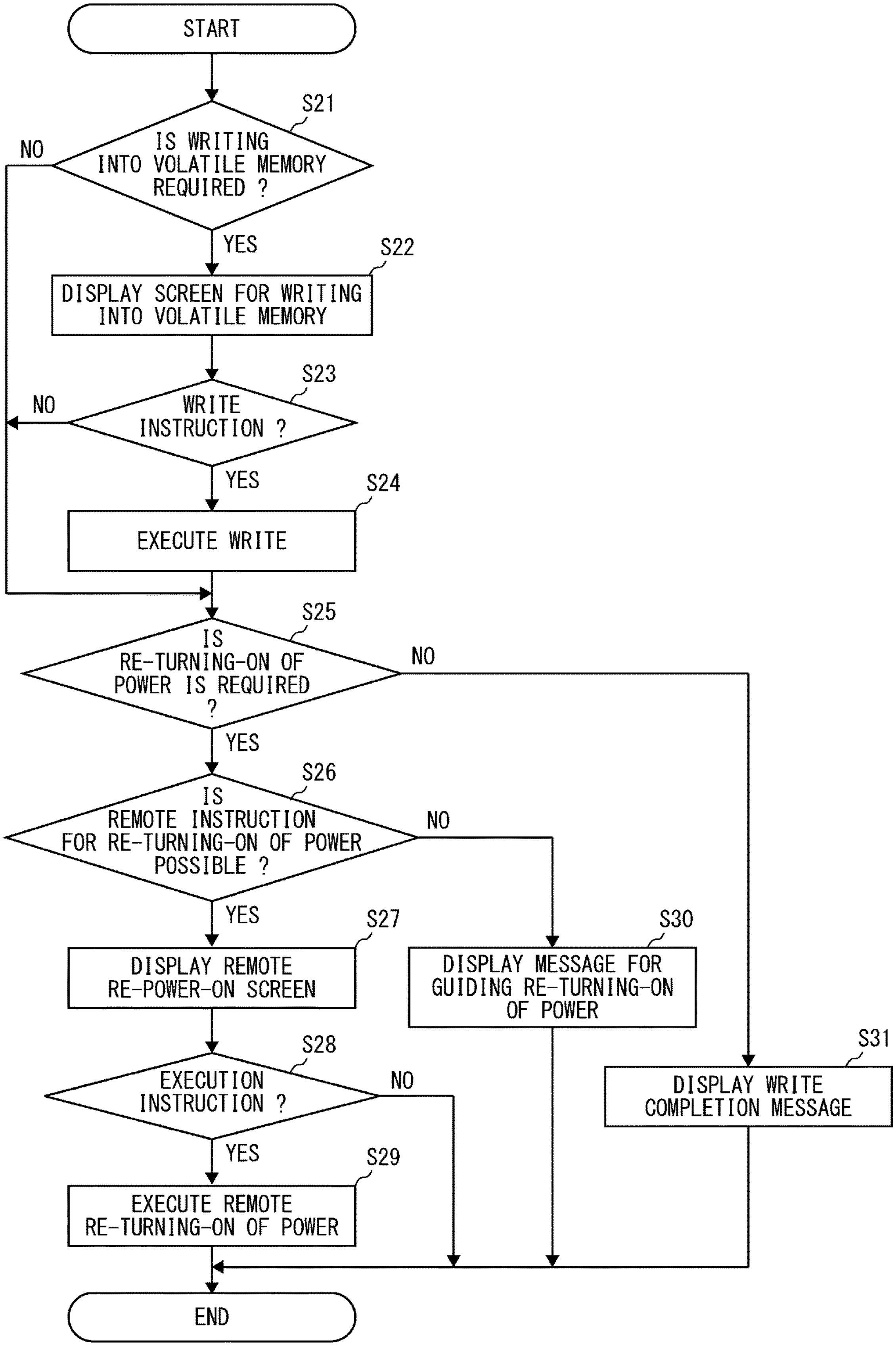
FIG. 11 is a view illustrating accompanying processing accompanying parameter transfer.
Figure 12:
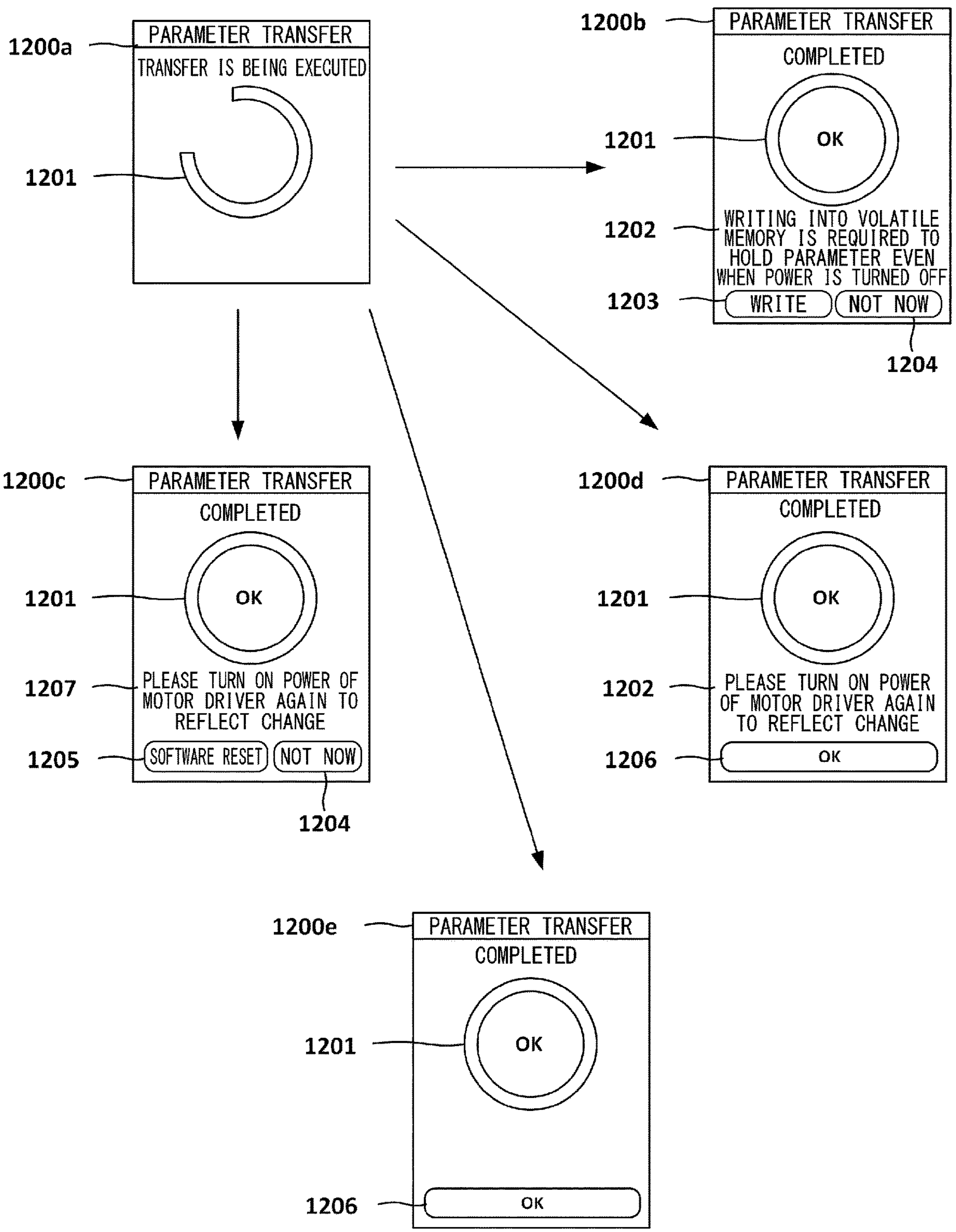
FIG. 12 is a view illustrating a UI accompanying the accompanying processing.

FIG. 11 is a flowchart illustrating writing into the nonvolatile memory (the ROM area 47). FIG. 12 illustrates UIs 1200*a* to 1200*e* functioning as screens for write. When the transfer execution button 607 is pressed, the parameter setting unit 503 displays the UI 1200*a* on the display part 7.

The UI 1200*a* includes a donut chart 1201 indicating the progress of transfer. When the parameter transfer is completed, the CPU 11 executes the following processing.

In S21, the CPU 11 (the parameter setting unit 503) determines whether a parameter whose value has been changed through the UI 600 is a parameter required to be written into the nonvolatile memory. The slave equipment information 23 includes, for each parameter, information indicating whether writing into the nonvolatile memory is necessary. The parameter setting unit 503 executes the determination based on the slave equipment information 23. If the parameter required to be written into the nonvolatile memory has been changed, the CPU 11 proceeds from S21 to S22. If the parameter required to be written into the nonvolatile memory has not been changed, the CPU 11 proceeds from S21 to S25.

In S22, the CPU 11 (the parameter setting unit 503) displays a screen for writing into the nonvolatile memory.

In FIG. 12, the UI 1200*b* illustrates an example of the screen for writing into the nonvolatile memory. A message 1202 is a message informing the user of the need for writing of the parameter into the nonvolatile memory in order for the motor driver 4 to hold the parameter even if the power of the motor driver 4 is turned off. A write button 1203 is a button for instructing the motor driver 4 to execute writing into the nonvolatile memory. A button 1204 is a button for closing the UI 1200*b* without executing writing into the nonvolatile memory.

In S23, the CPU 11 (the parameter setting unit 503) determines whether a write instruction has been input using the write button 1203 of the UI 1200*b*. If the write instruction has not been input, the CPU 11 proceeds from S23 to S25. If the write instruction has been input, the CPU 11 proceeds from S23 to S24.

In S24, the CPU 11 (the parameter setting unit 503) executes the writing of the parameter into the nonvolatile memory. For example, the parameter setting unit 503 creates a write request with respect to the nonvolatile memory, and transmits the write request to the slave equipment (the motor driver 4) via the basic unit 3. The CPU 41 (the parameter management unit 48) writes the parameter temporarily written in the RAM area 46 into the ROM area 47. In this case, the parameter storage area 51 exists in both the RAM area 46 and the ROM area 47.

In S25, the CPU 11 (the parameter setting unit 503) determines whether it is necessary to turn on the power of the slave equipment again in order to reflect, in the slave equipment, the parameter whose value has been changed. The parameter setting unit 503 refers to the item "whether it is necessary to turn on power again for reflection" in the slave equipment information 23 illustrated in FIG. 7 and executes the determination. If it is not necessary to turn on the power again, the CPU 11 proceeds from S25 to S31 and displays a write completion message.

In FIG. 12, the UI 1200*c* is a UI that displays the write completion message. When an OK button 1206 is pressed, the CPU 11 closes the UI 1200*c*.

On the other hand, if it is necessary to turn on the power again, the CPU 11 proceeds from S25 to S26.

In S26, the CPU 11 (the parameter setting unit 503) determines whether it is possible to give a remote instruction for turning on the power again. Being possible to give the remote instruction refers to that the PC 2 can instruct the slave equipment (the motor driver 4) to turn on the power again via the basic unit 3.

If it is not possible to give the remote instruction for turning on the power again, the CPU 11 proceeds from S26 to S30, and displays, on the display part 7, a message for guiding the user to manually turn on the power again. In FIG. 12, the UI 1200*d* includes the message 1202 for guiding the user to manually turn on the power again. The user viewing the message 1202 presses the OK button 1206 to close the UI 1200*d* and manually turn on the power of the slave equipment again.

If it is possible to give the remote instruction for turning on the power again, the CPU 11 proceeds from S26 to S27. In S27, the CPU 11 (the parameter setting unit 503) displays a remote re-power-on screen on the display part 7. In FIG. 12, the UI 1200*c* is an example of the remote re-power-on screen. A message 1207 is a message for guiding the user to remotely turn on the power of the slave equipment again by pressing a software reset button 1205.

In S28, the CPU 11 (the parameter setting unit 503) determines whether an instruction for executing remote re-power-on has been input. For example, the parameter setting unit 503 determines whether the software reset button 1205 has been pressed. If the software reset button 1205 is pressed, the CPU 11 proceeds from S28 to S29. If the software reset button 1205 is not pressed, the CPU 11 skips S29.

In S29, the CPU 11 (the parameter setting unit 503) executes remote re-turning-on of the power again. For example, the parameter setting unit 503 creates a request for turning on the power again and transmits the request for turning on the power again to the slave equipment (the motor driver 4) via the basic unit 3. When the request for turning on the power again is received, the CPU 41 of the motor driver 4 turns on the power of the motor driver 4 again. Note that, when the re-activation is completed, the CPU 41 may create a completion notification and transmit the completion notification to the PC 2 via the basic unit 3.

Figure 13:
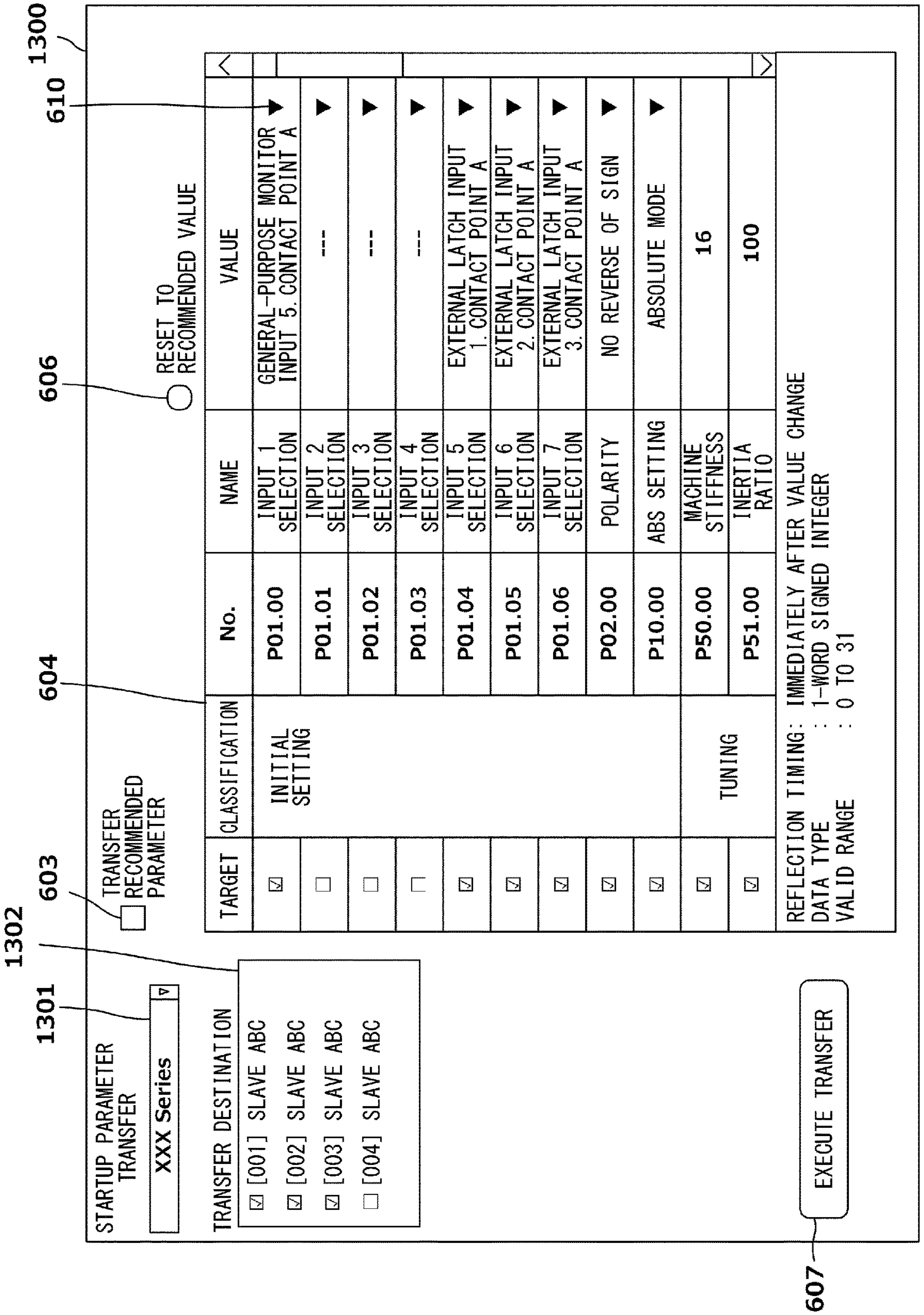
FIG. 13 is a view illustrating a parameter setting screen.

(6) Another Example of Parameter Setting Screen (6-1) A Collective Setting Screen for a Plurality of Pieces of Slave Equipment of the Same Type FIG. 13 illustrates a UI 1300 which is an example of the collective setting screen for a plurality of pieces of slave equipment of the same type (same model). In the UI 1300, the same reference numerals are given to portions common to the UI 600, and the description thereof is omitted.

A model selection part 1301 is a pull-down menu for selecting a model of slave equipment. The CPU 11 (the parameter setting unit 503) refers to the configuration information of the PLC system 1, extracts a plurality of pieces of slave equipment of the same type selected by the model selection part 1301, creates the UI 1300, and displays the UI 1300 on the display part 7.

A transfer destination selection part 1302 displays the plurality of pieces of slave equipment of the same type selected by the model selection part 1301 in a selectable manner. In this example, a parameter whose value has been set in the value setting part 604 is transferred to slave equipment (the motor driver 4) with a number in which a check box is checked. In this example, parameters having the same value are set to the plurality of pieces of slave equipment of the same type selected by the model selection part 1301.

In general, parameters having the same value are often set to a plurality of pieces of slave equipment of the same type. Thus, the UI 1300 can improve user convenience in any use case.

If some parameters are finely adjusted, the CPU 11 may transfer parameters having the same value to the plurality of pieces of slave equipment through the UI 1300, then read current values through the UI 600, and finely adjust each of the parameters for each piece of the slave equipment. This may greatly reduce working hours.

Figure 14:
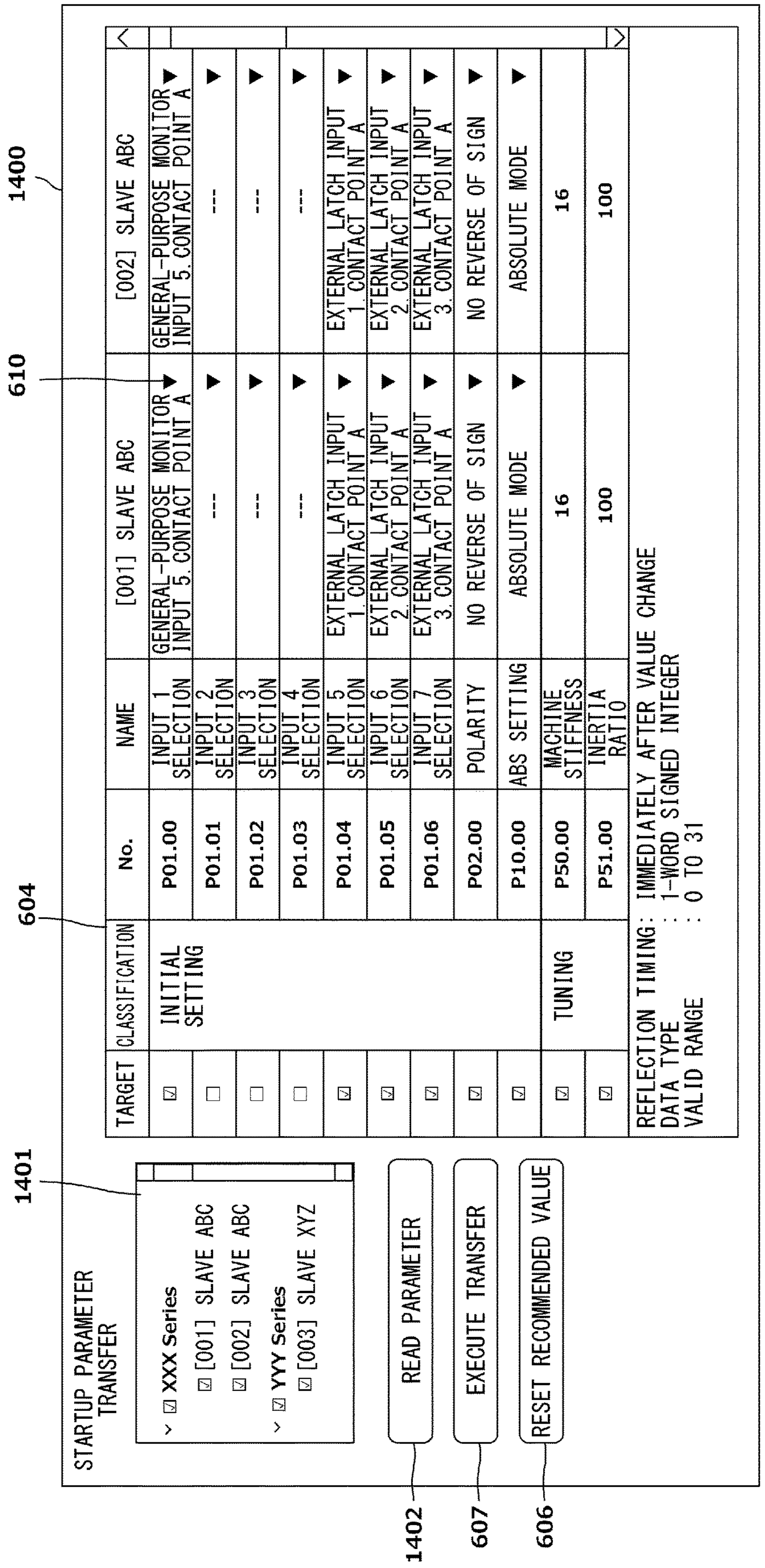
FIG. 14 is a view illustrating the parameter setting screen.

(6-2) Collective Setting Screen for Plurality of Pieces of Slave Equipment of Different Types FIG. 14 illustrates a UI 1400 which is an example of a collective setting screen for a plurality of pieces of slave equipment of different types (different models). A list part 1401 displays a plurality of pieces of slave equipment registered in the configuration information of the PLC system 1 for each type in a list. In this example, there are two types of slave equipment including two pieces of slave equipment of a first type and one slave equipment of a second type. In the list part 1401, checked slave equipment is selected for parameter editing and transfer. The CPU 11 refers to the slave equipment information 23 of the selected slave equipment in the list part 1401 and reflects the slave equipment information 23 in the value setting part 604. The number of value editing parts provided in the value setting part 604 is the same as the number of pieces of the slave equipment checked in the list part 1401. That is, the value setting part 604 can individually set a value for each slave model.

A parameter read button 1402 is a button for individually reading current values of parameters from all pieces of the slave equipment checked in the list part 1401. The transfer execution button 607 is a button for collectively transferring the parameters individually set to values by the value setting part 604 to all pieces of the slave equipment checked in the list part 1401.

As compared with the UI 600 and the UI 1300, the UI 1400 is advantageous in that values can be edited and transferred for the plurality of pieces of slave equipment of different types using the single UI.

(7) Collation of Setting Value and Current Value

Figure 15:
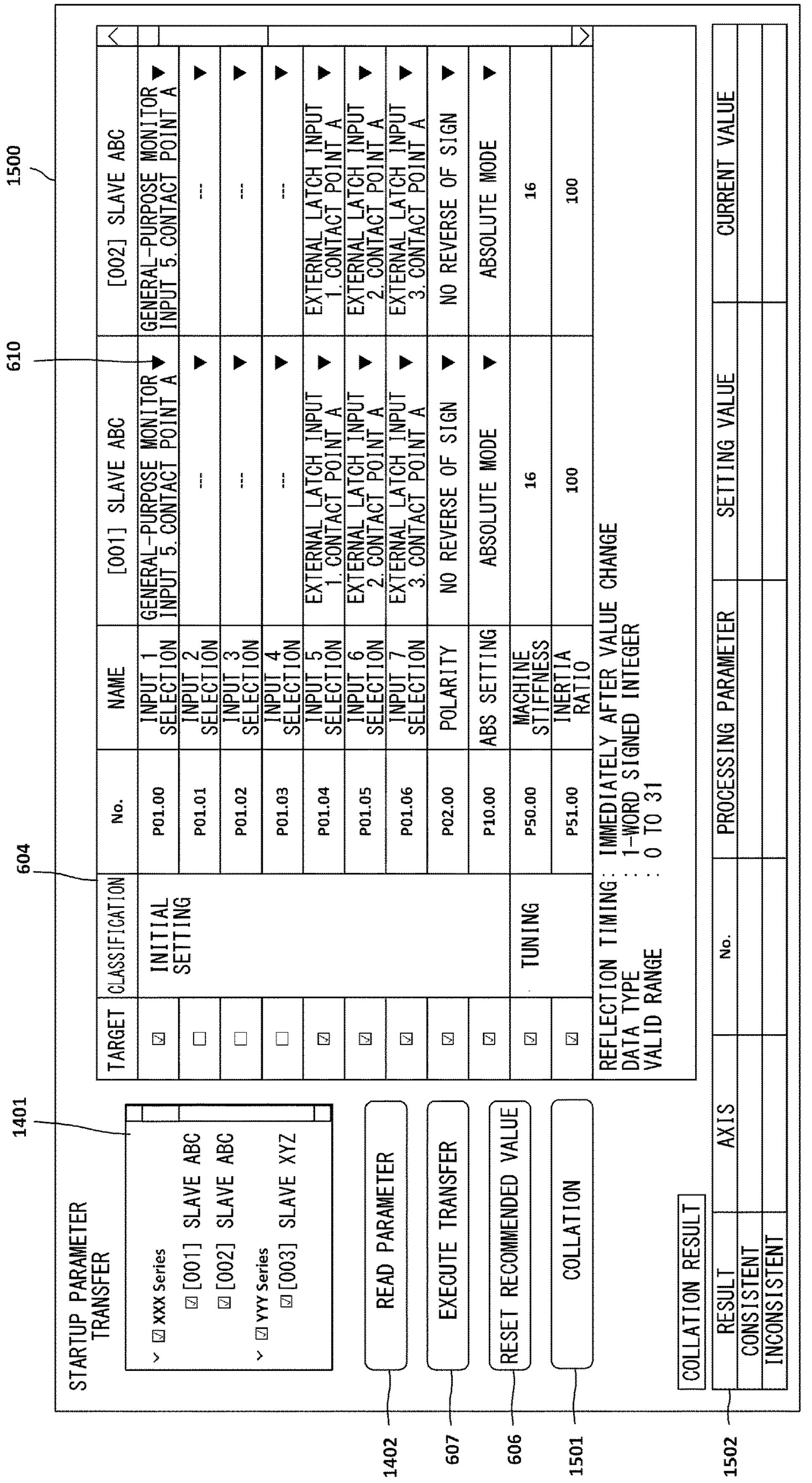
FIG. 15 is a view illustrating the parameter setting screen.

FIG. 15 illustrates a UI 1500 including a function of collating a setting value set in the value setting part 604 with a current value set in slave equipment at that time. When a collation button 1501 is pressed, the CPU 11 (the read processor 527 and the collation unit 524) acquires a current value from each slave equipment for each parameter, and determines whether the current value coincides with a setting value set in the value setting part 604. The CPU 11 (the collation unit 524 and the display processor 521) displays a collation result on a collation result display part 1502 for each parameter. Since the collation result display part 1502 displays the setting value and the current value side by side, the user can clearly understand a difference therebetween.

(8) Relationship Between Slave Equipment and Motion Axis Number

Positioning of a load using a motor is sometimes referred to as motion control. In this case, not only a slave name but also a motion axis number is given to each slave equipment.

Axis number 0001: Slave equipment 001

Axis number 0002: Slave equipment 003

Axis number 0003: Slave equipment 004

Axis number 0004: Slave equipment 002

Figure 16:
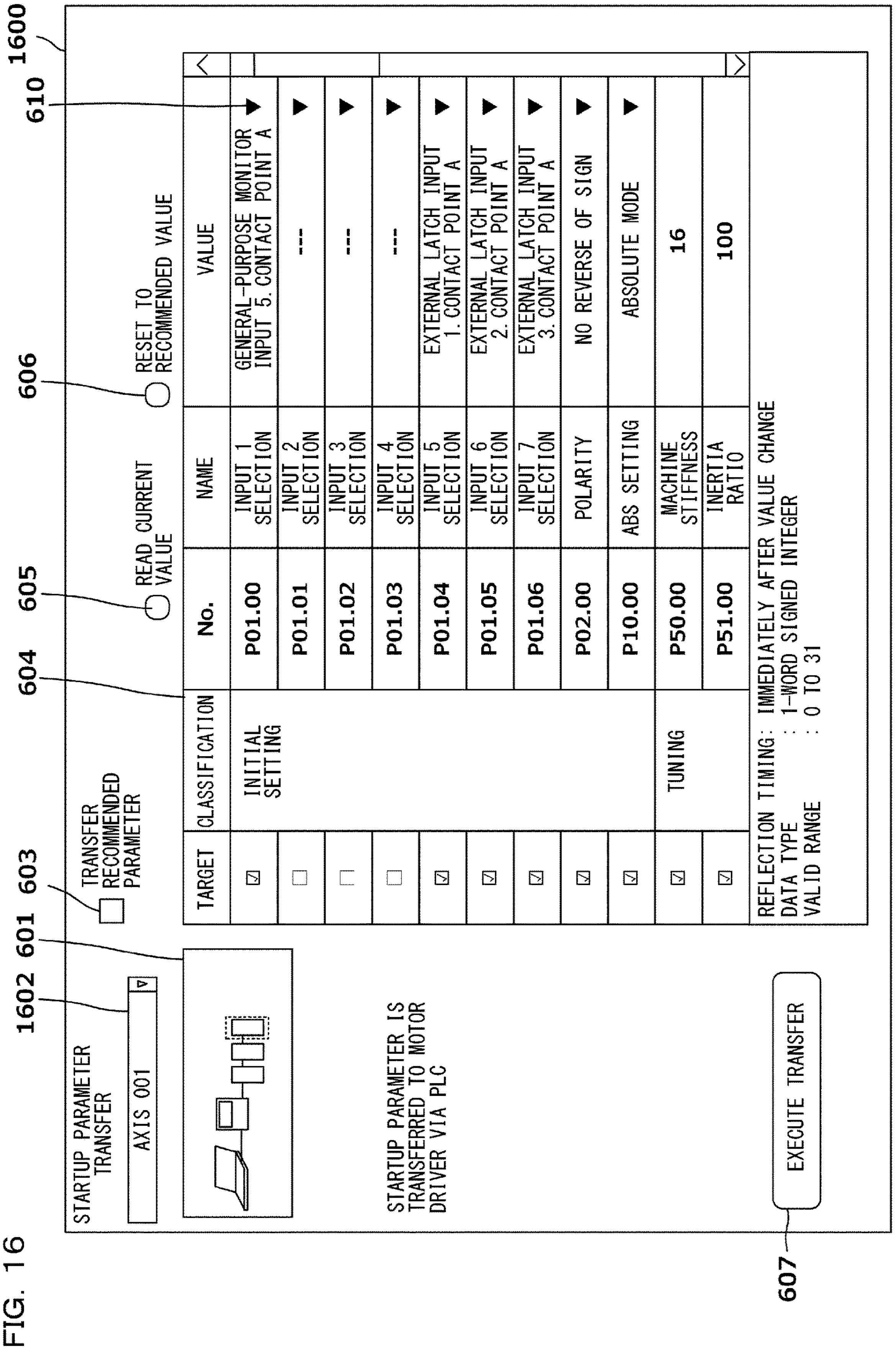
FIG. 16 is a view illustrating the parameter setting screen.

FIG. 16 illustrates a UI 1600 for identifying slave equipment by an axis number. In the UI 600, the equipment selection part 602 is the pull-down menu listing slave numbers. On the other hand, in the UI 1600, the equipment selection part 602 is replaced with an axis selection part 1602. The axis selection part 1602 is also a pull-down menu listing axis numbers in a selectable manner. Other parts of the UI 1600 are common to those of the UI 1600.

The CPU 11 has, in the storage apparatus 12, a table in which the axis numbers are associated with the slave numbers, respectively. The CPU 11 refers to this table, replaces an axis number with a slave number, and executes the above-described various processes.

Meanwhile, there is a case where single slave equipment can control the multi-axis motor 10. In this case, one slave number is associated with a plurality of axis numbers. In such slave equipment, there may be parameters common to all axes and individual parameters for each axis.

The UI 1600 displays parameters of an axis selected by the axis selection part 1602 on the value setting part 604. When the user executes editing on any one axis for a common parameter among a plurality of axes, the CPU 11 (the editing unit 523) reflects an editing result on the other axes. That is, the user does not select the other axes by the axis selection part 1602 to edit the parameter, and the editing result is reflected on the other axes in the background. As a result, editing work by the user is made efficient. However, the CPU 11 (the editing unit 523) individually receives editing of values for individual parameters for each axis.

(9) Case where Size of Parameter Is Less than Rewritable Unit

There is a case where a size of a parameter to be written may be less than a payload size of a communication frame that can be transmitted to slave equipment. In this case, a plurality of parameters are sometimes mounted on one payload. For example, a parameter sometimes takes a value in the range of 2 bytes without a sign (0000H to 0FFFH). However, parameters having different meanings are sometimes assigned for each nibble (=4 bits) of the 2 bytes. That is, four parameters are sometimes assigned to the 2 bytes. In this case, it is necessary to always collectively read and write the four parameters.

Therefore, a UI capable of collectively designating such a plurality of parameters as transfer targets is required. Further, a UI capable of individually editing such a plurality of parameters is also required.

FIG. 17 illustrates a parameter list to which information indicating a start bit position and a bit width is added. Since the start bit position and the bit width of each parameter are clearly indicated in this manner, the user can easily read and write a parameter without a mistake.

Figure 18:
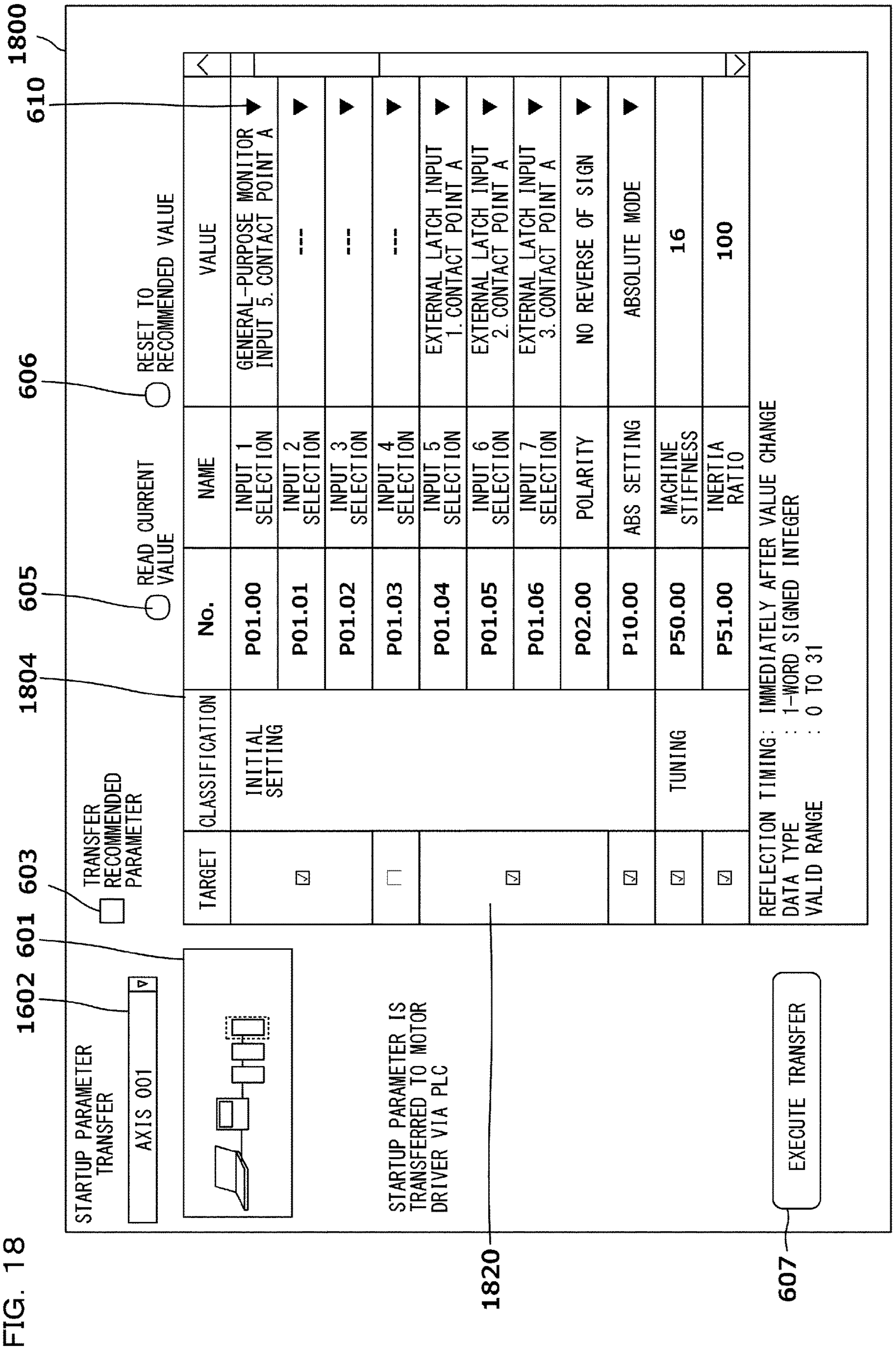
FIG. 18 is a view illustrating the parameter setting screen.

FIG. 18 illustrates a UI 1800 which is an example of the parameter setting screen. The same reference numerals are given to parts that have been described so far, and the description thereof is omitted. The value setting part 1804 has a check box 1820 for designating a transfer target similarly to the value setting part 604, and the check box 1820 of the value setting part 1804 is provided in common for a plurality of parameters. That is, the single check box 1820 is provided for the plurality of parameters that need to be read/written together. On the other hand, the value setting part 1804 can individually receive editing of values of the plurality of parameters as described above.

The parameter setting unit 503 acquires start bit positions and bit widths from the parameter list illustrated in FIG. 17, and assembles values of a plurality of parameters to which the same index or sub-index is assigned based on the acquired start bit positions and bit widths to create transfer data. The parameter setting unit 503 transmits a request for writing the transfer data in the index or sub-index of the parameters to be transferred to the slave equipment via the basic unit 3.

The same applies to a case where current values are read from the slave equipment. The CPU 11 transmits a read request for indexes or sub-indexes of parameters to be read to the slave equipment via the basic unit 3. The CPU 11 acquires start bit positions and bit widths from the parameter list illustrated in FIG. 17, decomposes data received from the slave equipment into a plurality of parameters based on the acquired start bit positions and bit widths, and reflects the result in the UI 1800.

(10) Operation Execution Screen

On the parameter setting screen (the UI 600 and the like) described above, the user can execute writing of a parameter into the nonvolatile memory and software reset in a series of operation flows through the parameter setting screen. As illustrated in FIG. 12, when transfer of a parameter with respect to the slave equipment is completed, the parameter held in the volatile memory is written into the nonvolatile memory by pressing the write button 1203. Further, with reference to FIG. 12, when the parameter transfer with respect to the slave equipment is completed, the software reset button 1205 is displayed, and the power of the slave equipment is turned on again by pressing the software reset button 1205. However, the user may desire to execute these operations independently of the parameter transfer. Similarly, the user may desire to execute an operation such as absolute encoder reset or reset to the factory shipment state (factory reset) as a one-off.

Figure 19:
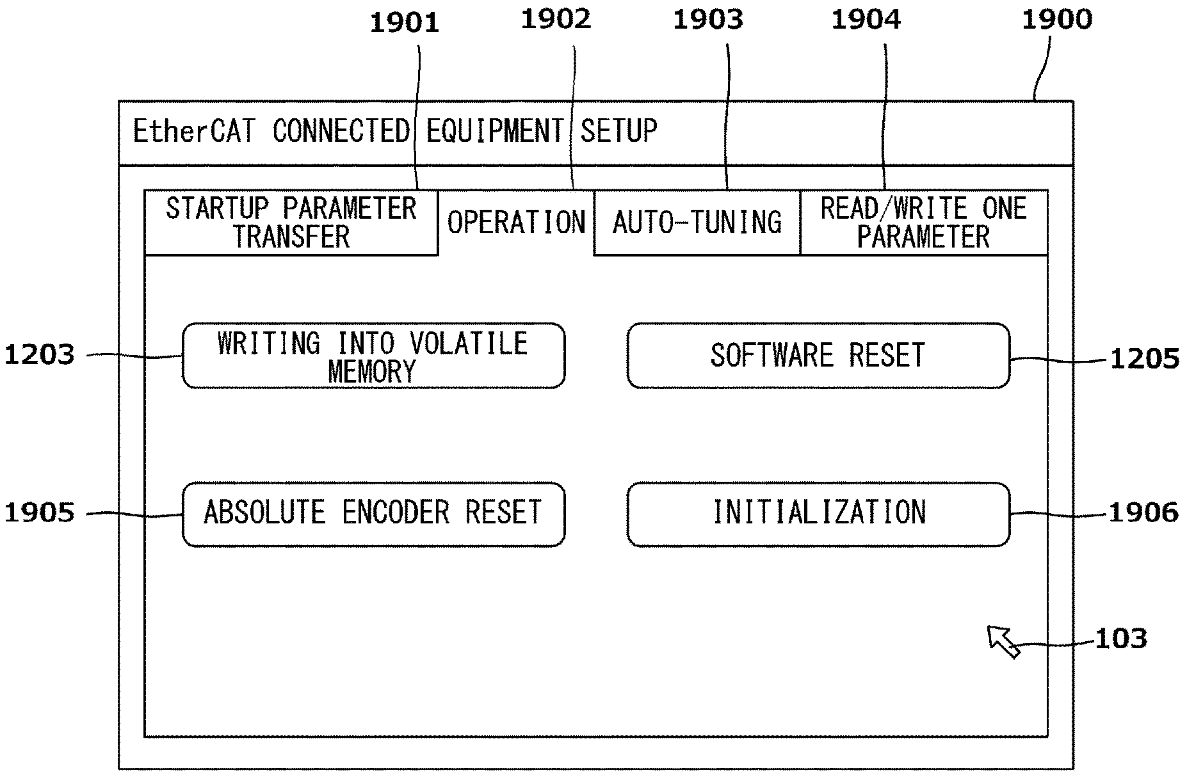
FIG. 19 is a view illustrating a UI of an operation executed alone.

FIG. 19 illustrates a UI 1900 of a menu screen. The UI 1900 includes a plurality of tabs 1901 to 1904. The tab 1901 is a tab for calling a startup parameter transfer screen (parameter setting screen) such as the UI 600 described above. The tab 1902 is a tab for calling a UI configured to execute various operations alone. The tab 1903 is a tab for giving an instruction for parameter auto-tuning. The tab 1904 is a tab for reading and writing parameters one by one.

In FIG. 19, the tab 1902 is active. The tab 1902 includes the above-described button 1203 for giving an instruction to write a parameter into the nonvolatile memory and the software reset button 1205 for the software reset of the PLC system 1. Furthermore, a button 1905 for giving an instruction for the absolute encoder reset and a button 1906 for giving an instruction for initialization of the PLC system 1 to settings at the time of factory shipment are included.

On the UI 1900, four buttons are displayed in an operable state. However, there is a case where some slave equipment does not support a remote operation. In that case, the display processor 521 hides or grays out a button for an unsupported operation such that the user cannot operate the button. The CPU 11 refers to the operation sequence list stored in the storage apparatus 12, and controls display or non-display (gray-out) of these buttons according to values of "whether slave equipment is compatible" with the remote operation.

A sequence of requests issued through the UI 1900 when the user presses the buttons may vary depending on slave equipment. In this case, the CPU 11 transmits a request for the sequence according to "sequence" in the operation sequence list stored in the storage apparatus 12, and receives a response.

The UI 1900 is displayed after the user selects any one slave equipment included in the configuration information. However, the CPU 11 may receive selection of a plurality of pieces of slave equipment and collectively execute the same operation on the plurality of pieces of selected slave equipment.

(11) Tuning Screen

Parameters of slave equipment include parameters for adjusting responsiveness of a servo system, such as machine stiffness and an inertia ratio. Since fine adjustment is required for these parameters, it is more convenient for the user to have a dedicated UI.

Figure 20:
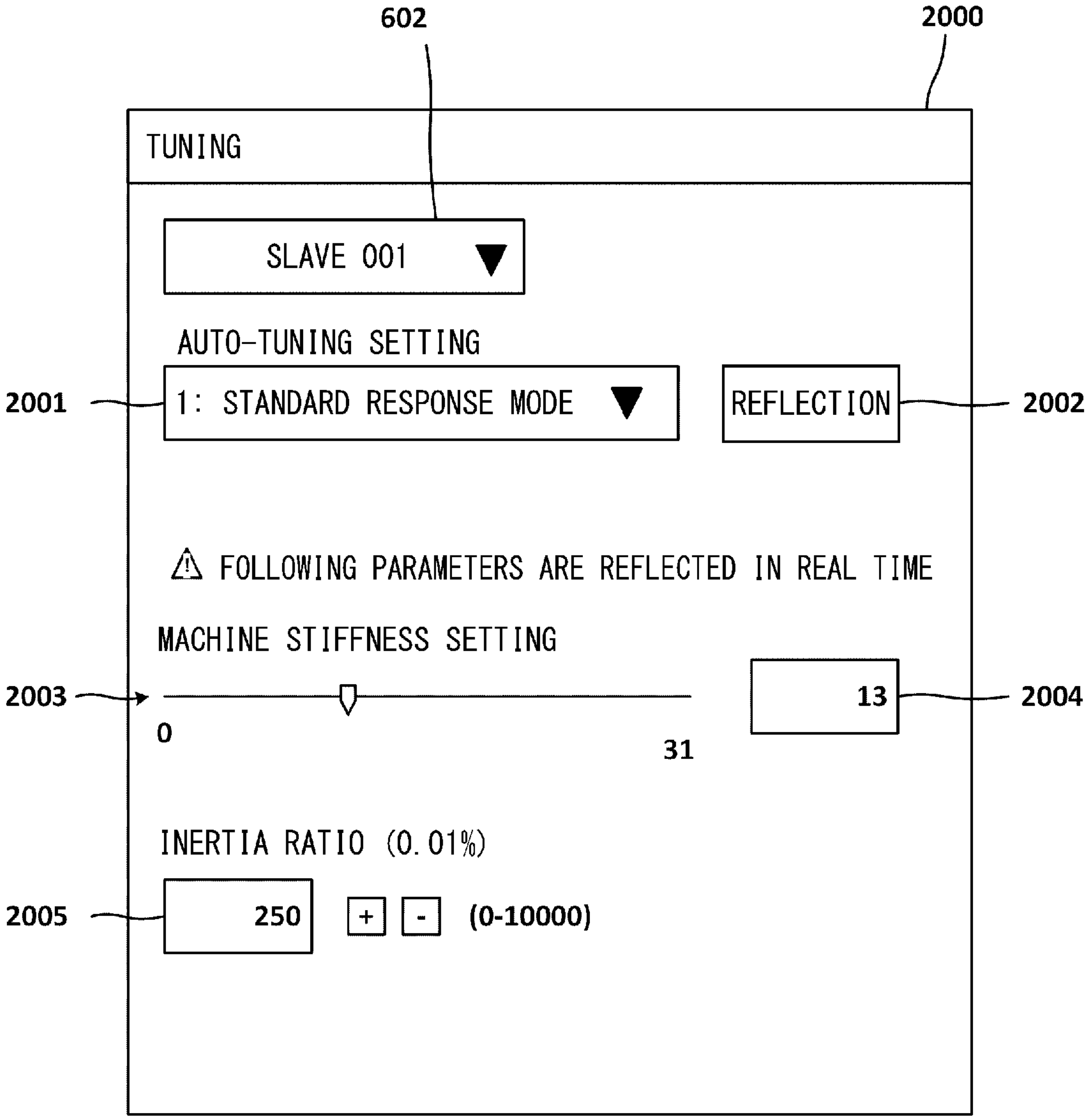
FIG. 20 is a view illustrating a tuning screen.

FIG. 20 illustrates a UI 2000 for parameter tuning. This UI 2000 may be displayed through the tab 1903. The equipment selection part 602 is a pull-down menu for selecting one slave equipment from among the plurality of pieces of slave equipment included in the PLC system 1.

The auto-tuning setting part 2001 is a pull-down menu for selecting any one of a plurality of auto-tuning modes. A reflection button 2002 is a button for reflecting the auto-tuning mode selected by the auto-tuning setting part 2001 in the slave equipment. That is, if the reflection button 2002 is not pressed, the auto-tuning mode selected by the auto-tuning setting part 2001 is not reflected in the slave equipment.

A machine stiffness setting part 2003 is a slide bar for setting machine stiffness of a load connected to the slave equipment. A setting value display part 2004 displays a setting value of the machine stiffness set by the machine stiffness setting part 2003. Note that the machine stiffness is immediately set to the slave equipment.

An inertia ratio setting part 2005 includes a plus button, a minus button, and a setting value display part which are configured to set an inertia ratio of the load of the slave equipment. The inertia ratio is also immediately reflected in the slave equipment.

The UI 2000 illustrated in FIG. 20 is merely an example. The CPU 11 changes a parameter name, an index, the number of parameters, and an option of a tuning target according to the slave equipment selected by the equipment selection part 602. That is, the CPU 11 refers to parameter information corresponding to the slave equipment selected by the equipment selection part 602, and creates the UI 2000.

FIG. 21 is a parameter list for tuning that is a part of the parameter information. A parameter name may be prepared for each of English notation and Japanese notation. Furthermore, the above-described index and sub-index, data type, minimum setting value and maximum setting value, value display format, and option ID may be included. A parameter type indicates whether the parameter is a "parameter for mode selection" or a "parameter for gain adjustment". A control type represents a type of control (an object) for adjusting the parameter. ComboBox indicates a UI of a pull-down menu type. TrackBar indicates a UI of a slider type. NumericUpDown indicates a UI of a numeric input type.

A non-tunable value is data included only in the "parameter for mode selection", and is a value that cannot be set from the UI 2000 prepared in common for the plurality of pieces of slave equipment. In this case, the CPU 11 displays a message prompting the user to activate software or a UI dedicated to the slave equipment and adjust the parameter.

The CPU 11 may provide the UI 2000 such that the “parameter for gain adjustment” can also be adjusted by the user in the UI 2000.

(12) Parameter Backup and Restore Function

The CPU 11 may export values of parameters set through the parameter setting screen in a file or the like and make a backup. Further, the CPU 11 may import the values of the parameters from the backup file and restore the values to the parameters.

Figure 22:
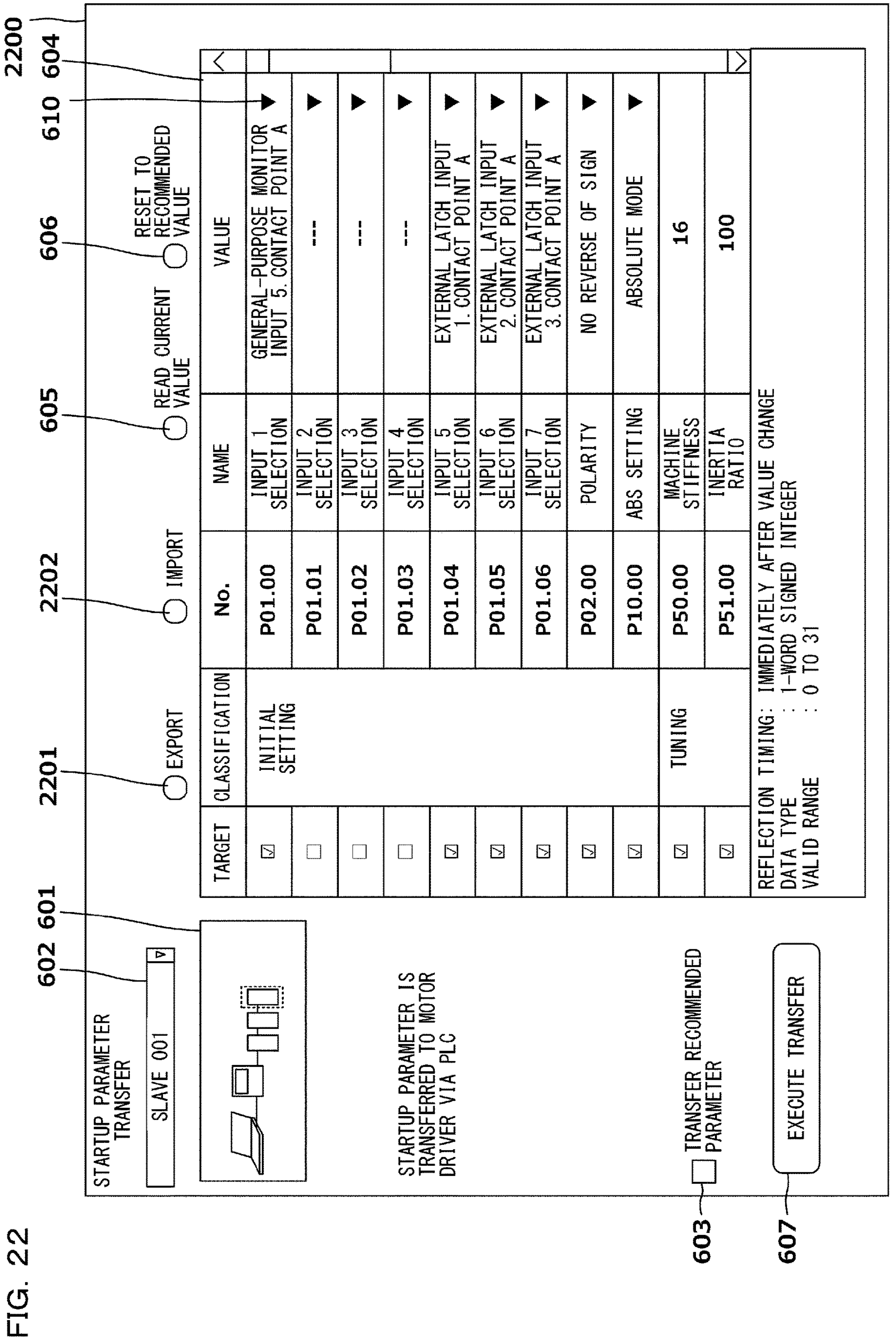
FIG. 22 is a view illustrating a parameter setting screen.

FIG. 22 illustrates a UI 2200 of a parameter setting screen of another example. The UI 2200 includes an export button 2201 and an import button 2202 as compared with the UI 600.

When the export button 2201 is pressed, the CPU 11 writes values of parameters displayed on the UI 2200 to individual backup files or project data for each slave equipment. These files are held in the storage apparatus 12.

When the import button 2202 is pressed, the CPU 11 reads parameter values from a backup file stored in the storage apparatus 12 in association with the slave equipment selected by the equipment selection part 602, and reflects the parameter values in the UI 2200.

Note that the backup may be collectively executed for the plurality of pieces of slave equipment included in the PLC system 1. Alternatively, the CPU 11 may display a screen for selecting slave equipment to be backed up among the plurality of pieces of slave equipment, and cause the user to select the slave equipment. The CPU 11 may read current values of the parameters from the selected slave equipment and make the backup.

Similarly, the CPU 11 may specify a plurality of pieces of slave equipment whose parameters are backed up in a backup file with reference to the backup file, cause the user to select one or more pieces of slave equipment from among the plurality of pieces of specified slave equipment, read parameters of the selected slave equipment from the backup file, and write the parameters to the selected slave equipment. In such restoration, the parameters are often held in a RAM area of the slave equipment. Thus, when the restoration is completed, the CPU 11 may inquire whether to write the parameters into the nonvolatile memory. When the user desires the writing into the nonvolatile memory, the CPU 11 writes the parameters into the nonvolatile memory. Similarly, when the software reset is required, the CPU 11 may display a message prompting the software reset or execute the software reset remotely. The CPU 11 may inquire of the user whether to remotely execute the software reset, and execute the software reset according to the inquiry result.

<Alarm Display>

As described above, the PLC system 1 may include a plurality of pieces of slave equipment provided by different vendors. In the related art, it is difficult to confirm details of an alarm unless a monitoring tool prepared by each of the vendors is connected to the slave equipment. Therefore, the present example implements an alarm display UI common for the plurality of pieces of slave equipment.

FIG. 23 illustrates the alarm list of the alarm information that is a part of the slave equipment information 23. A main number and a sub number are alarm detail codes for identifying individual alarms. The alarm detail code includes only the main number in some cases or include the main number and the sub number in other cases. An alarm message is a wording describing contents of an alarm. When the alarm message supports multiple languages, the alarm message for each language is stored. The display part 7 displays the alarm message in a language corresponding to the display language of the PLC development environment. An alarm number display character string is a raw character string defined by the vendor of the slave equipment. A notation method for the alarm detail code described above may be different for each vendor or each slave equipment. For example, the notation method may be a decimal number or a hexadecimal number. Further, the main number and the sub number may be connected by a hyphen or there may be no sub number. Therefore, the alarm number display character string may be provided to display the alarm number display character string also on the common UI.

Figure 24:
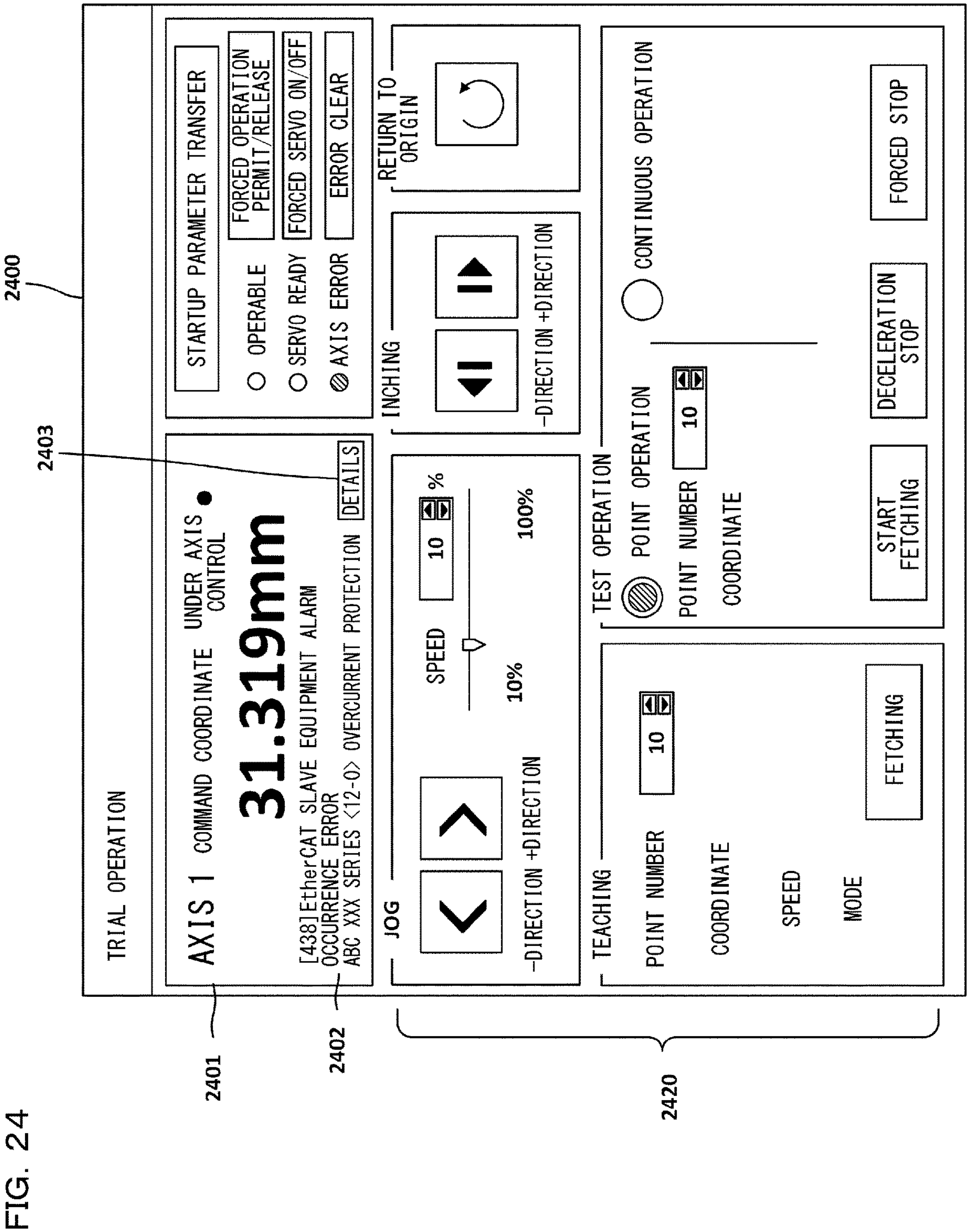
FIG. 24 is a view illustrating a trial operation screen (alarm display screen)

FIG. 24 illustrates a common UI 2400 configured to display an alarm. The common UI 2400 is displayed on the display part 7 during a trial operation of the plurality of pieces of slave equipment. An operation content display part 2401 is a display area showing information on operating slave equipment. An alarm display part 2402 displays a “series name of slave equipment”, an “alarm detail code”, and an “alarm message”. A detail button 2403 is a button for displaying detailed contents of an alarm. When the detail button 2403 is pressed, the CPU 11 accesses a manual link destination linked to the detail button 2403, and displays a page describing alarm detailed information on the display part 7. The alarm detailed information may include, for example, alarm occurrence condition and releasing method. A trial operation control part 2420 includes a plurality of control objects for controlling a trial operation of slave equipment. A JOG operation refers to an operation method of continuously operating a motion unit or a motor. Inching refers to moving the motion unit or the motor in a predetermined direction for a short time. Return to the origin refers to returning to the motion unit or the motor to the origin. A point operation refers to moving the motion unit or the motor to a designated point number among a plurality of preset points. Point parameters required to perform the point operation include the point number, an axis number, an operation mode, a target coordinate, a speed, a next point number, and the like. In particular, the next point number is a type of pointer and indicates a point number next to a certain point number. For example, when the point number is set as 1→2→3→4→5→6→7→8→1 and so on, a plurality of point parameters are repeatedly applied in order. Teaching refers to learning a machine coordinate corresponding to a designated point number. A continuous operation refers to continuously operating the motion unit or the motor in accordance with the user program, a plurality of point numbers, or the like.

Figure 25:
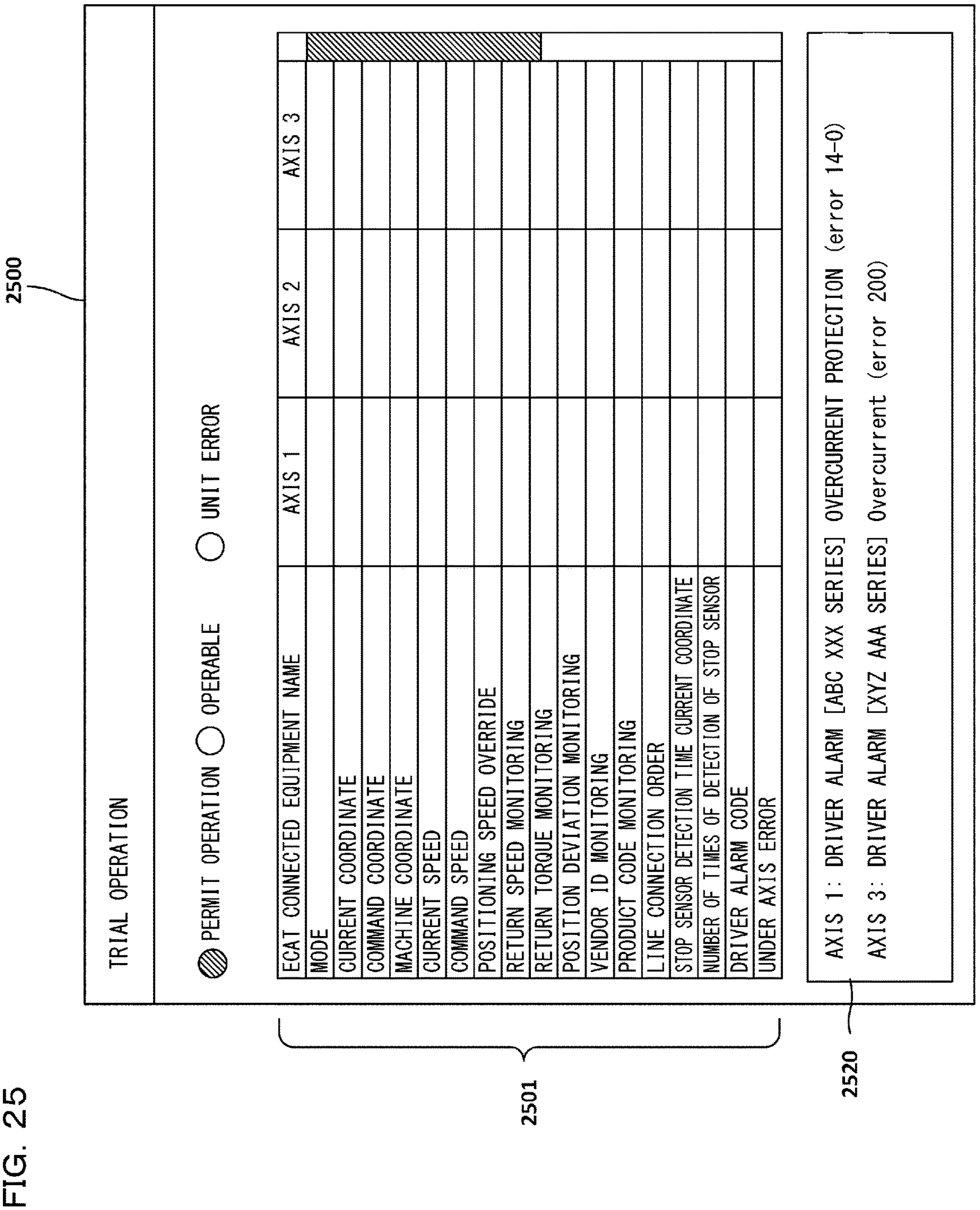
FIG. 25 is a view illustrating the trial operation screen (alarm display screen)

FIG. 25 illustrates another common UI 2500 configured to display an alarm. In this example, each slave equipment is associated with an axis number. An information display part 2501 displays an operation state and the like for each axis number. An alarm display part 2520 displays a “series name of slave equipment”, an “alarm detail code”, and an “alarm message”. Although the detail button 2403 is not illustrated here, the detail button 2403 may also be provided on the common UI 2500.

Figure 26:
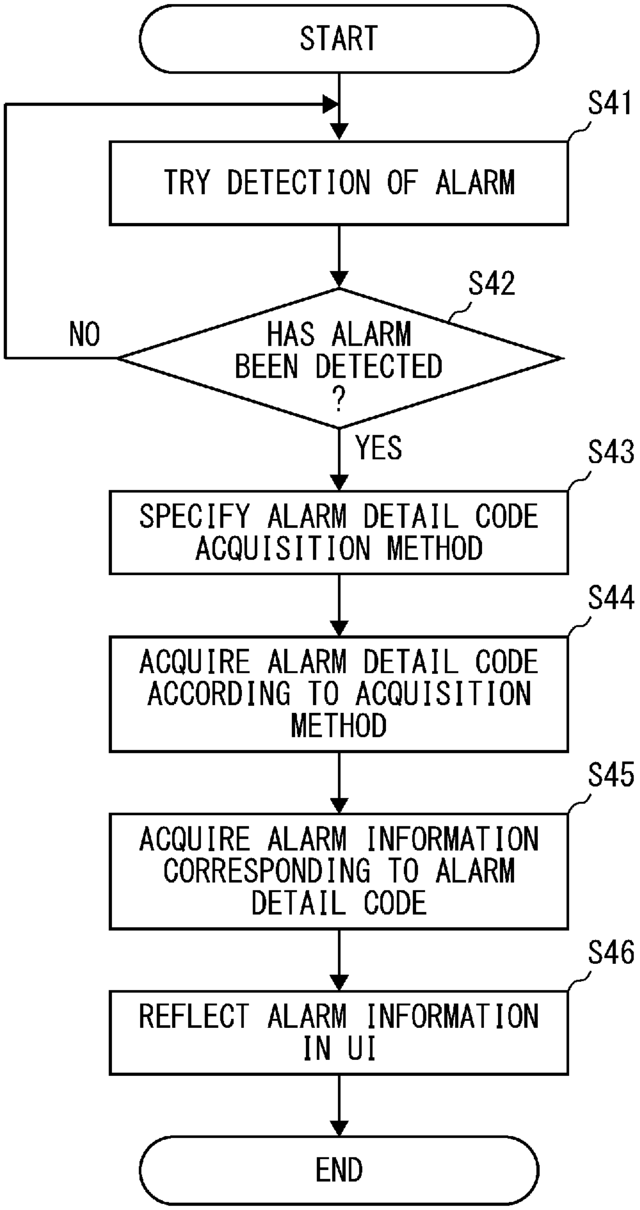
FIG. 26 is a flowchart illustrating an alarm display process.

FIG. 26 is a flowchart illustrating a method for displaying alarm information in the common UIs 2400 and 2500. Here, it is assumed that the display part 7 has already acquired the common UIs 2400 and 2500.

In S41, the CPU 11 (the alarm management unit 504) tries detection of an alarm from each of the plurality of pieces of slave equipment (the motor drivers 4) through the basic unit 3.

In S42, the CPU 11 (the alarm management unit 504) determines whether the alarm has been detected for any slave equipment. If the alarm has not occurred, the CPU 11 returns from S42 to S41. If the alarm has occurred, the CPU 11 proceeds from S42 to S43.

In S43, the CPU 11 (the alarm management unit 504) specifies an acquisition method for an alarm detail code for the slave equipment for which the alarm has been detected, and the CPU 11 acquires the acquisition method for the alarm detail code from slave equipment-specific information in slave equipment information of the slave equipment for which the alarm has been detected. The acquisition method may be different for each vendor or each slave equipment. An alarm code acquired from the slave equipment may be the alarm detail code as it is. In cyclic communication performed between the slave equipment and the master equipment, the alarm detail code may be stored in a field different from a field in which the alarm code is stored. Further, the slave equipment may also transmit the alarm detail code to the master equipment by message communication.

In S44, the CPU 11 (the alarm management unit 504) acquires the alarm detail code according to the acquisition method for the alarm detail code.

In S45, the CPU 11 (the alarm management unit 504) acquires alarm information corresponding to the alarm detail code from the storage apparatus 12 or the like. An alarm list of the alarm information includes information for describing the alarm in more detail as illustrated in FIG. 23.

In S46, the CPU 11 (the alarm management unit 504) reflects the alarm information in the common UIs 2400 and 2500.

<Writing of Recommended Value>

There is a case where an optimum or appropriate value (recommended value) for the master equipment is fixed for each parameter set to slave equipment. Therefore, the recommended value varies depending on the master equipment, but it is difficult for the user to decipher the recommended value appropriate for the master equipment from a manual of the slave equipment. Therefore, the parameter list of the parameter information stored in the storage apparatus 12 also holds the "recommended value" of each parameter. The CPU 11 specifies the slave equipment (the motor driver 4) connected to the basic unit 3 from the configuration information, reads a recommended value of each of parameters required to start up the slave equipment from the parameter list of the parameter information of the slave equipment stored in the storage apparatus 12, displays the recommended value on the parameter setting screen, and transfers and writes the recommended value to the slave equipment.

As a result, since the recommended value appropriate for the master equipment is set for each piece of the slave equipment, the slave equipment can be started up from the master equipment. As a result, labor of the user is greatly reduced.

(1) Automatic Setting of Recommended Value

In a case where a vendor of the master equipment (the basic unit 3) is different from a vendor of the slave equipment (the motor driver 4), a communication setting and a control parameter of the slave equipment (the motor driver 4) need to be set to meet specifications of the master equipment (the basic unit 3). In the related art, the user connects a dedicated setting support apparatus to the motor driver 4, compares a manual of the basic unit 3 with a manual of the motor driver 4, and performs setting such that the motor driver 4 can be controlled from the basic unit 3, but this is extremely difficult work.

Therefore, in the present example, the vendor of the master equipment examines specifications of pieces of the slave equipment of other vendors, determines recommended values of parameters of pieces of the slave equipment of other companies so as to meet the specifications of the own master equipment, creates assignment information, and provides the assignment information to the PC 2 that is the setting support apparatus. The assignment information is associated with vendor specifying information and product specifying information which are for specifying individual pieces of the slave equipment. Note that the vendor specifying information may be a part of the product specifying information. Furthermore, the assignment information has recommended values associated with the vendor specifying information and the product specifying information. Thus, the PC 2 reads assignment information corresponding to slave equipment selected by the user from the storage apparatus 12, acquires recommended values, and transfers and writes the recommended values to the slave equipment via the master equipment. As a result, the slave equipment can be controlled from the master equipment even if the vendor of the master equipment is different from the vendor of the slave equipment.

(2) User Interface

Figure 27:
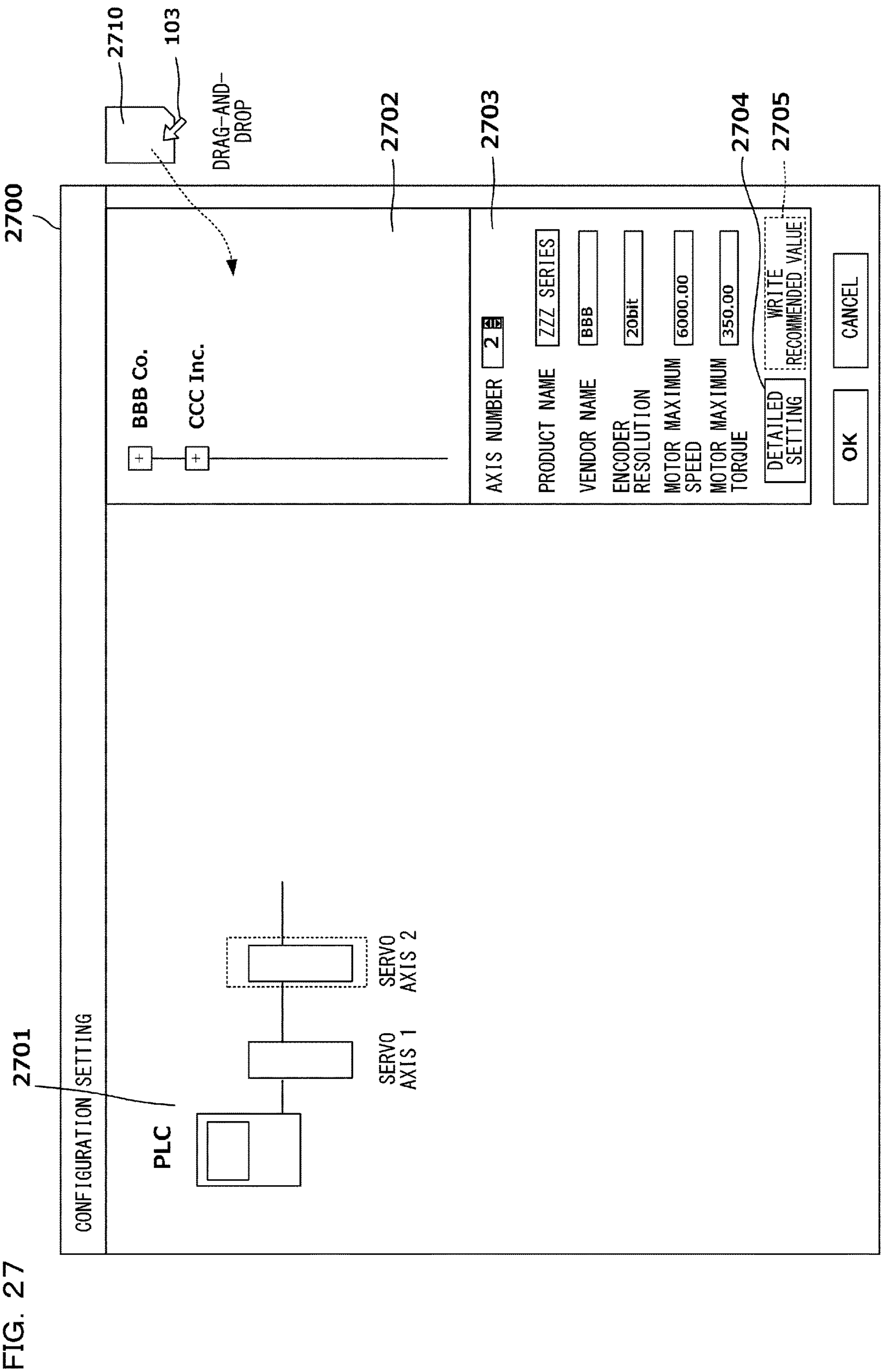
FIG. 27 is a view illustrating a configuration setting screen.

FIG. 27 illustrates a UI 2700 which is an example of a configuration setting screen (communication setting screen) displayed on the display part 7 by the configuration setting unit 502. In a configuration setting area 2701, an icon of the PLC (the basic unit 3) constituting the PLC system 1 and icons of the plurality of extension units (which are the motor drivers 4, but are expressed as servos) are displayed. Further, in this example, an axis number is assigned to each slave equipment and managed. An equipment list 2702 is a list of the master equipment and pieces of the slave equipment that can be set by the PC 2, and the master equipment and the slave equipment are divided for each vendor. The user can add master equipment or slave equipment to the equipment list 2702 by dragging and dropping or importing, to the equipment list 2702, an electronic file 2710 (for example, an EDS file or an ESI file) provided from a vendor that manufactures and sells the slave equipment for each slave equipment.

An equipment information display part 2703 displays an axis number, a product name (or a product code), a vendor name, and performance information (encoder resolution, a motor maximum speed, a motor maximum torque, and the like) of slave equipment (for example, Axis 2) selected by the user. A detailed setting button 2704 is a button for calling a detailed setting UI for the selected slave equipment. A recommended value write button 2705 is enabled when the selected equipment supports writing of a recommended value, and is a button for calling a recommended value writing UI (parameter setting screen).

Figure 28:
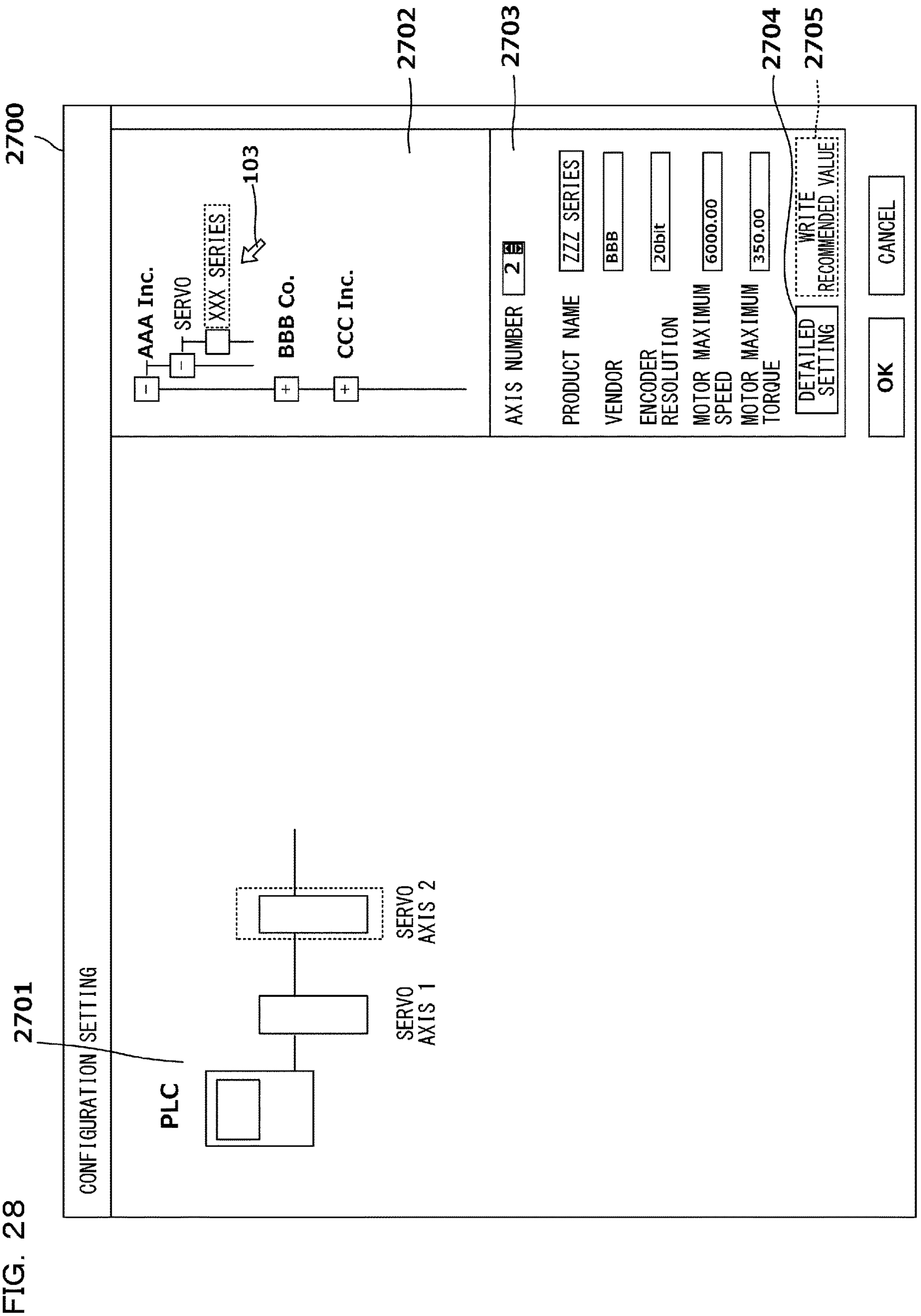
FIG. 28 is a view illustrating the configuration setting screen.

FIG. 28 illustrates a state in which slave equipment is added to the equipment list 2702 by dragging and dropping the electronic file 2710. In this state, when the added slave equipment is further dragged and dropped into the configuration setting area 2701, an icon of the slave equipment is added to the configuration setting area 2701.

Figure 29:
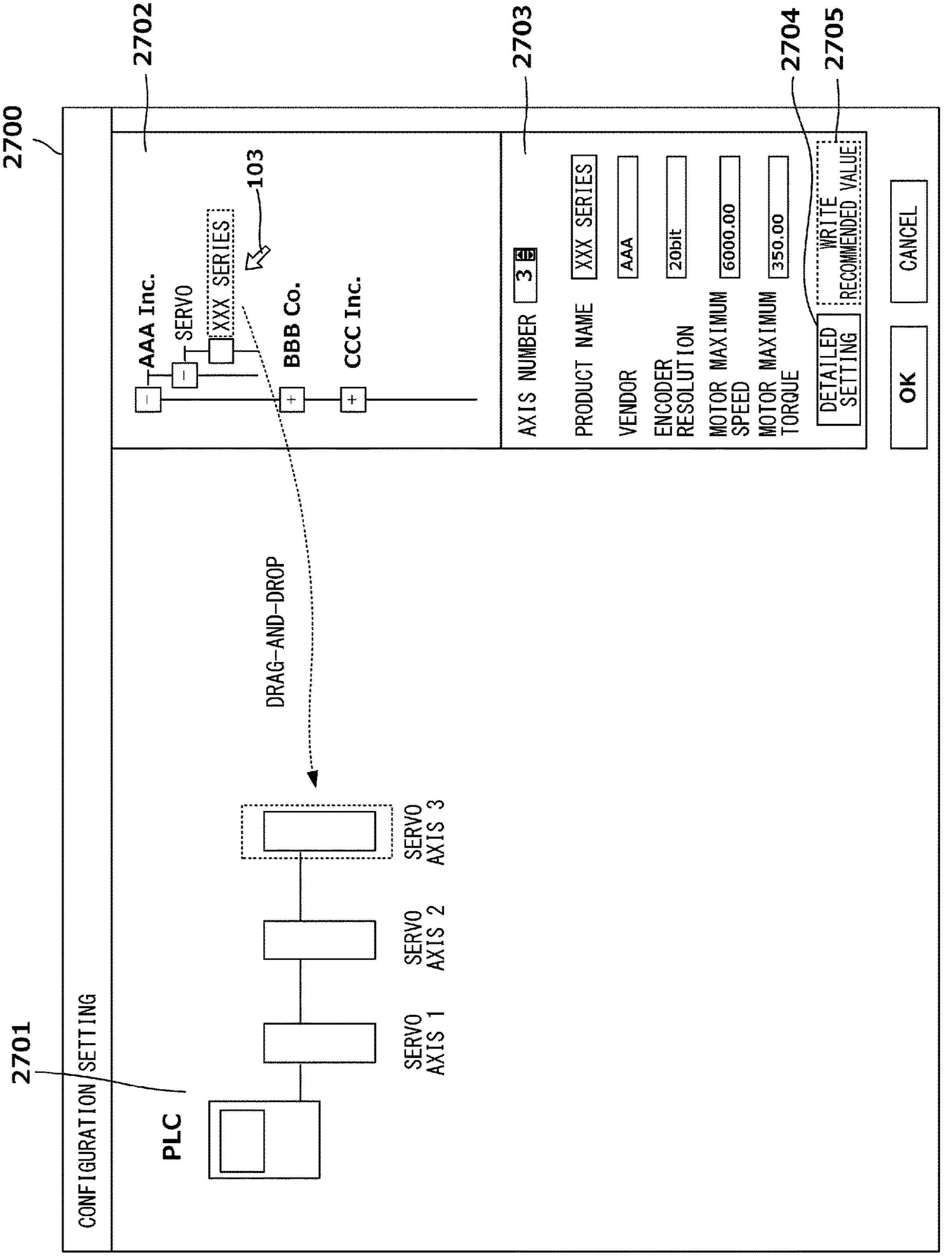
FIG. 29 is a view illustrating the configuration setting screen.

FIG. 29 illustrates a state in which the icon of the slave equipment is added to the configuration setting area 2701. The added slave equipment may be changed to a selected state. In this case, the equipment information display part 2703 displays an axis number (Axis 3), a product name (or a product code), a vendor name, and performance information (encoder resolution, a motor maximum speed, a motor maximum torque, or the like) of the selected slave equipment. In this example, since the slave equipment (Axis 3) supports writing of a recommended value, the recommended value write button 2705 is changed from a disabled state to an enabled state.

(3) Communication Format (Packet Format)

Figure 30:
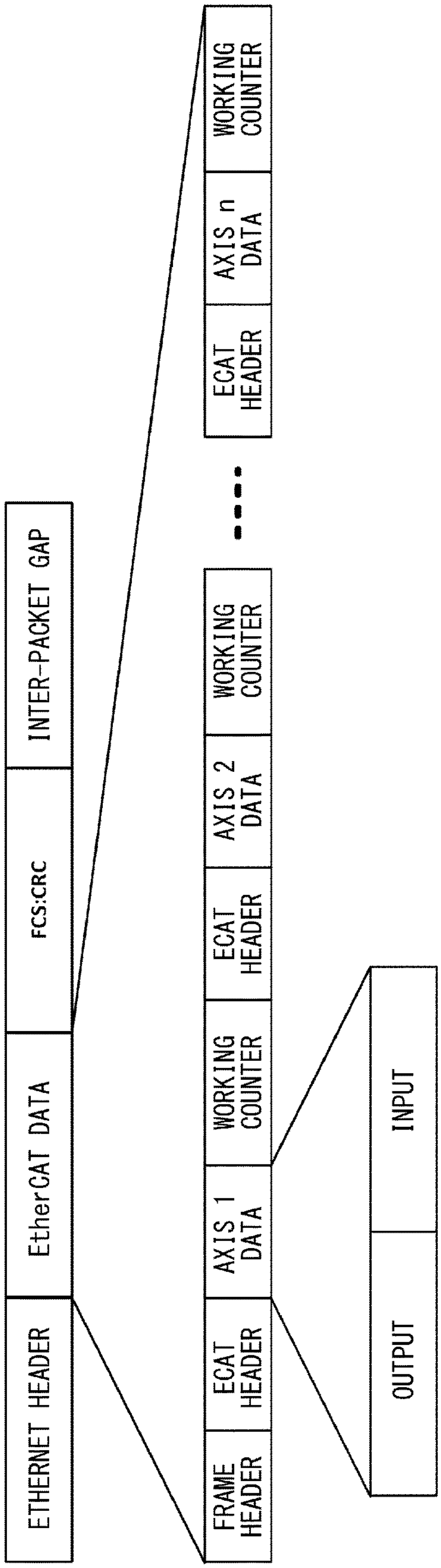
FIG. 30 is a view illustrating a communication format.

FIG. 30 illustrates a communication format used in cyclic communication performed by the master equipment and slave equipment in Industrial Ethernet. As an example, EtherCAT is adopted as Industrial Ethernet. A communication format of a physical layer of EtherCAT conforms to a communication format defined by IEEE 802.3. One packet includes an Ethernet header (22 bytes), EtherCAT data (46 bytes to 150 bytes), a frame check sequence (FCS): a cyclic redundancy check (CRC) (4 bytes), and an inter-packet gap (IPG) (12 bytes). The EtherCAT data includes a frame header and a data section of each slave equipment (axis). The data section for each slave equipment (axis) includes an EtherCAT header, axis data, and a working counter (for detection of unauthorized processing). Furthermore, the axis data includes output data and input data of slave equipment of the axis number thereof. As can be seen from FIG. 30, since the master equipment can exchange data with the entire slave equipment by one packet, ultra-high speed communication is achieved. Therefore, control data for the master equipment to control the slave equipment is transmitted and received by the cyclic communication.

(4) Detailed Setting Screen (Manual Setting Screen)

Figure 31:
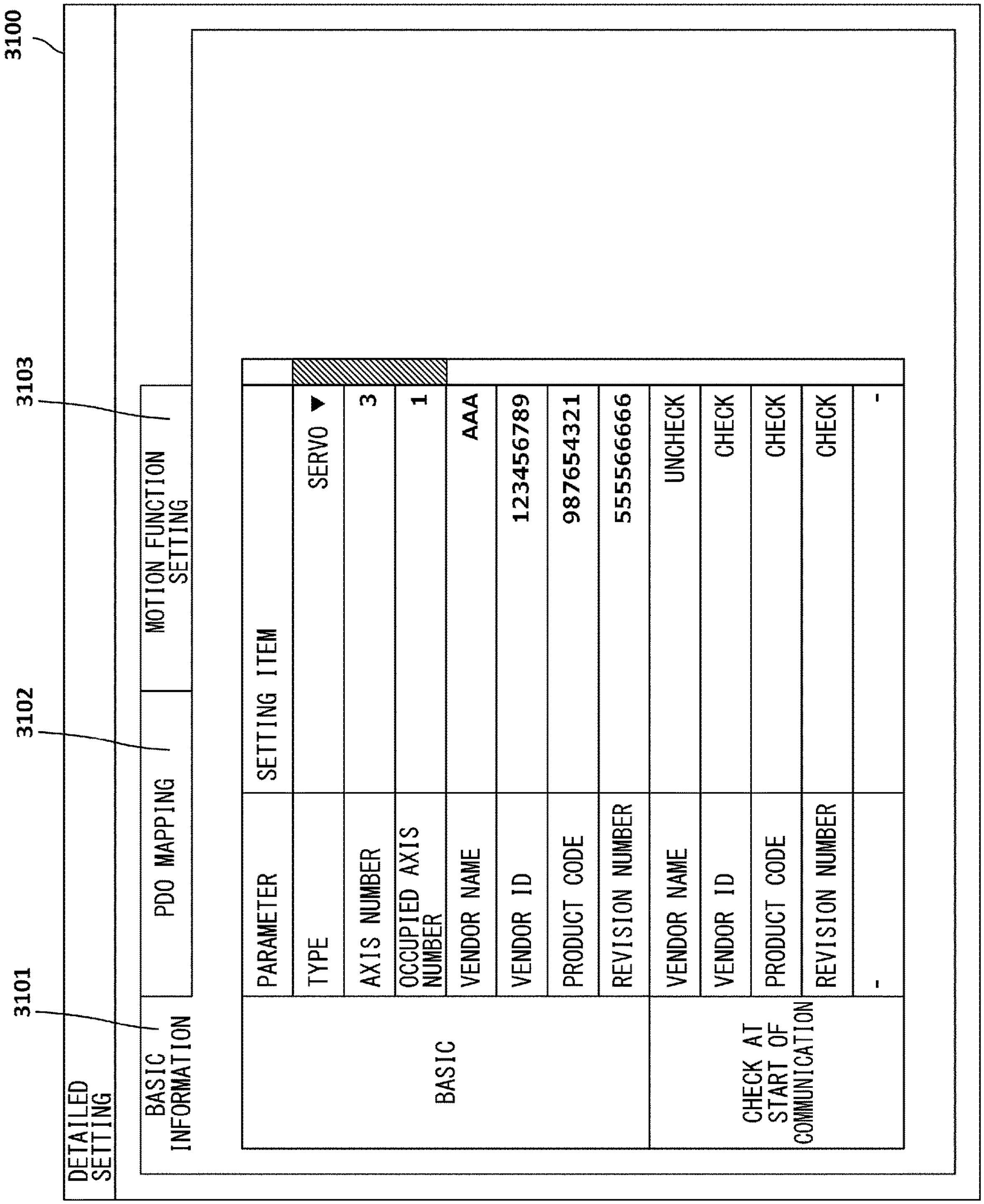
FIG. 31 is a view illustrating a detailed setting screen.

FIG. 31 illustrates a UI 3100 which is an example of a detailed setting screen displayed on the display part 7 by pressing the detailed setting button 2704. The CPU 11 generates and displays the UI 3100 based on the electronic file 2710. A tab 3101 displays basic information of the selected slave equipment. The basic information includes type information, an axis number, the number of occupied axes (the number of axes in a case where multiple axes are supported), a vendor name, a vendor ID, a product code, a revision number, and the like. "Check at start of communication" is an item list indicating which item is used to identify a slave out of information transmitted from the slave equipment when the master equipment and the slave equipment start the cyclic communication. In FIG. 31, "check" means that the corresponding item is included for identification of a communication target slave. "Uncheck" means that the corresponding item is not included for the identification of the communication target slave.

Figure 32:
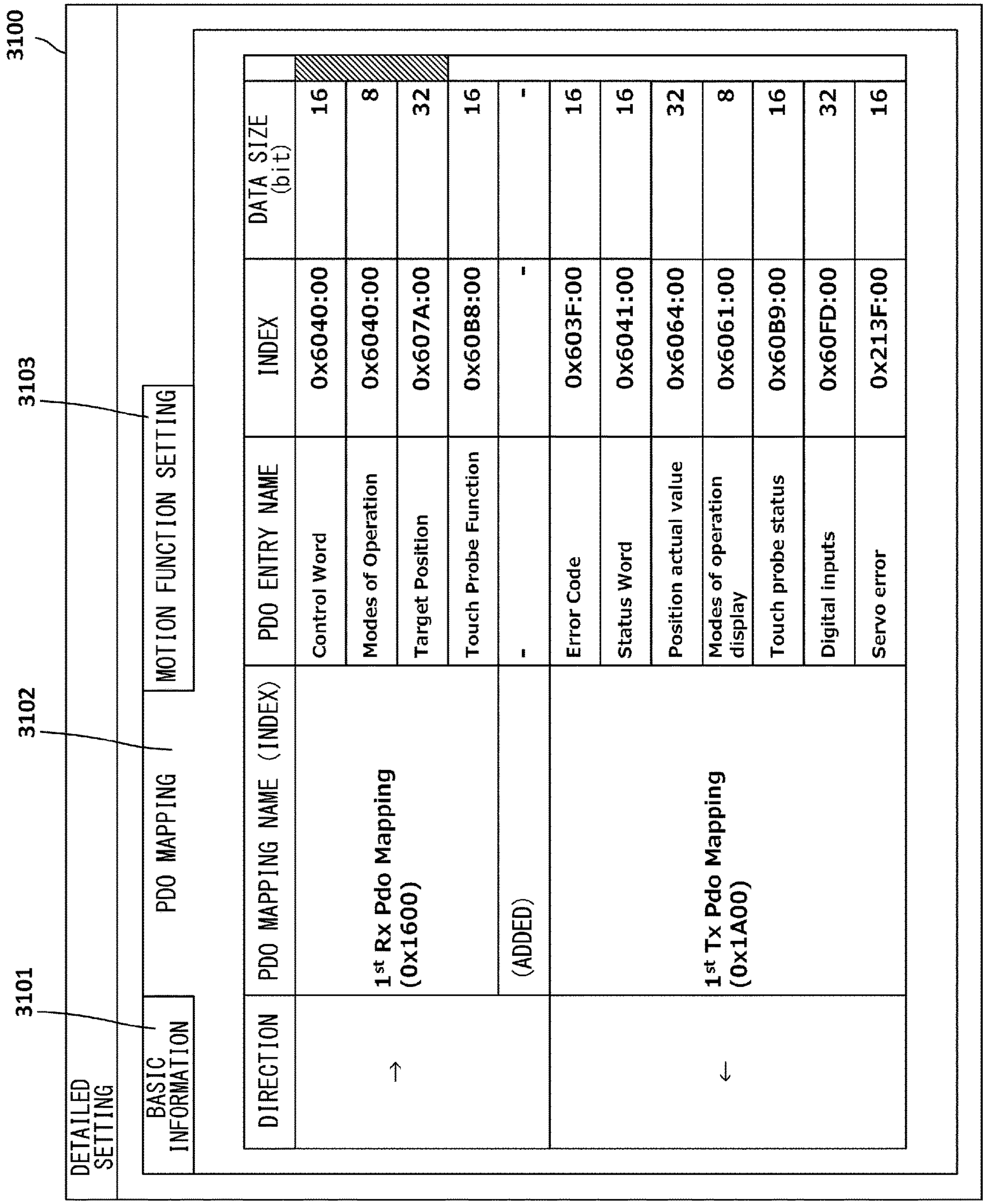
FIG. 32 is a view illustrating the detailed setting screen.

FIG. 32 illustrates details of a tab 3102. The tab 3102 is a tab for setting PDO mapping. Information generated by the PDO mapping may be referred to as mapping information. In this example, a name (PDO entry name) of a parameter (object) transmitted and received in the cyclic communication (PDO communication), an object index, and a data size of the parameter (object) are set. The user can perform addition and deletion in units of objects. The user needs to add and delete the object and set the PDO entry name, the index, and the data size to meet the specifications of the master equipment. Thus, this manual setting is difficult for the user.

FIG. 33 illustrates details of the tab 3102 regarding another slave equipment. As illustrated in FIG. 33, an initial value of each object is different for each slave equipment, and thus, it is necessary to add and delete the object and set the PDO entry name, the index, and the data size to meet the specifications of the master equipment.

FIG. 34 illustrates details of a tab 3103 for setting a motion function. In the tab 3103, an element of the motion function is associated with an object of the PDO communication. In this example, the object (object index) in which a motion calculation result (target position) is stored is assigned to an object of 607A:00 set in relation to PDO. A signal in which the motion function of the master equipment is regarded as a positive direction limit is assigned to the 0th bit of 60FD:00 set in relation to PDO.

In order to control the slave equipment using the motion function of the master equipment as described above, it is necessary to further connect a dedicated setting support apparatus to the slave equipment, assign any function (a limit, an origin sensor, or the like) to any input pin of the slave equipment, and reverse a motor rotation direction.

Further, the user executes a trial operation of a user program using the UI 2400 illustrated in FIG. 24. At that time, the user connects the motor 10 to a load, and examines whether the motor rotation direction is as expected by the user, whether a positive-side limit sensor, a negative-side limit sensor, and the origin sensor operate normally, and whether the coordinate transformation is correct (whether the load is actually moved by 10 mm with respect to an instruction for movement by 10 mm). Therefore, the setting and the trial operation are repeated only by the manual setting, which is extremely troublesome work for the user.

Note that setting targets required to control the slave equipment using the motion function of the master equipment include the following.

- Setting input assignment and polarity for assigning control of limit to master equipment
- Setting input assignment and polarity of signal used in return to original
- Setting input assignment and polarity for capturing coordinate when sensor is turned on
- Unavailability of all control modes (position control, speed control, and torque control) unless predetermined control mode is set due to model-specific circumstance When the user performs the manual setting, the user needs to manually confirm a required specification from the master equipment to the slave equipment and a specification of a parameter of the slave equipment.

Therefore, an automatic setting function of the present example supports automation of PDO settings and motion function settings and writing of a recommended value of a parameter. This significantly alleviates the burden on the user.

(5) Automatic Setting

FIG. 35 illustrates an example of assignment information 3500 necessary for the automatic setting. The assignment information 3500 has a vendor ID, a product code, and a revision number for specifying each slave equipment. Furthermore, the assignment information 3500 includes PDO settings, motion function settings, and recommended values associated with the above pieces of identification information. The PDO setting indicates an index of an object communicated in the PDO communication (cyclic communication). The motion function setting indicates any object (index) to which a motion function is assigned. The recommended value is a recommended value of a parameter of the motion function described above.

Figure 36:
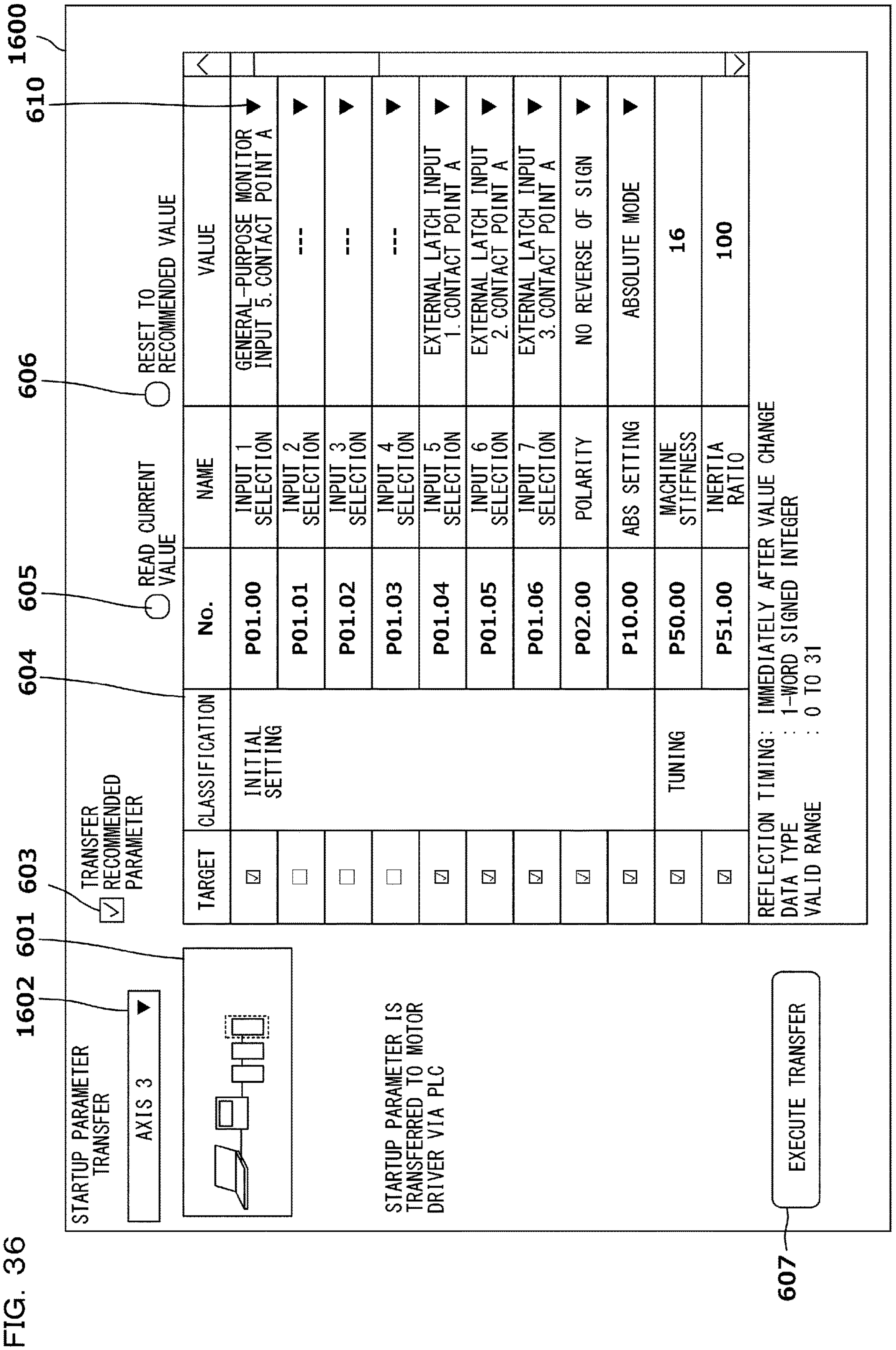
FIG. 36 is a view illustrating a recommended value writing screen.

FIG. 36 illustrates a UI 1600 which is an example of a recommended value writing screen displayed when the recommended value write button 2705 is pressed. As described above, the UI 1600 has a check box 603 for selecting whether to execute transfer of a recommended value of a parameter. When the recommended value write button 2705 is pressed, the UI 1600 is displayed on the display part 7 in a state where the check box 603 is checked. The UI 1600 is merely an example, and another parameter setting screen such as the UI 600 may be displayed.

(6) Functions of CPU of Setting Support Apparatus

Figure 37:
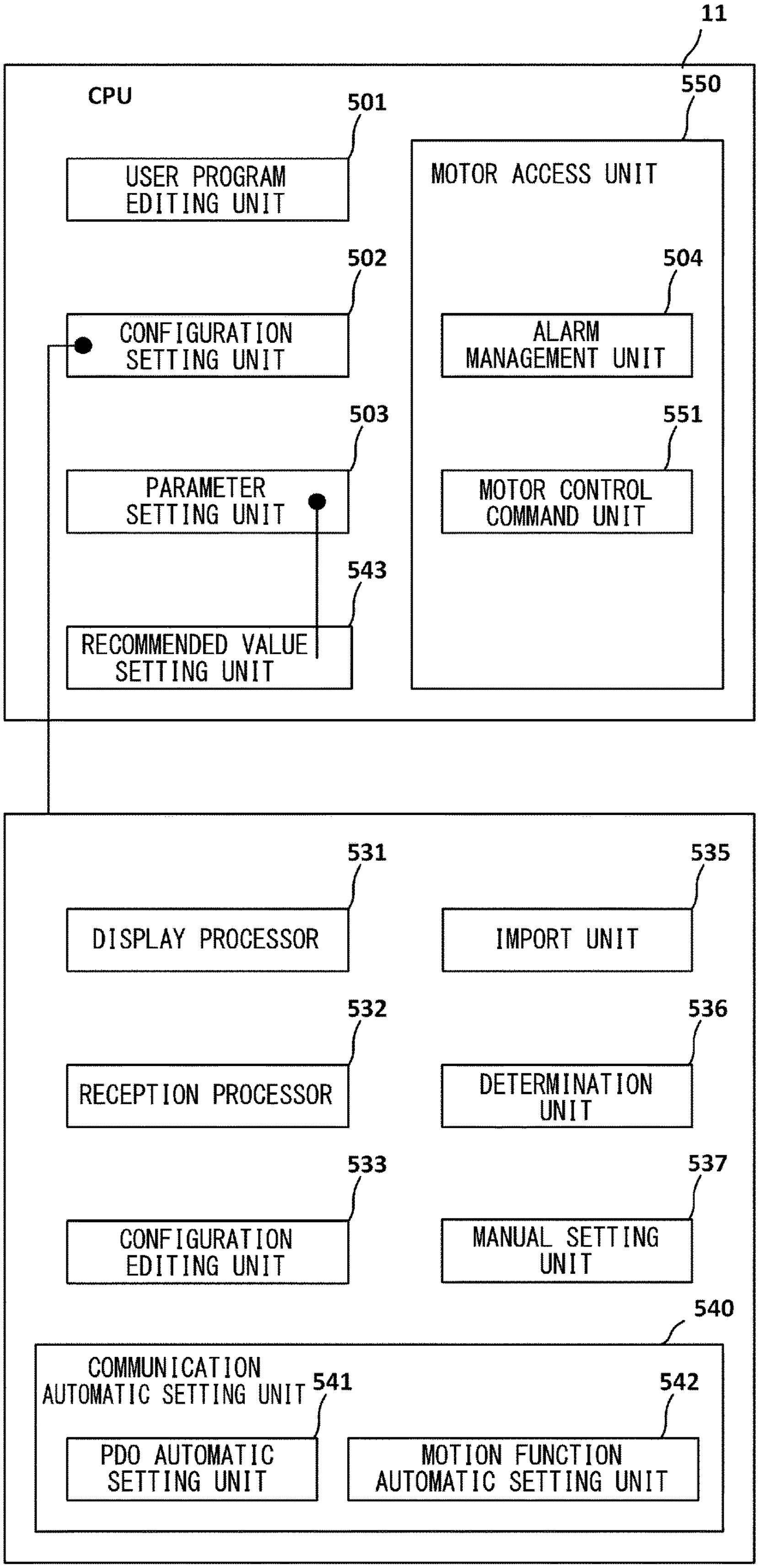
FIG. 37 is a diagram illustrating functions of a CPU.

FIG. 37 illustrates functions implemented by the CPU 11 executing the setting support program 21. In addition to the functions already described, the following functions are further added.

The configuration setting unit 502 includes a display processor 531, a reception processor 532, a configuration editing unit 533, an import unit 535, a determination unit 536, a manual setting unit 537, an automatic setting unit 540, and the like. The display processor 531 displays the UI 2700 on the display part 7. The reception processor 532 receives a user input through the operation part 8. The configuration editing unit 533 processes addition and deletion of the master equipment and the slave equipment displayed on the UI 2700. The import unit 535 is in charge of importing the electronic file 2710 and updates the equipment list 2702 according to the electronic file 2710. The determination unit 536 determines whether the slave equipment can automatically make the communication setting and whether the slave equipment supports automatic writing of a recommended value based on the electronic file 2710 and the assignment information 3500. The manual setting unit 537 manually make PDO settings and motion function settings based on a user input through the UI 3100. The automatic setting unit 540 includes a PDO automatic setting unit 541 and a motion function automatic setting unit 542. The PDO automatic setting unit 541 refers to the assignment information 3500, acquires the PDO settings associated with the product specifying information (vendor ID, product code, and revision number) of the selected slave equipment, and reflects the PDO settings in the configuration information of the PLC system 1. The motion function automatic setting unit 542 refers to the assignment information 3500, acquires the motion function settings associated with the product specifying information (vendor ID, product code, and revision number) of the selected slave equipment, and reflects the motion function settings in the configuration information of the PLC system 1.

The parameter setting unit 503 further includes a recommended value setting unit 543. The recommended value setting unit 543 acquires recommended values of parameters associated with the product specifying information (vendor ID, product code, and revision number) of the selected slave equipment, and transfers and writes the recommended values to the selected slave equipment.

A motor access unit 550 includes the above-described alarm management unit 504 and a motor control command unit 551. The motor control command unit 551 executes a trial operation of the user program using, for example, the UI 2400 illustrated in FIG. 24. The trial operation may include any of the JOG operation, the point operation, and the return to the origin.

(7) Flowchart

Figure 38:
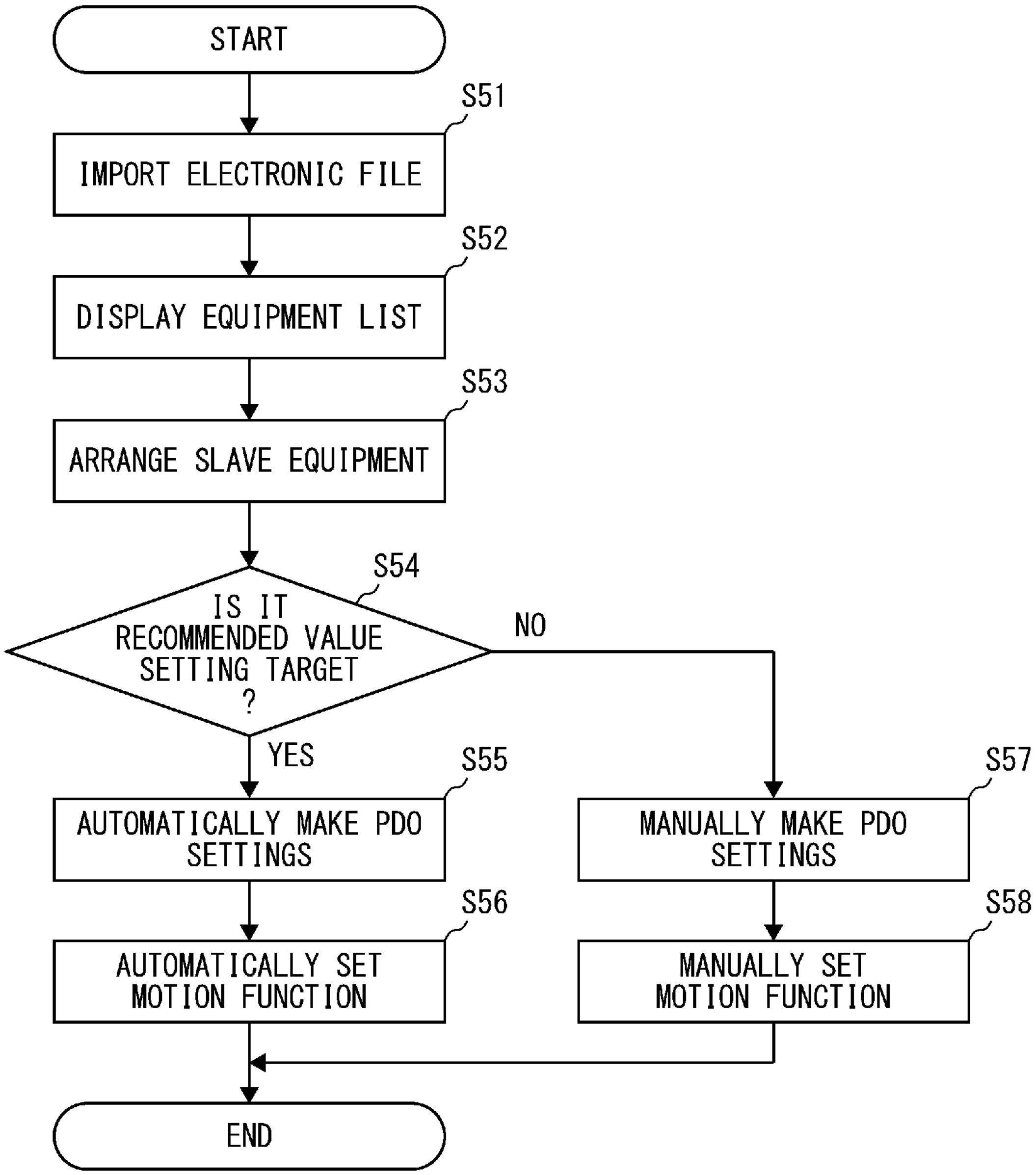
FIG. 38 is a flowchart illustrating a communication setting method.

FIG. 38 illustrates a cyclic communication setting method executed by the CPU 11 according to the setting support program 21. Note that it is assumed that the UI 2700 is already displayed on the display part 7.

In S51, the CPU 11 (the import unit 535) imports the electronic file 2710 according to a user operation.

In S52, the CPU 11 (the import unit 535) displays the equipment list 2702 to which information on slave equipment is added according to contents of the electronic file 2710.

In S53, the CPU 11 (the configuration editing unit 533) arranges the slave equipment selected in the equipment list 2702 in the configuration setting area 2701 according to a user operation.

In S54, the CPU 11 (the determination unit 536) determines whether the slave equipment selected by the user is a recommended value setting target. For example, the determination unit 536 may determine whether an entry associated with product specifying information (a vendor ID, a product code, and a revision number) of the slave equipment selected by the user is included in the assignment information 3500. In a case where the entry associated with the product specifying information of the slave equipment selected by the user is included in the assignment information 3500, the CPU 11 determines that the slave equipment is the recommended value setting target. Then, the CPU 11 proceeds from S54 to S55. In a case where the entry associated with the product specifying information of the slave equipment selected by the user is not included in the assignment information 3500, the CPU 11 determines that the slave equipment is not the recommended value setting target. Then, the CPU 11 proceeds from S54 to S57.

In S55, the CPU 11 (the PDO automatic setting unit 541) reads PDO settings associated with the slave equipment from the assignment information 3500, and automatically make the PDO settings. For example, a communication target object is added according to the PDO settings read from the assignment information 3500. As a result, a communication target control command (for example, a control word, a target position, or a state word) is associated with an object index (for example, 0x6040:00, 0x607A:00, or 0x60FF:00). As a result, communication contents in the cyclic communication are specified.

In S56, the CPU 11 (the motion function automatic setting unit 542) reads motion function settings associated with the slave equipment from the assignment information 3500, and automatically makes the motion function settings. For example, a motion function (for example, a control word or a target position) is associated with the object index (for example, 0x6040:00 or 0x607A:00) according to the motion function settings read from the assignment information 3500. As a result, which object index is used to implement the motion function is specified.

In S57, the CPU 11 (the manual setting unit 537) manually makes PDO settings according to a user operation. For example, the PDO settings are made manually through the tab 3102.

In S58, the CPU 11 (the manual setting unit 537) manually makes motion functions according to a user operation. For example, the motion function settings are made manually through the tab 3103.

Figure 39:
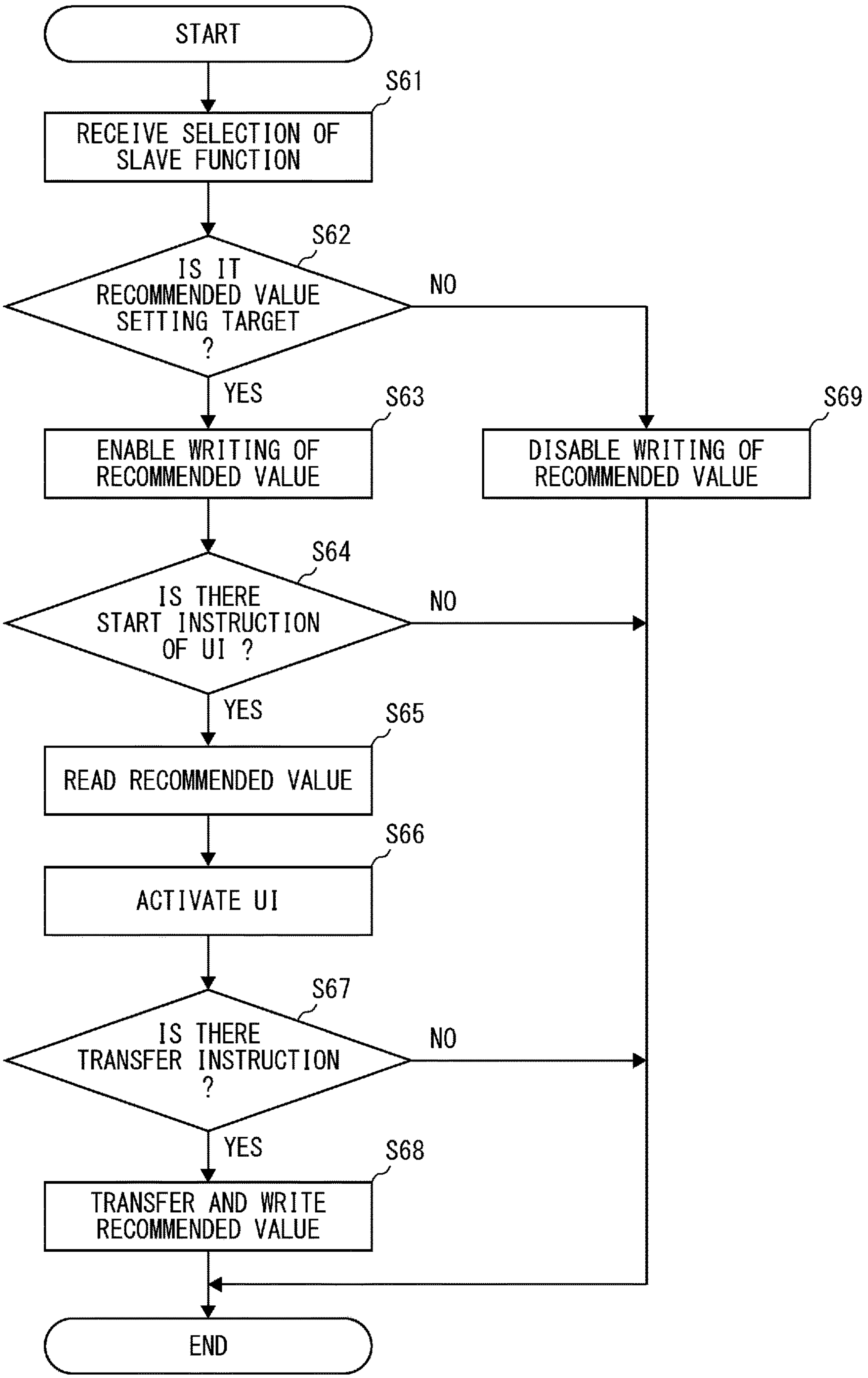
FIG. 39 is a flowchart illustrating a recommended value writing method.

FIG. 39 illustrates a recommended value writing method executed by the CPU 11 according to the setting support program 21. Note that it is assumed that the UI 2700 is already displayed on the display part 7.

In S61, the CPU 11 (the recommended value setting unit 543) receives selection of slave equipment. For example, the recommended value setting unit 543 receives the selection of the slave equipment via the equipment list 2702.

In S62, the CPU 11 (the recommended value setting unit 543) determines whether the slave equipment selected by the user is a recommended value setting target. For example, the recommended value setting unit 543 may determine whether recommended values associated with product specifying information (vendor ID, product code, and revision number) of the slave equipment selected by the user are included in the assignment information 3500. In a case where the slave equipment selected by the user is the recommended value setting target, the CPU 11 proceeds from S62 to S63. On the other hand, in a case where the slave equipment selected by the user is not the recommended value setting target, the CPU 11 proceeds from S62 to S69, and disables writing of the recommended values. For example, the CPU 11 hides or grays out the recommended value write button 2705.

In S63, the CPU 11 (the recommended value setting unit 543) enables writing of the recommended values. For example, the CPU 11 displays the recommended value write button 2705 so as to be operable by the user.

In S64, the CPU 11 (the recommended value setting unit 543) determines whether an instruction to activate the UI 1600 has been input by the user. When the instruction to activate the UI 1600 is input, the CPU 11 proceeds from S64 to S65.

In S65, the CPU 11 (the recommended value setting unit 543) reads the recommended values of the slave equipment selected by the user from the assignment information 3500. As described above, the product specifying information of the slave equipment selected by the user is associated with the recommended values. Thus, the recommended values are easily specified based on the product specifying information.

In S66, the CPU 11 (the recommended value setting unit 543) creates the UI 1600 reflecting the recommended values and activates the UI 1600. As a result, the UI 1600 is displayed on the display part 7.

In S67, the CPU 11 (the recommended value setting unit 543) determines whether a transfer instruction has been input by the transfer execution button 607. When the transfer instruction is input, the CPU 11 proceeds from S67 to S68.

In S68, the CPU 11 (the recommended value setting unit 543) transfers and writes the recommended values of parameters to the slave equipment selected by the user. The transfer of the recommended values of the parameters is executed by message communication (SDO communication). That is, the PC 2 sets the basic unit 3 such that the recommended values are transferred by the message communication and written to the slave equipment. The basic unit 3 transfers the recommended values to the slave equipment according to a write request from the PC 2. The slave equipment writes the recommended values to the parameters according to the write request. The recommended values referred to in the present example will be supplemented. Normally, optimum initial values (default values) are set as the parameters of the slave equipment according to a design idea of each company. For example, it is assumed that an initial value A is set to a specific parameter in slave equipment of Company A so as to make it difficult to operate arbitrarily in order to obtain a higher sense of security, whereas an initial value B is set to the specific parameter in slave equipment of Company B so as to make it easy to operate even at the expense of some sense of security. When the slave equipment of Company A and the slave equipment of Company B are used together as a plurality of pieces of slave equipment connected to a PLC, there is a case where the entire system does not operate as desired (for example, a motor does not operate for some reason). This is because design ideas of pieces of the slave equipment are not uniform. In other words, the initial value A is optimized only for the slave equipment of Company A, and the initial value B is optimized only for the slave equipment of Company B. In a PLC system in which the slave equipment of Company A and the slave equipment of Company B are used together, a user needs to undergo trial and error while viewing manuals regarding whether a value corresponding to the initial value A or a value corresponding to the initial value B should be set to each piece of the slave equipment. Therefore, in the setting support apparatus according to the present example, the design ideas of pieces of the slave equipment of the entire PLC system can be made uniform by writing a recommended value optimum for specifications of the PLC system to each piece of the slave equipment. As a result, it is possible to easily make settings of the slave equipment.

<Others>

The PC 2 may read a device value, a buffer value, a variable value, a camera image, and the like from the basic unit 3 or the extension unit (for example, the motor driver 4) in real time, create a graph, and display the graph on the display part 7. As a result, the user can monitor a current state of the PLC system 1.

On the other hand, when an event, such as an error or an alarm, occurs, the basic unit 3 or the extension unit may record a device value, a buffer value, a variable value, and a camera image before and after the occurrence time to create history data. The PC 2 may acquire the history data by communication or via a memory card, create a graph as necessary, and display the graph on the display part 7.

In this manner, the PC 2 has two types of monitoring functions. Since these two monitoring functions are independent functions, display targets in the respective monitoring functions are also irrelevant. Therefore, when one of the two monitoring functions is activated, the user needs to set a device or the like to be monitored by the activated monitoring function. Further, when the user switches from one monitoring function to the other monitoring function, the user needs to set again a device or the like to be monitored for the other monitoring function.

Therefore, in the present example, the PC 2 (engineering tool) capable of taking over a monitoring target of one monitoring function to the other monitoring function is provided.

(1) Basic Unit

The CPU 31 reads a current value of a device stored in a device memory ensured in the memory 32 and a current value of a variable stored in a variable memory, and displays the read values on the PC 2 via the communication part 33*a*. The CPU 31 acquires history data (for example, a device value, a buffer value, image data, and error information) from the basic unit 3 or the extension unit 4, stores the history data in the memory 32 or a memory card, and transmits the history data to the PC 2 via the communication part 33*a*. The CPU 31 may execute the acquisition of the history data with a predetermined event (for example, occurrence of an error or an alarm) as a trigger. The CPU 31 adds time information indicating the time when the history data is acquired to the history data.

(2) Extension Unit

(2-1) Extension Unit such as Motion Unit

The CPU 41 writes information in a memory 42 and reads information from the memory 42. The memory 42 may have a buffer memory. In the buffer memory, for example, a coordinate of a load controlled by the motor 10 is stored, or data used for calculation executed inside the motor driver 4 is stored.

The CPU 41 acquires a current buffer value (current data) stored in a buffer memory 46, and transmits the current buffer value to the PC 2 via the communication part 43. Further, the CPU 41 may transmit image data acquired by a camera to the PC 2 via the communication part 43.

(2-2) Extension Unit as Data Collection Unit

The CPU 41 may function as a history data providing unit or a history acquisition unit instead of the basic unit 3. The CPU 41 (the history acquisition unit) communicates with the basic unit 3 and the other extension units via the communication part 43, acquires a device value, a variable value, a buffer value, image data, and the like, and stores them in the memory 42 or writes them in a memory card. The CPU 41 (the history data providing unit) communicates with the PC 2 via the communication part 43, reads history data from the memory 42, and transmits the history data to the PC 2. The CPU 41 may include the image data acquired by the camera in the history data.

(3) <Functions of CPU of PC>

The CPU 11 (a reception unit) receives designation of input/output data to be monitored which is input by the user through the operation part 8. The CPU 11 (a current data acquisition unit) sequentially acquires current input/output data (for example, device values, buffer values, and image data) in the PLC system 1. The input/output data is acquired from the basic unit 3 or the extension unit, for example. The CPU 11 (a history data acquisition unit) acquires, as history data, the input/output data recorded in time series together with time information based on occurrence of a predetermined event. The history data is acquired from, for example, the basic unit 3, a data collection unit, or a memory card. The CPU 11 (a UI unit) generates a graph from current data and the history data, and displays the graph on the display part 7. The UI is an abbreviation for user interface. The CPU 11 (the UI unit) may have a plurality of display modes. For example, the CPU 11 (the UI unit) includes the CPU 11 (a current graph generation unit) that sequentially acquires input/output data designated through the CPU 11 (the reception unit) by the CPU 11 (the current data acquisition unit) and graphically displays the input/output data in time series in a first mode (for example, a current value mode). The CPU 11 (the UI unit) may include the CPU 11 (a history graph generation unit) that generates a graph screen graphically displaying the history data acquired by the CPU 11 (the history data acquisition unit) in time series in a second mode (for example, a history mode). In the second mode (for example, the history mode), the CPU 11 (the history graph generation unit) may generate a graph screen graphically displaying input/output data, designated through the CPU 11 (the reception unit), in time series out of the history data. The first mode may be referred to as a normal mode or the current value mode. The second mode may be referred to as the history mode or a replay mode.

The user gives an instruction for switching from one of the first mode and the second mode to the other mode through the operation part 8. At that time, the CPU 11 (a management unit) may take over information for designating a monitoring target in one mode to the other mode, and make the monitoring target consistent between the one mode and the other mode based on the information. In general, the user can select a desired mode from the plurality of modes and designate data to be monitored on a display screen in the desired mode, thereby displaying a graph of desired data on the display screen. Therefore, when switching from the one mode to the other mode is executed, the user needs to designate data to be monitored again on a display screen in the other mode. Requesting the user to designate a large number of monitoring targets each time a mode is switched would lack usability. Therefore, the usability is improved when the CPU 11 (the management unit) executes the process of taking over the monitoring target. That is, the burden on the user caused by re-designation of the monitoring target at the time of mode switching is alleviated.

Based on information for designating a monitoring target in the one mode, the CPU 11 (the management unit) may specify input/output data to be monitored in the other mode. The CPU 11 (the management unit) may determine whether the specified input/output data can be acquired in the other mode. For example, there may be a case where a current value of a device can be acquired, but no history data for the device has been recorded. This is because a history target related to the history data was set in the past. In this manner, in a case where the specified input/output data cannot be acquired in the other mode, the CPU 11 (the management unit) may correct or create information for designating a monitoring target for the other mode so as to exclude the specified input/output data from the monitoring target in the other mode.

In this manner, when the one mode is the first mode (current value mode) and the other mode is the second mode (history mode), the input/output data that cannot be acquired in the other mode is input/output data that is not included in the history data.

The CPU 11 (the management unit) displays various screens on the display part 7 through the CPU 11 (the UI unit). The CPU 11 (the management unit) may display a confirmation screen for specifying a plurality of pieces of input/output data to be monitored in the other mode based on the information for designating the monitoring target for the one mode and allowing the user to confirm whether to set each of the plurality of pieces of input/output data as a monitoring target. The CPU 11 (the management unit) and the CPU 11 (the reception unit) may receive designation of input/output data that needs to be monitored or input/output data that needs to be deleted from the monitoring target through the confirmation screen. There may be some users who desire to change some monitoring targets between a mode before switching and a mode after the switching. Therefore, users may be given an opportunity to select a monitoring target through the confirmation screen.

The CPU 11 (the UI unit) may display the graph screen for the one mode and then display the graph screen for the other mode. That is, the CPU 11 (the UI unit) may display the graph screen for the other mode on the display part 7 while continuing to display the graph screen for the one mode. This would enable the user to easily compare current data with the history data.

The CPU 11 (the UI unit) may generate a graph screen to display such that the same input/output data to be monitored for the other mode is displayed in an overlapping manner with the input/output data to be monitored for the one mode. This would enable the user to easily compare current data with the history data.

Among device values and buffer values, there may be a value that can be acquired from the CPU 11 (the current data acquisition unit) and a value that cannot be acquired from the CPU 11 (the current data acquisition unit). In this case, a mode for displaying current data that can be acquired from the CPU 11 (the current data acquisition unit) may also be referred to as the normal mode. Further, a mode for displaying current data that cannot be acquired from the CPU 11 (the current data acquisition unit) but can be acquired by the CPU 11 (a special data acquisition unit) may be also referred to as a special mode. The CPU 11 (the special data acquisition unit) may function as a restricted data acquisition unit that sequentially acquires input/output data restricted from being acquired by the CPU 11 (the current data acquisition unit) out of current input/output data in the PLC system 1. The CPU 11 (the current graph generation unit) of the CPU 11 (the UI unit) is configured to generate a graph screen graphically displaying input/output data designated through the CPU 11 (the reception unit) in time series out of input/output data acquired by the CPU 11 (the special data acquisition unit) in a third mode (for example, the special mode). At the time of switching from one mode among the current value mode, the history mode, and the special mode to another mode, the CPU 11 (the management unit) may take over information for designating a monitoring target in the one mode to the another mode, and make the monitoring target consistent between the one mode and the another mode based on the information. This alleviates the burden on the user designating the monitoring target when switching is executed among the three display modes. Note that a range of data accessible by the current value mode may be a part of a range of data accessible by the special mode. In this case, in the special mode, it is possible to access the entire data accessible in the current value mode. On the contrary, the range of data accessible by the special mode may be a part of the range of data accessible by the current value mode. Alternatively, the current value mode and the special mode have a common accessible range, and also have unique ranges respectively accessible by these modes. For example, one mode can access both the device memory and the buffer memory, whereas the other mode can access the device memory but cannot access the buffer memory. Alternatively, a data memory may be divided into a first group, a second group, and a third group, one mode can access only the first group and the second group, and the other mode can access only the second group and the third group.

The information for designating the monitoring target includes a display setting indicating at least one of a display format of a graph of the monitoring target on a graph screen, a display color of the monitoring target, a display range of the monitoring target, a display position of the graph of the monitoring target, and a scale of the graph of the monitoring target. The display setting may be stored in the storage apparatus 12 as a part of setting data. The CPU 11 (the management unit) may transfer the display setting of the monitoring target in one mode to a display setting of another mode.

<Technical Ideas Derived from Example>

[Viewpoint A]

[Viewpoint A1]

The basic unit 3 is an example of a programmable logic controller that functions as a master in network communication. The motor driver 4 is an example of a motor driving apparatus that functions as a slave in the network communication and drives a motor based on motor control data transferred from the master by cyclic communication. The PC 2 is an example of a setting support apparatus that supports setting of the PLC system 1. The storage apparatus 12 functions as an assignment information storage unit that stores, among a plurality of setting parameters for a motor driving apparatus specified based on vendor specifying information (for example, vendor IDs) and product specifying information (for example, product codes and revision numbers), a plurality of adjustment-recommended parameters recommended to be adjusted for causing the motor driving apparatus to operate in conformity with the master as assignment information in association with the motor driving apparatus. The display part 7 and the display processor 521 are examples of a display part that displays a list (for example, the pull-down menu of the equipment selection part 602) of a plurality of the motor driving apparatuses each of which is associated with the vendor specifying information and the product specifying information. The reception processor 522 and the equipment selection part 602 are examples of a reception unit that receives selection of one motor driving apparatus from the list displayed on the display part. The editing unit 523 functions as a parameter value editing unit that displays, on the display part, an editing user interface for an adjustment-recommended parameter corresponding to the motor driving apparatus selected by the reception unit based on the assignment information (for example, the slave equipment information 23) stored in the assignment information storage unit, the editing user interface (for example, the UI 600) made common to the plurality of motor driving apparatuses having different combinations of the vendor specifying information and the product specifying information, receives a user operation through the editing user interface, and edits a parameter value of the adjustment-recommended parameter according to the user operation. The write processor 525 is an example of a write processor that writes the parameter value edited by the parameter value editing unit to the motor driving apparatus selected by the reception unit.

In this manner, a common parameter editing user interface is provided for a plurality of motor drivers of different manufacturers. This makes it easier to set the plurality of motor drivers as compared with the related art. Although the motor driver is adopted as an example here, the present example is also applied to slave equipment that operates with a PLC as the master.

[Viewpoint A2]

The parameter value editing unit (for example, the parameter setting unit 503) may display a list of only the adjustment-recommended parameters corresponding to the motor driving apparatus selected by the reception unit (for example, the reception processor 522 or the equipment selection part 602) on the editing user interface. As illustrated in FIG. 6 and the like, the CPU 11 (the display processor 521 of the parameter setting unit 503) displays the list of only the adjustment-recommended parameters corresponding to the selected motor driving apparatus on the UI 600. As a result, the number of parameters displayed on the editing user interface is reduced, and the UI that is easy for a user to view and edit is achieved.

[Viewpoint A3]

The editing user interface (for example, the UI 600) may display an initial value (for example, a setting value (default value) at the time of factory shipment or a value used in previous setting) as the adjustment-recommended parameter corresponding to the motor driving apparatus selected by the reception unit (for example, the reception processor 522 or the equipment selection part 602). The parameter value editing unit (for example, the editing unit 523 of the parameter setting unit 503) may change the adjustment-recommended parameter from the initial value according to a user operation. As a result, the user can know the initial value serving as a reference in setting the parameter, and thus, the parameter may be easily changed.

[Viewpoint A4]

The adjustment-recommended parameter includes at least any one of assignment of a function to an input terminal of the motor driving apparatus, a polarity of the input terminal, whether to enable connection of a limit switch to the input terminal, and a type of a contact point related to position control or speed control. These parameters are substantially essential parameters for a trial operation of the motor driver 4, and thus, are recommended to be adjusted by the user.

[Viewpoint A5]

The adjustment-recommended parameter may further include a type (for example, Incremental or absolute) of an encoder system in the motor driving apparatus. When the encoder system is unknown, a value obtained by an encoder is erroneously interpreted, and it becomes difficult to correctly control the motor driver 4. Thus, it is possible to correctly control the motor driver 4 by setting the type of the encoder system.

[Viewpoint A6]

A parameter value read unit (for example, the read processor 527) that reads, from the motor driving apparatus selected by the reception unit, a parameter value (for example, a current value) of the adjustment-recommended parameter set to the motor driving apparatus at that time may be further provided. The parameter value editing unit (for example, the editing unit 523 or the display processor 521) may display the parameter value read by the parameter value read unit on the editing user interface (for example, the UI 600). When the current value of the parameter is known, the user may be capable of correctly adjusting the parameter based on the current value.

[Viewpoint A7]

The parameter value editing unit (for example, the collation unit 524) may collate a parameter value edited by the parameter value editing unit with the parameter value read by the parameter value read unit, and display the collation result on the display part 7. As a result, the user can compare a difference between the current value and the parameter value that the user desires to set.

[Viewpoint A8]

The display part 7 and the display processor 521 may display a message (for example, FIG. 12) for guiding re-activation of the motor driving apparatus when the re-activation of the motor driving apparatus is required to make the adjustment-recommended parameter edited through the editing user interface valid in the motor driving apparatus. As described above, there is a case where the parameter value is not reflected in the motor driver 4 unless the motor driver 4 is re-activated. In such a case, the parameter value can be reflected in the motor driver 4 by prompting the user to execute the re-activation.

[Viewpoint A9]

The display part 7 and the display processor 521 may display a control object (for example, the software reset button 1205) for remotely giving an instruction for the re-activation of the motor driving apparatus when the re-activation of the motor driving apparatus is required to make the adjustment-recommended parameter edited through the editing user interface valid in the motor driving apparatus. As a result, the user can remotely re-activate the motor driver 4.

[Viewpoint A10]

When a user operation (for example, pressing of the write button 1203) for explicitly giving an instruction for writing of the parameter value edited by the parameter value editing unit into a nonvolatile memory of the motor driving apparatus selected by the reception unit is input, the write processor 525 may execute the writing of the parameter value into the nonvolatile memory. As a result, even when the power of the motor driver 4 is turned off, the edited parameter value is consecutively held in the motor driver 4. There are slave equipment in which the parameter value is written into the nonvolatile memory without an explicit instruction and slave equipment in which the parameter value is written into the nonvolatile memory based on an explicit instruction. In the latter case, the editing result may be held in the motor driver 4 even after the power is turned off by prompting the user to execute the writing.

[Viewpoint A11]

The adjustment-recommended parameter includes a parameter required for the trial operation of the motor driving apparatus. The user often connects a plurality of pieces of slave equipment of different manufacturers to the basic unit 3 and confirms their behavior by the trial operation. For this purpose, it is necessary to set the plurality of pieces of slave equipment in a state where the trial operation is possible. In the present example, the parameter required for the trial operation can be set through the common parameter setting screen, which is extremely convenient for the user.

[Viewpoint A12]

The trial operation may include any of the JOG operation, the point operation, and the return to the origin. As described in relation to FIG. 24, the JOG operation, the point operation, and the return to origin are parts of the trial operation. Thus, parameters required to execute the JOG operation, the point operation, and the return to origin are set through the parameter setting screen.

[Viewpoint A13]

The parameter value editing unit (for example, the editing unit 523 or the reception processor 522) may receive editing of another parameter different from the adjustment-recommended parameter together with the adjustment-recommended parameter through the editing user interface. Although the adjustment-recommended parameter is adjusted on the common parameter setting screen in the above description, another parameter different from the adjustment-recommended parameter may be adjusted on the common parameter setting screen. For example, another parameter not required for the trial operation may be edited by the UI 600 or the like. Note that there is a case where the adjustment-recommended parameter and another parameter need to be written at the same time due to a problem of a processing unit. In this case, the adjustment-recommended parameter and another parameter different from the adjustment-recommended parameter are transferred together and written.

[Viewpoint A14]

The alarm management unit 504 is an example of an alarm processor that acquires an alarm code from the motor driving apparatus and displays alarm information corresponding to the alarm code on the display part 7. It is sufficient for the alarm code to be identification information (for example, an alarm detail code) that is transmitted from the motor driver 4 by cyclic communication or message communication and can identify an alarm occurring in the motor driver 4.

[Viewpoint A15]

As illustrated in FIGS. 24 and 25, the alarm information includes at least one of a name of the motor driving apparatus (for example, ABC XXX series), the alarm detail code (for example, 14-0) including only an index or the index and a sub-index, and an alarm message (for example, overcurrent protection) that is text information, which are associated with the alarm code. In the related art, only the presence or absence of occurrence of an alarm is displayed. However, in the present example, more detailed information is displayed, and thus, the user can immediately understand contents of the alarm without examining a manual or the like.

[Viewpoint A16]

When a display language of the alarm message supports multiple languages, the display part 7 and the alarm management unit 504 display the alarm message in a display language of the setting support apparatus. This may save labor of the user for designating in which language the alarm message is to be displayed.

[Viewpoint A17]

There is provided a control method for a setting support apparatus that supports setting of a system including a programmable logic controller that functions as a master in network communication and a motor driving apparatus that functions as a slave in the network communication and drives a motor based on motor control data transferred from the master by cyclic communication. The control method includes:

- storing a plurality of adjustment-recommended parameters, which are recommended to be adjusted among a plurality of setting parameters for a motor driving apparatus specified based on vendor specifying information and product specifying information, for causing the motor driving apparatus to operate in conformity with the master in an assignment information storage unit in association with the motor driving apparatus as assignment information;
- displaying, on a display part, a list of a plurality of the motor driving apparatuses each of which is associated with the vendor specifying information and the product specifying information;
- receiving selection of one motor driving apparatus from the list displayed on the display part;
- displaying, on the display part, an editing user interface of an adjustment-recommended parameter corresponding to the selected motor driving apparatus based on the assignment information stored in the assignment information storage unit, the editing user interface being made common to the plurality of motor driving apparatuses having different combinations of the vendor specifying information and the product specifying information, receiving a user operation through the editing user interface, and editing a parameter value of the adjustment-recommended parameter according to the user operation; and
- writing the edited parameter value to the selected motor driving apparatus.

[Viewpoint A18]

There is provided a program (for example, the setting support program 21) for causing a processor (for example, the CPU 11) to execute the control method for a setting support apparatus described in Viewpoint 17.

[Viewpoint B]

[Viewpoint B1]

The basic unit 3 is an example of a programmable logic controller that functions as a master in network communication. The motor driver 4 is an example of a motor driving apparatus that functions as a slave in the network communication and drives a motor based on motor control data transferred from the master by cyclic communication. The PC 2 is an example of a setting support apparatus that supports setting of the PLC system 1. The CPU 11, the configuration setting unit 502, and the configuration editing unit 533 are examples of a configuration editing unit that selects any motor driving apparatus from among a plurality of the motor driving apparatuses each of which is specified based on vendor specifying information (for example, vendor IDs) and product specifying information (for example, product codes and revision numbers), and sets the selected motor driving apparatus as the slave to the programmable logic controller functioning as the master. The storage apparatus 12 is an example of a storage unit that stores assignment information (for example, the assignment information 3500) each of which is associated with the vendor specifying information and a plurality of pieces of the product specifying information. The assignment information may include mapping information (for example, PDO settings) for mapping a data object handled by the motor driving apparatus as a communication target of the cyclic communication, and a recommended value of a setting parameter for the motor driving apparatus. The configuration setting unit 502 sets the mapping of the data object transferred by the master through the cyclic communication based on the mapping information included in the assignment information corresponding to a combination of the vendor specifying information and the product specifying information of the motor driving apparatus set for the programmable logic controller by the configuration editing unit. Furthermore, the configuration setting unit 502 performs setting such that the master writes the recommended value of the setting parameter, included in the assignment information for the motor driving apparatus, to the motor driving apparatus through message communication. This facilitates setting of the cyclic communication and writing of the recommended value. That is, the PLC and the motor driver can be set more easily as compared with the related art. The recommended value is, for example, connection of a limit switch to the basic unit 3 to disable a limit input terminal of the motor driver 4, whether a type of a contact point is Contact point a or Contact point b, or the like.

[Viewpoint B2]

The storage unit (the storage apparatus 12) may be further configured to store the mapping information, the recommended value of the setting parameter, and a motion function setting in association to correspond to the combination of the vendor specifying information and the product specifying information. As illustrated in FIG. 35, the motion function setting indicates any bit of the data object transferred by the cyclic communication to which control data for controlling a function provided in the motor driving apparatus is allocated. As a result, the data object for implementing a motion function is specified.

[Viewpoint B3]

The recommended value of the setting parameter includes a recommended value that enables a trial operation of the motor driving apparatus through the master (the basic unit 3). This enables the user to easily start the trial operation.

[Viewpoint B4]

As described in relation to FIG. 24, the trial operation may include a JOG operation of operating the motor driving apparatus as many times as the number of times a rotation instruction button (for example, −direction button/+direction button in FIG. 24) has been pressed or while the rotation instruction button is being pressed. The trial operation may include a point operation of operating the motor driving apparatus to move a load to a plurality of points designated in advance. The trial operation may include a return to origin operation for returning the load to the origin.

[Viewpoint B5]

The setting parameter may include at least any one of a value for enabling or disabling a limit switch and information indicating a type of a contact point (for example, Contact point a or Contact point b) related to position control or speed control.

[Viewpoint B6]

The CPU 11 (the import unit 535) may function as a generation unit that reads the electronic file 2710 corresponding to the selected motor driving apparatus and generates mapping information (PDO settings) based on the electronic file. This can save labor of the user for manually creating the mapping information.

[Viewpoint B7]

The generation unit (the CPU 11 or the import unit 535) may read an electronic file corresponding to the selected motor driving apparatus and determine whether the motor driving apparatus selected based on the electronic file is a motor driving apparatus that requires the recommended value of the setting parameter. When the selected motor driving apparatus is the motor driving apparatus that requires the recommended value of the setting parameter, the generation unit (the CPU 11 or the import unit 535) reads a recommended value of the setting parameter from the electronic file or the assignment information 3500, and writes the recommended value of the setting parameter to the selected motor driving apparatus. In this manner, the mapping information may be created by analyzing the electronic file provided from a vendor. As a result, the labor of the user can be further saved.

[Viewpoint B8]

The cyclic communication includes any one of ETHERCAT communication, ETHERNET/IP communication, PROFINET communication, and MODBUS communication. Note that these are examples of the cyclic communication, and cyclic communication of another format may be adopted.

[Viewpoint B9]

There is also provided a control method for a setting support apparatus that supports setting of a PLC system including a programmable logic controller that functions as a master in cyclic communication and a motor driving apparatus that functions as a slave in the cyclic communication and drives a motor based on motor control data transferred from the master by the cyclic communication.

The control method includes:

- selecting any motor driving apparatus from among a plurality of the motor driving apparatuses each of which is specified based on vendor specifying information and product specifying information, and setting the selected motor driving apparatus as the slave to the programmable logic controller functioning as the master;
- storing assignment information associated with the vendor specifying information and a plurality of pieces of the product specifying information in a storage unit, the assignment information including mapping information for mapping a data object handled by functions motor driving apparatus as a communication target of the cyclic communication, and a recommended value of a setting parameter for the motor driving apparatus; and
- setting the mapping of the data object transferred by the master through the cyclic communication based on the mapping information included in the assignment information corresponding to a combination of the vendor specifying information and the product specifying information of the motor driving apparatus set for the programmable logic controller, and setting the master to write the recommended value of the setting parameter included in the assignment information for the motor driving apparatus to the motor driving apparatus through message communication.

[Viewpoint B10]

The setting support program 21 is an example of a program for causing a processor to execute the control method for a setting support apparatus described in Viewpoint B9.

The invention is not limited to the above embodiment, and various modifications and changes can be made within a scope of a gist of the invention.

What is claimed is:

1. A setting support apparatus that supports setting of a PLC system including a programmable logic controller that functions as a master in cyclic communication and a motor driving apparatus that functions as a slave in the cyclic communication and drives a motor based on motor control data transferred from the master by the cyclic communication, the setting support apparatus comprising:

- a configuration editing unit that selects any motor driving apparatus from among a plurality of the motor driving apparatuses in a multi-vendor environment, each of which is specified based on vendor specifying information and product specifying information, and sets the selected motor driving apparatus as the slave to the programmable logic controller functioning as the master;
- a storage unit that stores assignment information associated with the vendor specifying information and a plurality of pieces of the product specifying information, the assignment information including mapping information for mapping a data object, handled by the motor driving apparatus as a communication target of the cyclic communication, and a recommended value of a setting parameter for the motor driving apparatus, wherein the recommended value is a pre-verified value determined to meet a specification of the programmable logic controller functioning as the master for facilitating a setup process in the multi-vendor environment; and
- a configuration setting unit that sets mapping of a data object transferred from the master by the cyclic communication based on the mapping information, included in the assignment information corresponding to a combination of the vendor specifying information and the product specifying information of the motor driving apparatus set for the programmable logic controller by the configuration editing unit, and sets the recommended value of the setting parameter included in the assignment information for the motor driving apparatus to be written to the motor driving apparatus by the master through message communication.

2. The setting support apparatus according to claim 1, wherein

- the storage unit is further configured to store the mapping information, the recommended value of the setting parameter, and a motion function setting in association to correspond to the combination of the vendor specifying information and the product specifying information, and
- the motion function setting indicates which bit of the data object transferred by the cyclic communication to which control data for controlling a function provided in the motor driving apparatus is allocated.

3. The setting support apparatus according to claim 1, wherein the recommended value of the setting parameter includes a recommended value that enables a trial operation of the motor driving apparatus through the master.

4. The setting support apparatus according to claim 3, wherein the trial operation is any one of a JOG operation of operating the motor driving apparatus as many times as a number of times a rotation instruction button having been pressed or while the rotation instruction button is being pressed, a point operation of operating the motor driving apparatus to move a load to a plurality of points designated in advance; and a return to origin operation of returning the load to an origin.

5. The setting support apparatus according to claim 1, wherein the setting parameter includes at least any one of a value for enabling or disabling a limit switch or information indicating a type of a contact point related to position control or speed control.

6. The setting support apparatus according to claim 1, further comprising a generation unit that reads an electronic file corresponding to the selected motor driving apparatus and generates the mapping information based on the electronic file.

7. The setting support apparatus according to claim 6, wherein the generation unit reads the electronic file corresponding to the selected motor driving apparatus, determines whether the selected motor driving apparatus is a motor driving apparatus that requires the recommended value of the setting parameter based on the electronic file, and reads the recommended value of the setting parameter from the assignment information and writes the recommended value of the setting parameter to the selected motor driving apparatus when the selected motor driving apparatus is the motor driving apparatus that requires the recommended value of the setting parameter.

8. The setting support apparatus according to claim 1, wherein the cyclic communication includes any one of ETHERCAT communication, ETHERNET/IP communication, PROFINET communication, and MODBUS communication.

9. A control method for a setting support apparatus, which supports setting of a PLC system including a programmable logic controller that functions as a master in cyclic communication and a motor driving apparatus that functions as a slave in the cyclic communication and drives a motor based on motor control data transferred from the master by the cyclic communication, the control method comprising:

selecting any motor driving apparatus from among a plurality of the motor driving apparatuses in a multi-vendor environment, each of which is specified based on vendor specifying information and product specifying information, and setting the selected motor driving apparatus as the slave to the programmable logic controller functioning as the master;

storing assignment information associated with the vendor specifying information and a plurality of pieces of the product specifying information in a storage unit, the assignment information including mapping information for mapping a data object, handled by the motor driving apparatus as a communication target of the cyclic communication, and a recommended value of a setting parameter for the motor driving apparatus, wherein the recommended value is a pre-verified value determined to meet a specification of the programmable logic controller functioning as the master for facilitating a setup process in the multi-vendor environment; and setting mapping of a data object transferred from the master by the cyclic communication based on the mapping information, included in the assignment information corresponding to a combination of the vendor specifying information and the product specifying information of the motor driving apparatus set for the programmable logic controller, and setting the recommended value of the setting parameter included in the assignment information for the motor driving apparatus to be written to the motor driving apparatus by the master through message communication.

10. A program for causing a processor to execute the control method for a setting support apparatus according to claim 9.

* * * * *